United States Patent
Thomas

(10) Patent No.: US 12,193,627 B2
(45) Date of Patent: Jan. 14, 2025

(54) HIGH VOLUME INDUSTRIAL VACUUM ASSEMBLIES AND METHODS

(71) Applicant: Industrial Vacuum Transfer Services USA, LLC, Houston, TX (US)

(72) Inventor: Randall Earl Thomas, Harwood, TX (US)

(73) Assignee: Industrial Vacuum Transfer Services USA, LLC, Houston, TX (US)

( * ) Notice: Subject to any disclaimer, the term of this patent is extended or adjusted under 35 U.S.C. 154(b) by 201 days.

(21) Appl. No.: 17/811,291

(22) Filed: Jul. 7, 2022

(65) Prior Publication Data

US 2023/0010635 A1      Jan. 12, 2023

Related U.S. Application Data

(60) Provisional application No. 63/367,570, filed on Jul. 1, 2022, provisional application No. 63/367,218, filed
(Continued)

(51) Int. Cl.
*B65G 53/60*      (2006.01)
*A47L 5/18*       (2006.01)
(Continued)

(52) U.S. Cl.
CPC .............. *A47L 7/0004* (2013.01); *A47L 5/18* (2013.01); *A47L 9/0081* (2013.01); *A47L 9/242* (2013.01); *B65G 53/58* (2013.01)

(58) Field of Classification Search
None
See application file for complete search history.

(56) References Cited

U.S. PATENT DOCUMENTS 2,193,784 A * 3/1940 Smith ................. A47L 5/32
                                                       15/301
2,458,258 A * 1/1949 Furr .................. E01H 1/0836
                                                       414/508
(Continued)

FOREIGN PATENT DOCUMENTS

CN      110817176         2/2020
CN      113123397 A       7/2021
(Continued)

OTHER PUBLICATIONS

Wayback Machine printouts of www.supavac.com, Apr. 4, 2004.
(Continued)

*Primary Examiner* — Joseph A Dillon, Jr.
(74) *Attorney, Agent, or Firm* — Womble Bond Dickinson (US) LLP

(57) ABSTRACT

Assemblies and method to extract a material from a material source may include a vacuum and material collector assembly to enhance extraction of the material from the material source. The vacuum and material collector assembly may include a material collector comprising a high volume pressure vessel having an interior and a high-pressure vacuum source pneumatically coupled to the pressure vessel. The vacuum source is operable to generate a high-pressure vacuum of a fluid flow through the interior of the pressure vessel to extract the waste material from the waste material source into the interior of the pressure vessel. The vacuum source may be connected to the pressure vessel of the material collector to form a unified vacuum and material collector assembly which may be supported on a single mobile chassis.

24 Claims, 28 Drawing Sheets

Related U.S. Application Data on Jun. 29, 2022, provisional application No. 63/367,219, filed on Jun. 29, 2022, provisional application No. 63/364,630, filed on May 13, 2022, provisional application No. 63/264,101, filed on Nov. 16, 2021, provisional application No. 63/264,015, filed on Nov. 12, 2021, provisional application No. 63/203,147, filed on Jul. 9, 2021, provisional application No. 63/203,108, filed on Jul. 8, 2021.

(51) Int. Cl.
*A47L 7/00* (2006.01)
*A47L 9/00* (2006.01)
*A47L 9/24* (2006.01)
*B65G 53/58* (2006.01)

(56) References Cited

U.S. PATENT DOCUMENTS

| | | | |
|---|---|---|---|
| 2,483,485 A | 10/1949 | Barr | |
| 2,863,525 A | 12/1958 | Lucian | |
| 3,489,464 A | 1/1970 | Delfs | |
| 3,776,601 A | 12/1973 | Capes et al. | |
| 3,971,096 A | 7/1976 | Renholt | |
| 4,000,061 A | 12/1976 | Bowling et al. | |
| 4,212,653 A | 7/1980 | Giles | |
| 4,278,454 A | 7/1981 | Nemesi | |
| 4,303,417 A | 12/1981 | Koch | |
| 4,372,713 A * | 2/1983 | Kean, Jr. | B65G 53/64 55/303 |
| 4,379,663 A * | 4/1983 | Allison | B65G 53/66 406/28 |
| 4,415,297 A * | 11/1983 | Boring | B65G 53/24 55/DIG. 32 |
| 4,422,810 A * | 12/1983 | Boring | B65G 53/24 406/191 |
| 4,423,987 A | 1/1984 | Powers | |
| 4,460,389 A | 7/1984 | Baum | |
| 4,519,810 A | 5/1985 | Haas | |
| 4,578,840 A * | 4/1986 | Pausch | E01H 1/0836 15/340.1 |
| 4,759,691 A * | 7/1988 | Kroupa | F04F 5/467 417/174 |
| 4,913,597 A | 4/1990 | Christianson | |
| 4,923,597 A | 5/1990 | Anderson et al. | |
| 4,925,467 A | 5/1990 | Jordan et al. | |
| 4,933,017 A * | 6/1990 | Brzoska | A47L 5/14 15/406 |
| 4,935,984 A * | 6/1990 | Bryant | E03F 7/10 15/340.1 |
| 4,947,510 A | 8/1990 | English | |
| 4,988,240 A * | 1/1991 | Thompson | B65G 53/52 406/173 |
| 5,030,259 A | 7/1991 | Bryant et al. | |
| 5,163,786 A * | 11/1992 | Christianson | B65G 53/60 55/467 |
| 5,425,188 A * | 6/1995 | Rinker | B01D 46/0002 175/206 |
| 5,562,746 A | 10/1996 | Raether | |
| 5,791,073 A * | 8/1998 | Palmer | E02F 5/003 406/173 |
| 5,940,926 A * | 8/1999 | Inzinna | B23Q 11/0046 15/409 |
| 6,093,226 A | 7/2000 | Schoenberger | |
| 6,206,621 B1 | 3/2001 | Sebring | |
| 6,322,327 B1 | 11/2001 | Dawson | |
| 6,325,572 B1 | 12/2001 | Dietrich | |
| 6,385,867 B1 * | 5/2002 | Slabach | E02F 3/8816 37/304 |
| 6,413,020 B1 | 7/2002 | Davison | |
| 6,471,751 B1 | 10/2002 | Semanderes | |
| RE38,872 E | 11/2005 | Hayes | |
| 7,045,068 B2 | 5/2006 | Hutchinson | |
| 7,074,261 B2 * | 7/2006 | Murphy | B01D 46/02 55/482 |
| 7,909,910 B2 * | 3/2011 | Benner | B04C 11/00 55/423 |
| 7,959,870 B2 | 6/2011 | Yanokuchi et al. | |
| 7,967,901 B2 | 6/2011 | Sakatani et al. | |
| 8,153,001 B2 | 4/2012 | Peters | |
| 8,277,201 B2 | 10/2012 | Krohn | |
| 8,360,691 B2 | 1/2013 | Moretto | |
| 8,596,990 B2 * | 12/2013 | Schaaf | F04F 5/461 417/174 |
| 8,702,399 B2 | 4/2014 | Krohn | |
| 8,881,341 B2 * | 11/2014 | Schmidt, Jr. | E03F 9/00 15/340.1 |
| 8,967,919 B2 | 3/2015 | Yaluris et al. | |
| 9,045,072 B2 * | 6/2015 | Hetcher | G07C 5/0841 |
| 9,212,669 B2 | 12/2015 | Krohn | |
| 9,227,780 B2 | 1/2016 | Krohn | |
| 9,687,890 B2 * | 6/2017 | Tacke | B04C 5/14 |
| 9,713,827 B2 | 7/2017 | Bonneau et al. | |
| 9,719,230 B2 | 8/2017 | Showley | |
| 9,988,788 B2 * | 6/2018 | Holt | E02F 3/8816 |
| 10,065,150 B2 | 9/2018 | Archuleta et al. | |
| 10,421,624 B2 * | 9/2019 | Maguire | B65G 53/40 |
| 10,457,501 B2 | 10/2019 | Wilkinson et al. | |
| 10,502,237 B2 * | 12/2019 | Johnson | F04F 5/20 |
| 10,527,064 B2 | 1/2020 | Krohn | |
| 10,739,070 B2 * | 8/2020 | Bishop | F26B 3/20 |
| 10,875,060 B2 | 12/2020 | Wu et al. | |
| 10,906,225 B2 * | 2/2021 | Zinski | B29C 48/288 |
| 10,926,008 B2 | 2/2021 | Minskoff et al. | |
| 11,091,327 B2 * | 8/2021 | Kelly | B65G 53/04 |
| 11,179,754 B2 * | 11/2021 | Doucette, Jr. | B08B 9/0808 |
| 11,584,598 B2 | 2/2023 | Conradt | |
| 11,629,486 B2 * | 4/2023 | Forster | E03D 5/016 4/316 |
| 11,643,790 B2 * | 5/2023 | Renger | E02F 3/8816 37/317 |
| 12,091,264 B2 | 9/2024 | Thomas | |
| 12,098,068 B2 | 9/2024 | Thomas | |
| 12,103,791 B2 | 10/2024 | Thomas | |
| 12,137,864 B2 | 11/2024 | Thomas | |
| 2003/0190200 A1 | 10/2003 | Hajima | |
| 2005/0005968 A1 * | 1/2005 | Berry | B67D 7/0283 137/205 |
| 2005/0183574 A1 | 8/2005 | Burnett | |
| 2006/0162568 A1 | 7/2006 | Arai | |
| 2007/0234906 A1 | 10/2007 | Demarco | |
| 2007/0251198 A1 | 11/2007 | Witter | |
| 2008/0244986 A1 | 10/2008 | Adelmann et al. | |
| 2009/0127352 A1 | 5/2009 | Hinther | |
| 2009/0159003 A1 | 6/2009 | Noguchi et al. | |
| 2010/0218467 A1 | 9/2010 | Witter | |
| 2010/0243575 A1 | 9/2010 | Nowling | |
| 2011/0047743 A1 | 3/2011 | Shepherd | |
| 2012/0117754 A1 | 5/2012 | Mendenhall | |
| 2012/0125441 A1 | 5/2012 | Krohn | |
| 2012/0233758 A1 * | 9/2012 | Tolles | E03F 1/006 4/321 |
| 2012/0318583 A1 | 12/2012 | Krohn | |
| 2013/0108482 A1 * | 5/2013 | Johnson | F16K 15/16 417/300 |
| 2013/0232723 A1 | 9/2013 | Catalfamo | |
| 2013/0315761 A1 | 11/2013 | Milhau et al. | |
| 2013/0327706 A1 | 12/2013 | Ursoi | |
| 2013/0336875 A1 | 12/2013 | Chang | |
| 2014/0374331 A1 * | 12/2014 | Anderson | B01D 29/13 210/416.1 |
| 2015/0335217 A1 | 11/2015 | Fritsche | |
| 2016/0280473 A1 | 9/2016 | Veselov | |
| 2017/0058484 A1 * | 3/2017 | Buchleiter | E02F 3/8891 |
| 2017/0128957 A1 | 5/2017 | Kosawa et al. | |
| 2017/0267466 A1 | 9/2017 | Wilkinson et al. | |
| 2018/0148277 A1 * | 5/2018 | Maguire | B29C 31/02 |
| 2019/0183737 A1 | 6/2019 | Valerino | |
| 2019/0193960 A1 | 6/2019 | Sewell | |
| 2019/0226474 A1 | 7/2019 | Krohn | |
| 2020/0078837 A1 | 3/2020 | Ducette et al. | |

(56) References Cited

U.S. PATENT DOCUMENTS

| | | | |
|---|---|---|---|
| 2020/0378200 | A1 | 12/2020 | Krohn |
| 2022/0031929 | A1* | 2/2022 | Davie ................ A61M 1/80 |
| 2022/0126225 | A1 | 4/2022 | Nowling |
| 2023/0009143 | A1 | 1/2023 | Thomas |
| 2023/0009644 | A1 | 1/2023 | Thomas |
| 2023/0010206 | A1 | 1/2023 | Thomas |
| 2023/0010395 | A1 | 1/2023 | Thomas |
| 2023/0011157 | A1 | 1/2023 | Thomas |
| 2023/0127887 | A1 | 4/2023 | Khankal et al. |
| 2023/0340957 | A1 | 10/2023 | Thomas |
| 2023/0340966 | A1 | 10/2023 | Krohn |
| 2023/0356273 | A1* | 11/2023 | Speece ................ B27G 3/00 |
| 2023/0373757 | A1* | 11/2023 | Sato ................ B66C 1/025 |
| 2023/0405644 | A1 | 12/2023 | Thomas et al. |
| 2024/0150136 | A1 | 5/2024 | Sundholm |
| 2024/0367922 | A1 | 11/2024 | Thomas |

FOREIGN PATENT DOCUMENTS

| | | |
|---|---|---|
| DE | 1528900 | 12/1969 |
| DE | 2625701 | 12/1977 |
| DE | 202011052400 | 1/2012 |
| EP | 1226865 | 7/2002 |
| EP | 1251087 | 10/2002 |
| EP | 1537773 | 8/2005 |
| EP | 1967260 | 9/2008 |
| EP | 2045199 | 4/2009 |
| EP | 2805902 | 11/2014 |
| EP | 3064457 | 9/2016 |
| EP | 3799969 | 4/2021 |
| GB | 1385706 | 2/1975 |
| IN | 298340 | 6/2018 |
| IN | 326989 | 12/2019 |
| IN | 329066 | 1/2020 |
| IN | 396075 | 5/2022 |
| JP | 5043983 | 5/1974 |
| JP | 52115089 | 9/1977 |
| JP | 60190707 | 12/1985 |
| JP | 04103849 | 9/1992 |
| JP | 0738044 | 7/1995 |
| JP | 09221225 | 8/1997 |
| JP | 2003095436 | 4/2003 |
| JP | 2005112373 | 4/2005 |
| JP | 2006102657 | 4/2006 |
| JP | 2006130479 | 5/2006 |
| JP | 2007063934 A | 3/2007 |
| KR | 100776693 | 11/2007 |
| KR | 20120006864 | 1/2012 |
| KR | 20160077775 | 7/2016 |
| KR | 101864666 | 6/2018 |
| KR | 102063424 | 1/2020 |
| WO | 2004010006 | 1/2004 |
| WO | 2008009024 | 1/2008 |
| WO | 2009156685 | 12/2009 |
| WO | 2010090574 | 8/2010 |
| WO | 2012059625 | 5/2012 |
| WO | 2013025522 | 2/2013 |
| WO | 2017041769 | 3/2017 |
| WO | 2021089977 | 5/2021 |

OTHER PUBLICATIONS

International Search Report and Written Opinion for PCT/US2022/073532, Jan. 2, 2023.

Invitation to Pay Additional Fees with Partial International Search for PCT/US2022/073532, Nov. 4, 2022.

International Search Report and Written Opinion for PCT/US2022/073537, Nov. 4, 2022.

International Search Report and Written Opinion for PCT/US2022/073542, Nov. 4, 2022.

International Search Report and Written Opinion for PCT/US2022/073545, Nov. 4, 2022.

International Search Report and Written Opinion for PCT/US2022/073551, Nov. 4, 2022.

International Search Report and Written Opinion for PCT/US2022/073554, Nov. 4, 2022.

Filter Concept Pvt. Ltd., Screenshots from youtube video located at https://www.youtube.com/watch?v=bbXZCzgZh4w, Mar. 14, 2013.

Transvac, Ejector Performance Testing, Alfreton, Derbyshire, UK, 2021, https://www.transvac.co.uk/ejector-performance-testing/.

Transvac, How an Ejector Works, Alfreton, Derbyshire, UK, 2021, https://www.transvac.co.uk/how-an-ejector-works/.

Declaration of Randall Earl Thomas, Nov. 28, 2022.

VAC-U-MAX, Air Operated Industrial Vacuum Cleaners, Belleville, NJ, 2021, https://www.vac-u-max.com/.

* cited by examiner

HIGH VOLUME INDUSTRIAL VACUUM ASSEMBLIES AND METHODS

CROSS-REFERENCE TO RELATED APPLICATIONS

This U.S. non-provisional patent application claims priority to and the benefit of U.S. Provisional Application No. 63/367,570, filed Jul. 1, 2022, titled "HIGH VOLUME INDUSTRIAL VACUUM ASSEMBLIES AND METHODS," U.S. Provisional Application No. 63/367,219, filed Jun. 29, 2022, titled "RECEIVER, ASSEMBLIES, AND METHODS FOR LOADING AND EXTRACTING PRODUCT IN ELEVATED TOWER," U.S. Provisional Application No. 63/367,218, filed Jun. 29, 2022, titled "ASSEMBLIES AND METHODS FOR MATERIAL EXTRACTION FROM RETENTION COLLECTIONS," U.S. Provisional Application No. 63/364,630, filed May 13, 2022, titled "ASSEMBLIES, APPARATUSES, SYSTEMS, AND METHODS FOR MATERIAL EXTRACTION AND CONVEYANCE," U.S. Provisional Application No. 63/264,101, filed Nov. 16, 2021, titled "ASSEMBLIES AND METHODS FOR MATERIAL EXTRACTION," U.S. Provisional Application No. 63/264,015, filed Nov. 12, 2021, titled "ASSEMBLIES AND METHODS FOR MATERIAL EXTRACTION," U.S. Provisional Application No. 63/203,147, filed Jul. 9, 2021, titled "SYSTEMS, METHODS, AND DEVICES FOR INDUSTRIAL TOWER WASTE EXTRACTION," and U.S. Provisional Application No. 63/203,108, filed Jul. 8, 2021, titled "SYSTEMS, METHODS, AND DEVICES FOR INDUSTRIAL TOWER WASTE EXTRACTION," the disclosures of all of which are incorporated herein by reference in their entireties.

TECHNICAL FIELD

The present disclosure relates to assemblies and methods for extracting material from a material source and, more particularly, to assemblies and methods for extracting material from environments providing sources for the material.

BACKGROUND

Certain environments, such as, for example, work sites, industrial sites, commercial sites, residential sites, or natural sites, may often be sources of material that is either deposited or accumulates as a result of operations at the site or through natural accumulation. The deposit or accumulation of the material may be undesirable for a number of reasons, and thus, removal of the material from the site may be desirable or necessary. For example, the presence of the material in sufficient quantities may hinder operations at the site, may present an undesirable environmental condition, and/or may present recycling or remediation opportunities. Traditional approaches to removal of the material from the site may be unsatisfactory or suffer from drawbacks for various reasons. For example, the material may take a variety of forms (e.g., liquids, solids, emulsions, particulates, etc.) and/or may be located or positioned, such that it is difficult to extract and remove from the site, and/or traditional methods may be impracticable, inefficient, unduly time consuming, and/or labor intensive.

Accordingly, Applicant has recognized a desire to provide improved assemblies and methods for extracting material from a source of the material or material source, including a variety of different materials from a variety of different environments, that may be more practicable, more efficient, less time consuming, and/or less labor intensive. The present disclosure may address one or more of the above-referenced drawbacks, as well as other possible drawbacks.

SUMMARY

As referenced above, it may be desirable to provide improved assemblies and methods for extracting material from a source of the material, including a variety of different materials from a variety of different environments, that may be more practicable, more efficient, less time consuming, and/or less labor intensive. For example, the intentional generation or production of some materials for desired intermediate or final products may result in the deposit or accumulation of by-product materials or waste materials that need to be removed from the environment in which the desired products are generated or produced. In some embodiments, the assemblies and methods may provide efficient extraction of the material to be removed from various environments, such as, for example, work sites, industrial sites, commercial sites, residential sites, natural sites, etc. For example, in some embodiments, the material may be extracted in a substantially continuous manner and/or may be extracted without significant contamination of the ambient environment with the material or portions thereof.

In some embodiments, a vacuum and material collector assembly for removing material from a material source is provided. In some embodiments, the material may be a waste material and the material source may be a waste material source. Non-limiting examples of materials and material sources may include undesired products, byproducts, waste materials, chemical contaminants, or fouling that may be deposited or formed in chemical reaction towers, chemical reaction vessels, waste pits, or retention ponds.

In some embodiments, the vacuum and material collector assembly for removing material from a material source may include a material collector comprising a high volume pressure vessel having an interior and a high-pressure vacuum source pneumatically coupled to the pressure vessel. The vacuum source may be operable to generate a high-pressure vacuum of a fluid flow through the interior of the pressure vessel to extract the material from the material source into the interior of the pressure vessel.

In some embodiments, the pressure vessel may include a housing defining the interior of the pressure vessel and a vacuum port positioned on the housing allowing access to the interior from outside of the housing. The vacuum port may be pneumatically connected to the vacuum source to form a unified vacuum and material collector assembly. In at least some instances, the vacuum source may be directly connected to the pressure vessel via the vacuum port. In some cases, the vacuum source may be directly connected to the pressure vessel via the vacuum port without the use of one or more tubular members between the vacuum source and the vacuum port.

In some embodiments, the vacuum source may be operable to apply a vacuum to the interior of the pressure vessel through the vacuum port. The vacuum source may include a plurality of vacuum generators, each of the plurality of vacuum generators being positioned to generate a vacuum to the interior of the pressure vessel. In some aspects of the present disclosure, one or more of the plurality of vacuum generators may comprise a venturi mechanism operable to generate a vacuum in the interior of the pressure vessel using a venturi effect.

In some embodiments, the vacuum and material collector assembly may include a chassis supporting the vacuum source and material collector forming a unified vacuum and material collector operable to be transported between geographical locations. The pressure vessel may include a discharge port coupled to the housing and operable to discharge waste material from the interior. The discharge port may be coupled to the housing via a discharge pipe. The discharge port and the discharge pipe may be disposed below the upper surface of the chassis. The discharge port may be substantially positioned at an end of the mobile chassis supporting the vacuum source and the material collector. In some instances, the discharge port may be positioned at a first end of the chassis while a hitch operable to couple the chassis to a mobile locomotion source is positioned at a second opposite end of the chassis. The discharge port may be coupled to a bottom portion of the pressure vessel housing via a discharge pipe extending from the housing to a terminal end of the mobile chassis. The discharge pipe may include a straight portion and an elbow portion allowing the discharge pipe to connect to the bottom portion of the housing disposed about an upper surface of the chassis.

In some embodiments, the lower portion of the housing of the pressure vessel has a bowl shape between the inlet port and the vacuum port operable to trap at least a majority of the waste material in the interior. In such cases, the inlet port and the vacuum port are positioned on the housing above the bowl shape and the discharge port is fluidly connected to the bowl shape to gravity feed the material out of the interior to the discharge port.

In some embodiments, the vacuum and material collector assembly may further include a sound attenuation assembly coupled to the vacuum source. The sound attenuation assembly is operable to attenuate sound generated by the vacuum source. The sound attenuation assembly may include a sound attenuation chamber connected to the vacuum source. The sound attenuation chamber may include an attenuation housing at least partially defining a chamber interior volume being positioned to receive at least a portion of the vacuum flow from the vacuum source and attenuate sound generated by the vacuum source. The vacuum source, the material collector, and the sound attenuation assembly may be connected to one another to form a unified vacuum, material collector, and attenuation module capable of being supported on a single mobile chassis configured to be transported between geographical locations.

In some embodiments, a method for extracting material from a material source may include generating a high-pressure vacuum of fluid flow in an interior of a material collector when connected to the waste material source by a pneumatic connection which extends between the waste material source and the interior. The method may further include transferring, with the high-pressure vacuum of the fluid flow, at least a portion of the waste material from the waste material source to the interior through the pneumatic connection. The high-pressure vacuum may be generated by a high-pressure vacuum source pneumatically coupled to a material collector comprising a pressure vessel having an interior defined by a housing and the vacuum source may be directly connected to the pressure vessel via a vacuum port positioned on the housing.

In some embodiments, the method may further include mobilizing the material collector comprises mobilizing the material collector and vacuum source together on a single mobile chassis to a waste disposal site. The method may further include discharging the waste material, or a portion thereof, from the interior through a discharge port coupled to the housing to a disposal receptacle at the waste disposal site. Discharging the waste material may further include opening a relief port positioned on the housing and pneumatically connected to an ambient environment so as to equalize pressure in the interior with an ambient environment and relieve the vacuum on the interior and pressurizing the interior with a fluid supply so as to increase a rate of discharge of waste material through the discharge port.

In some embodiments, the method may further include attenuating sound generated by the vacuum source at a sound attenuation module coupled to the vacuum source by causing at least a portion of the vacuum flow from the vacuum source to flow to a sound attenuation chamber connected to the vacuum source. The sound attenuation chamber may include an attenuation housing at least partially defining a chamber interior volume operable to receive at least a portion of the vacuum flow from the vacuum source and attenuate sound generated by the vacuum source.

In some embodiments, a method for extracting material from a material source may include generating, via a plurality of vacuum generators, a vacuum flow and extracting material from the material source via the vacuum flow through an inlet port disposed on the housing. The method may further include depositing at least a portion of the extracted material in the material collector and passing the vacuum flow into a sound attenuation chamber to reduce a sound level generated by one or more of the vacuum flow or generating the vacuum flow.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
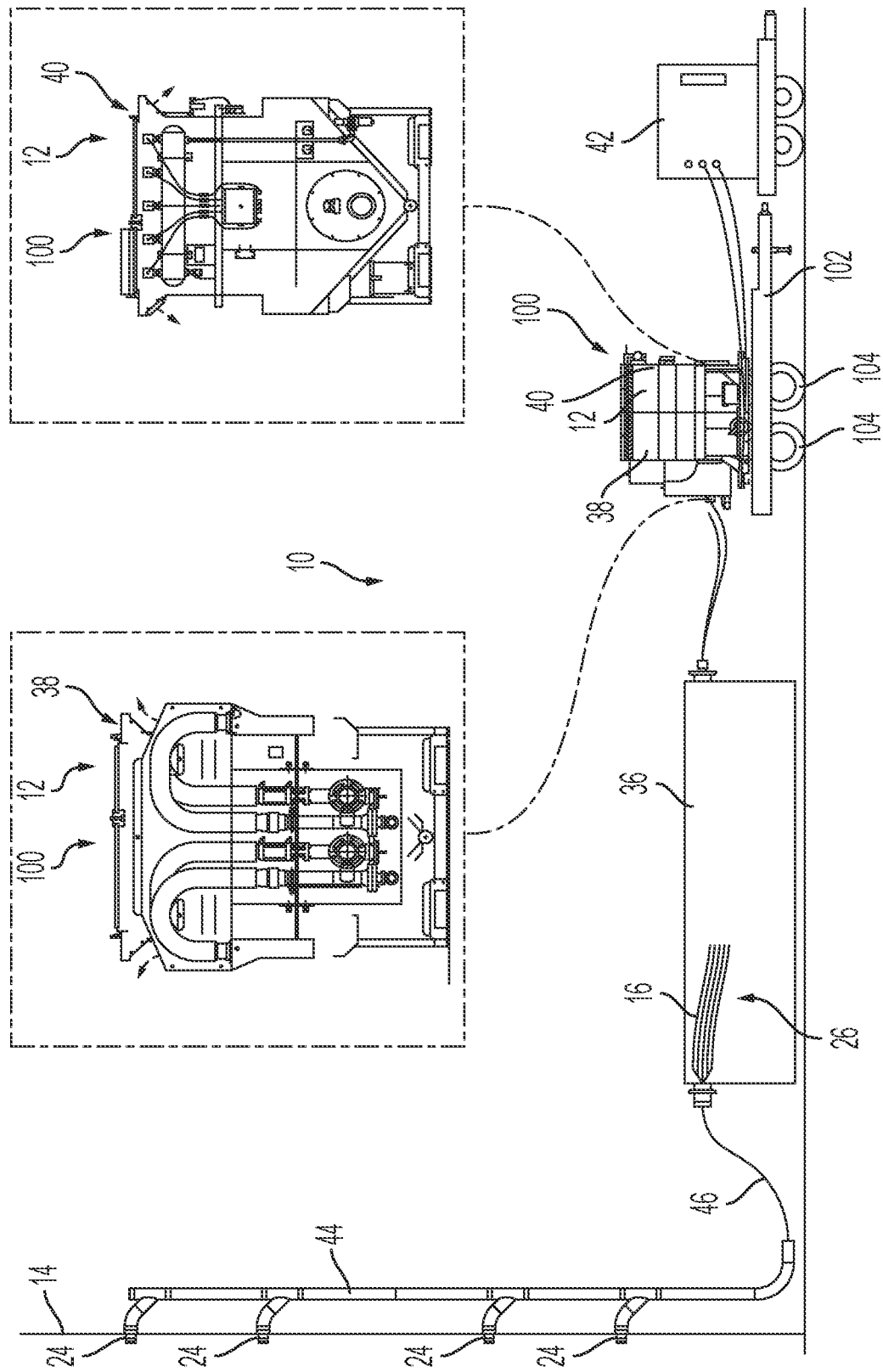
FIG. 1 is a schematic side view of an example material extraction assembly including an example vacuum generation and sound attenuation assembly, including detailed end views of an example vacuum source and an example sound attenuation chamber of the vacuum generation and sound attenuation assembly, according to embodiments of the disclosure.

FIG. 1 is a schematic side view of an example material extraction assembly 10 including an example vacuum generation and sound attenuation assembly 12, according to embodiments of the disclosure. The example material extraction assembly 10 may be configured to extract material from a source of the material. For example, the material extraction assembly 10, in at least some embodiments, may be used for extraction of a variety of different materials from a variety of different environments. For example, the intentional generation or production of some materials for desired intermediate or final products may result in the deposit or accumulation of by-product materials that need to be removed from the environment in which the desired products are generated or produced. In some embodiments, the assemblies and methods may provide efficient extraction of the material to be removed from various environments, such as, for example, work sites, industrial sites, commercial sites, residential sites, natural sites, etc. The industrial site may include, for example, chemical reaction towers (or other types of reaction vessels) in which chemical reactions are performed to obtain desirable products. Waste material may be generated as a byproduct from the chemical reactions.

For example, some types of chemical reactions may utilize a catalyst material to mediate the chemical reactions, for example, by causing the reaction to occur and/or increasing/decreasing a rate at which the reaction occurs, etc. In a chemical reaction tower (see, e.g., FIG. 1), the catalyst material may be loaded into the chemical tower at various tower levels. Other materials, such as, for example, gasses, liquids, etc., may thereafter be introduced into the tower. The presence of the catalyst material may cause, mediate, or otherwise facilitate a desired chemical reaction to generate a desired product. The chemical reaction may cause the reactivity, morphology, or other properties of the catalyst material to change, thereby reducing the ability of the catalyst to perform its function. For example, the catalyst may be used up or otherwise render its presence in the chemical tower undesirable.

The chemical reaction may also interact with the materials out of which the chemical reaction tower is formed. For example, some chemical reaction towers may be formed from concrete and steel. Chemical reaction towers may be formed from any number and types of materials. The catalyst or the other materials in the chemical reaction tower may react or otherwise interact with these materials of the chemical reaction tower, forming additional undesired products, which may be referred to as "tower products."

The undesired reaction products and/or the tower products, which may be referred to as "waste material," may move within the chemical reaction tower. For example, some of this material may partially or completely cover the catalyst or other important features of the chemical reaction tower, thereby reducing the effectiveness of the catalyst, for example, even in cases where the catalyst is not depleted but remains active.

The presence of the depleted catalyst material, catalyst covered in waste material, and/or the waste material itself, may impair future functioning of the chemical reaction tower. For example, the presence of this material in the chemical reaction tower may reduce the conversion efficiency (e.g., the quantity of desirable products produced versus the quantity of input products) of the chemical reactions, increase a reaction time, may render the chemical reactions more difficult to control (or prevent them from occurring), and/or may otherwise reduce the ability of the chemical reaction tower to perform its intended function.

Embodiments disclosed herein may relate to assemblies and methods for extracting material from a source of the materials, such as, for example, removing undesired material from environments, such as, for example, industrial environments. For example, some embodiments disclosed herein may facilitate extraction of undesired materials from an industrial environment using, for example, a high-pressure vacuum flow. Removing undesired material from an industrial environment using a high-pressure vacuum flow may provide for time efficient removal of the undesired materials and/or may reduce or prevent contamination of the ambient environment with the undesired material or portions thereof.

Industrial environments, chemical reaction towers, and the associated material are merely examples, and other types of environments and/or other types of materials are contemplated.

FIG. 1 schematically depicts example material sources that are example reaction vessels 14. Reaction vessels 14 may generate desirable products by reacting multiple materials with each other. Once a desirable product is generated, the reaction vessel 14 may be contaminated with the presence of material, which may include undesired material 16. Applicant has recognized that the undesired material 16 may be distributed throughout the reaction vessel 14, that reaction vessel 14 may be tall, and that the reaction vessel 14 may provide limited access to the location or locations of the undesired material 16. For example, as shown in FIG. 1, the reaction vessel 14 may include a plurality of zones, which may include the presence of the undesired material 16. The plurality of zones may be located in different regions of the reaction vessel 14, may be separated by different floors, levels, or support members, such as, for example, platforms, beams, etc., of the reaction vessel 14. This may render it difficult to access the undesired material 16 for removal from the reaction vessel 14. In some instances, different zones of reaction vessel 14 may only be accessible using a ladder, scaffolding, or other types of elevated support structures that may render access to the zones challenging.

Figure 2:
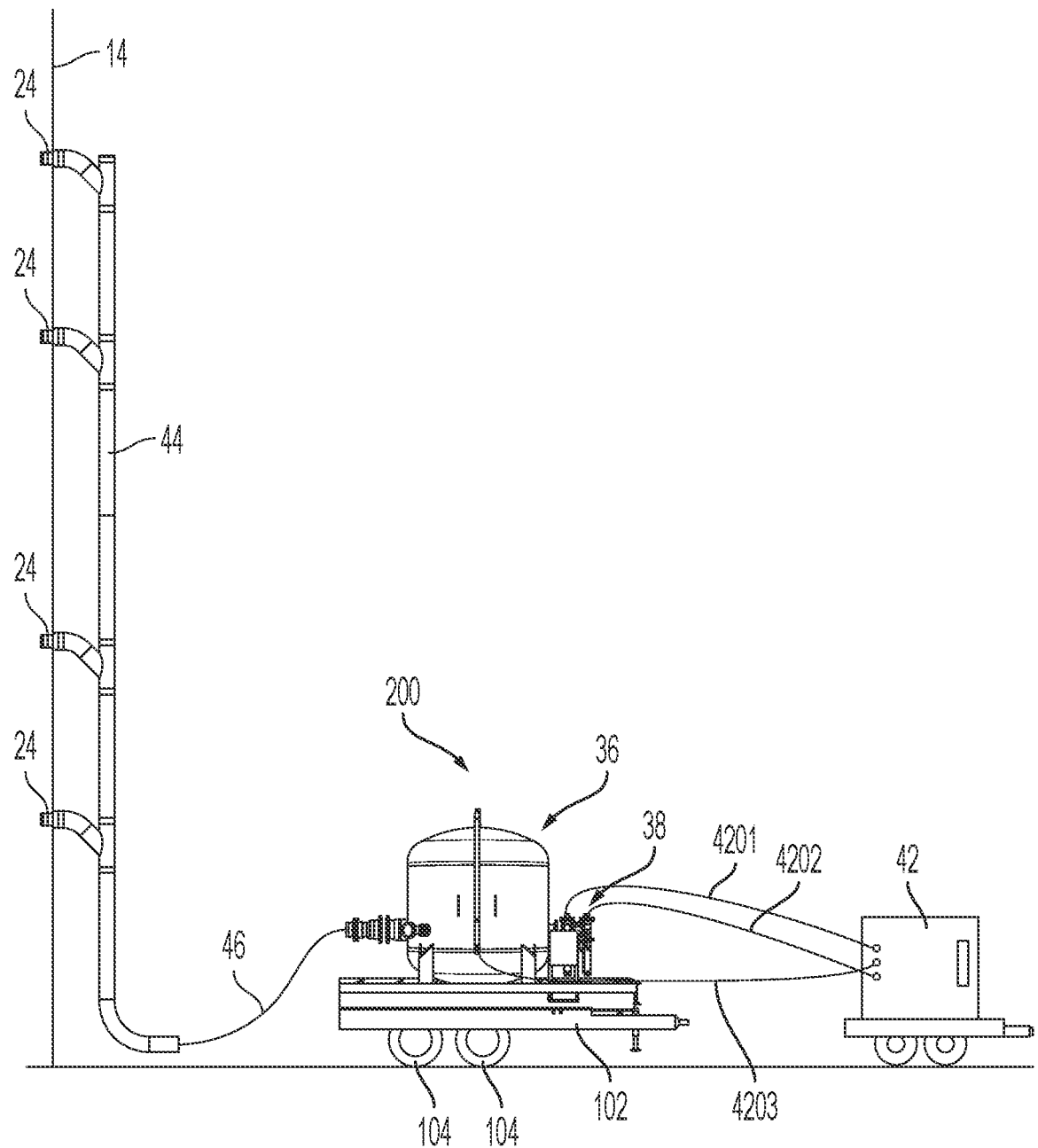
FIG. 2 is a schematic side view of an example vacuum and material collector assembly illustrating an example of extraction of material from an example source of the material in the form of a reaction vessel using an example vacuum and material collector assembly on a mobile chassis, according to embodiments of the disclosure.
Figure 3:
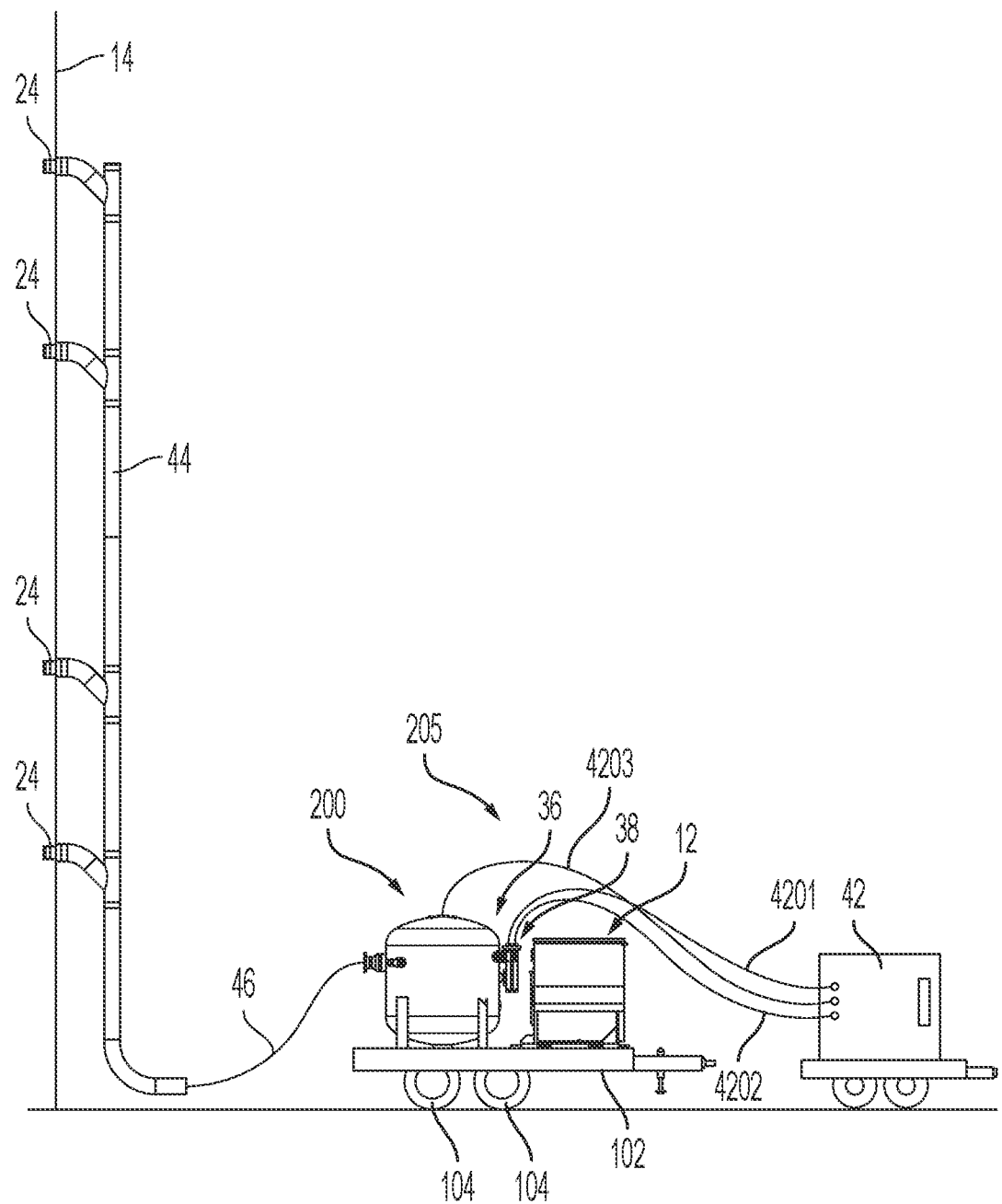
FIG. 3 is a schematic side view of an example vacuum and material collector assembly comprising a sound attenuation assembly illustrating an example of extraction of material from an example source of the material in the form of a reaction vessel using an example unified vacuum, material collector, and attenuation module on a mobile chassis, according to embodiments of the disclosure.

As schematically depicted in FIGS. 1-3, the material extraction assembly 10 and related methods, according to at least some embodiments, may facilitate extraction of material such as the undesired material 16 from the source of the material, such as the reaction vessel 14, using one or more high-pressure vacuum flows. The use of high-pressure vacuum flows may facilitate extraction of the undesired material 16 (and/or other material), for example, in situations in which there is limited physical access to the plurality of zones, where the undesired material 16 may be present. The use of high-pressure vacuum flows may facilitate parallel removal of the undesired material 16 from multiple locations within the source of the material, such as the reaction vessel 14.

For example, as shown in FIG. 1, the reaction vessel 14 may include a plurality of reaction vessel ports 24, which may provide only limited access to the plurality of zones from exterior the reaction vessel 14. For example, the reaction vessel ports 24 may be relatively small, such that it may be difficult or impossible for a person to enter the interior of the reaction vessel 14 through the reaction vessel ports 24, or such that it may be difficult or impossible to pass conventional tools, such as shovels or material transportation carts, through the reaction vessel ports 24.

In some embodiments, the material extraction assembly 10 may be configured to efficiently extract the undesired material 16 through the reaction vessel ports 24, for example, by generating a high-pressure vacuum flow and associating the high-pressure vacuum flow to external portions of respective reaction vessel ports 24. In some embodiments, the high-pressure vacuum flow may generate suction directed out of the interior of reaction vessel 14 through the respective reaction vessel ports 24. The suction may generate a vacuum induced vacuum flow 26 with at least a portion of the undesired material 16 entrained in the vacuum induced vacuum flow 26.

Depending on, for example, the distribution of the undesired material 16, various fixtures may be attached to the reaction vessel ports 24 to control application of suction to the undesired material 16. In some embodiments, conduits, such as hoses or other fluid flow directing carriers may be pneumatically connected to one or more of the reaction vessel ports 24, for example, inside of the reaction vessel 14. The conduits may be positioned such that the vacuum flow 26 entrains desired quantities of the undesired material 16 in the vacuum flow 26. Exterior portions of the reaction vessel ports 24 may be connected to other components of the material extraction assembly 10, for example, to apply the high-pressure vacuum and/or process undesired material 16 entrained in the vacuum flow 26.

Applicant has recognized that the undesired material may present a contamination threat to areas near reaction vessels. The undesired material 16 may include significant quantities of small particles that may be difficult to control. In some embodiments, the material extraction assembly 10 may facilitate extraction of undesired material with an at least partially sealed system. For example, the at least partially sealed system may be configured to transfer the undesired material from the reaction vessel 14 using a substantially sealed fluid flow path having a limited number of potential exit points. In some embodiments, the flow path may be filtered prior to exiting the flow path to limit or prevent discharge of particulate forms of the undesired material from at least some embodiments of the material extraction assembly 10.

Applicant has recognized that the undesired material 16 may be heterogeneous in nature and/or may include material that ranges in size from particulates to one or more inches in size. The undesired material 16 may also be in various states of matter. For example, some portions of the undesired material 16 may be solid, and other portions may be liquid or semi-liquid. Conventional approaches to material removal may be unable to effectively process heterogeneous undesired materials. In some embodiments, the material extraction assembly 10 may facilitate extraction of heterogeneous undesired material, for example, using the high-pressure vacuum flow 26. In some embodiments, the high-pressure vacuum flow 26 may be capable of moving a broad range of materials in various states of matter. The use of a high-pressure vacuum flow 26 for material extraction may facilitate substantial containment of removed undesired material 16, thereby limiting or preventing release into or contamination of the ambient environment with portion of the extracted undesired material 16.

The example material extraction assembly 10 shown in FIG. 1 may be used to extract undesired material 16 from various environments. While described with respect to an industrial environment, at least some embodiments may be used to remove undesired material 16 from other environments, including, for example, commercial, residential, and natural environments.

As shown in FIG. 1, the example material extraction system 10 may use a high-pressure vacuum flow 12 to extract materials from an industrial environment. For example, the high-pressure vacuum flow 26 may move the undesired material 16 along a flow path to separate it from the industrial environment. Once separated from the industrial environment, in some embodiments, the undesired material 16 may be transported to a site remote from the industrial environment, for example, for disposal, recycling, and/or remediation. In some embodiments, for example, as shown in FIG. 1, the material extraction assembly 10 may include a material collector 36, a vacuum source 38, a sound attenuating chamber 40 connected to the vacuum source 38, and a fluid source 42 configured to provide pressurized fluid to the vacuum source 38. In some embodiments, one or more of the material collector 36, the vacuum source 38, the sound attenuation chamber 40, or the fluid source 42 may be configured to be easily transported between geographical locations for use at different environments, for example, by being supported on one or more trailers including wheels, tracks, skids, or other devices for facilitating movement between geographical locations.

In some embodiments, one or more of the material collector 36, the vacuum source 38, or the sound attenuation chamber 40 may be arranged to form a flow path beginning at the source of the material (e.g., at the reaction vessel 14) and terminating at the sound attenuation chamber 40. The flow path may be used to extract undesired material 16 from the reaction vessel 14 and, in some embodiments, limit contamination of the ambient environment. For example, the vacuum source 38 may generate a vacuum in the flow path, thereby generating a fluid flow along the flow path. The fluid flow may be used to apply suction proximate the undesired material 16 in the reaction vessel 14 to draw the undesired material 16 into the flow path. The fluid flow in the flow path may cause the undesired material 16 to flow out of reaction vessel 14 and into material collector 36, thereby separating at least a portion of the undesired material 16 from the environment. In some embodiments, a major portion of the undesired material 16 may be deposited in the material collector 36. In some embodiments, a minor portion of the undesired material 16 may flow from the material collector 36, through the vacuum source 38, and into the sound attenuation chamber 40. In some embodiments, the sound attenuation chamber 40 may be configured to remove (or reduce) the minor portion of the undesired material 16 in the fluid flow prior to the fluid flow being exhausted into the ambient environment.

In some embodiments, to form the flow path, the material collector 36 may be pneumatically connected to the source of the undesired material (e.g., the reaction vessel 14). In some embodiments, the pneumatic connection between reaction vessel 14 may be formed using a manifold 44. The manifold 44 may be connected to multiple reaction vessel ports 24 of the reaction vessel 14, thereby pneumatically connecting the material collector 36 to multiple locations of the reaction vessel 14. For example, the interior of the material collector 36 may be pneumatically connected to the reaction vessel 14. Pneumatically connecting the material collector 36 to multiple locations of reaction vessel 14 may facilitate extraction of undesired material 16 from each of the locations, for example, concurrently, simultaneously, sequentially, in parallel, etc.

Some reaction vessels 14 may be tall. Due to the height of some reaction vessels 14 and the distribution of the zones along the height, it may be challenging to access one or more of the zones of the reaction vessel 14. In some embodiments, the manifold 44 may include relatively rigid piping (e.g., poly pipe). The piping may render the manifold 44 at least partially self-supporting, which may facilitate pneumatic connection of the manifold 44 to multiple zones of the reaction vessel 14. The manifold 44, in some embodiments, may pneumatically connect the material collector 36 to any number of locations on the reaction vessel 14, for example, such as those that are difficult to reach or access. The piping may be of low weight and/or easily attachable to a wide variety of structures, which may reduce the need for significant in-person access to difficult-to-reach locations on/in the reaction vessel 14 to extract undesired material 16.

In some embodiments, the manifold 44 may be pneumatically connected to the material collector 36, for example, via a conduit 46, such as a hose. In some embodiments, the conduit 46 may be flexible to allow for pneumatic connection of the manifold 44 and the material collector 36 in various orientations and positions with respect to one another. The conduit 46 may be sized so as not to limit the flow of fluid along the flow path.

In some instances, the undesired material 16 in the reaction vessel 14 may present a clogging potential. For example, the undesired material 16 may include relatively large components that may tend to wedge or catch on structures through which the undesired material 16 is drawn. In some embodiments, the conduit 46 may be, at least in part, transparent, translucent, and/or capable of providing an indication of the contents passing through the conduit 46, which may be usable to detect and/or diagnose whether the conduit 46 is clogging. As noted herein, the undesired material 16 may be heterogeneous and may include relatively large components that may tend to clog narrow passages (e.g., constrictions in the conduit 46). To reduce the risk of clogging, in some embodiments, the conduit 46 may include, at least in part, a smooth inner surface, such as may be present in poly pipe. A smooth inner surface may reduce the risk of, or prevent, clogging of the conduit 46.

Although the example manifold 44 is shown in FIG. 1 as only being pneumatically connected to one material collector 36, in some embodiments, the manifold 44 may be connected to multiple material collectors. In some embodiments, the multiple material collectors may be connected in parallel to, for example, scale-up the extraction capacity of the material extraction assembly 10, for example, by increasing the pressure of the high-pressure vacuum flow, etc., for example.

In some embodiments, the undesired material 16 may flow into the material collector 36 after flowing through the manifold 44. A major portion of the undesired material 16 may be collected in the material collector 36. In some embodiments, however, some (e.g., a minor portion) of the undesired material 16 may flow out of the material collector 36 in the flow path of the high-pressure vacuum flow 26. In some embodiments, the material collector 36 may remove a major portion of the undesired material 16 from the fluid flow it receives along the flow path of the vacuum flow 26. In some embodiments, the material collector 36 may receive all, or a portion, of the fluid flow out of the reaction vessel 14, and the material collector 36 may include one or more structures configured to trap a major portion of the undesired material 16 in the fluid flow received inside the material collector 36. Once trapped, the major portion of the undesired material 16 may be retained in the material collector 36, for example, for disposal, recycling, and/or remediation.

FIG. 2 depicts an alternative embodiment of material extraction assembly 10 that includes a unified vacuum and material collector assembly 200 on a single mobile chassis 102 having wheels 104, rather than a separate material collector and vacuum source. Unified vacuum and material collector assembly 200 includes a material collector 36 pneumatically coupled with a high-pressure vacuum source 38. Vacuum and material collector assembly 200 may be coupled with a fluid source 42, as depicted in FIG. 2. As shown in FIG. 2, the vacuum and material collector assembly 200 may include a fluid source 42 configured to provide pressurized fluid to the vacuum source 38, for example by conduits 4201 and 4202. The fluid source 42 may also be configured to provide pressurized fluid to material collector 36, for example by conveyance 4203, in order to facilitate discharge or conveyance of material 16 from material collector 36.

FIG. 3 depicts another alternative embodiment of material extraction assembly 10 that includes a unified vacuum, material collector, and attenuation module 205 on a single mobile chassis 102 having wheels 104, rather than a separate material collector and vacuum source/sound attenuation assembly. Unified vacuum, material collector, and attenuation assembly 205 includes unified vacuum and material collector assembly 200, comprising a material collector 36 pneumatically coupled with a high-pressure vacuum source 38, pneumatically coupled with sound attenuation assembly 12. Unified vacuum, material collector, and attenuation assembly 205 may be coupled with a fluid source 42, as depicted in FIG. 3. The fluid source 42 may also be configured to provide pressurized fluid to material collector 36, for example by conveyance 4203, in order to facilitate discharge or conveyance of material 16 from material collector 36.

FIGS. 4-9 depict a unified vacuum, material collector, and attenuation assembly 205, according to an exemplary embodiment of the present disclosure. Unified vacuum, material collector, and attenuation assembly 205 includes unified vacuum and material collector assembly 200 and sound attenuation assembly 12. Vacuum and material collector assembly 200 includes a material collector 36 comprising a high volume pressure vessel 270 having an interior 289. Vacuum and material collector assembly 200 further includes a high-pressure vacuum source 38 pneumatically coupled to the pressure vessel 270. The vacuum source is operable to generate a high-pressure vacuum of a fluid flow through the interior 289 of the pressure vessel 270 to extract the material 16 from the material source into the interior 289 of the pressure vessel 270.

Figure 4:
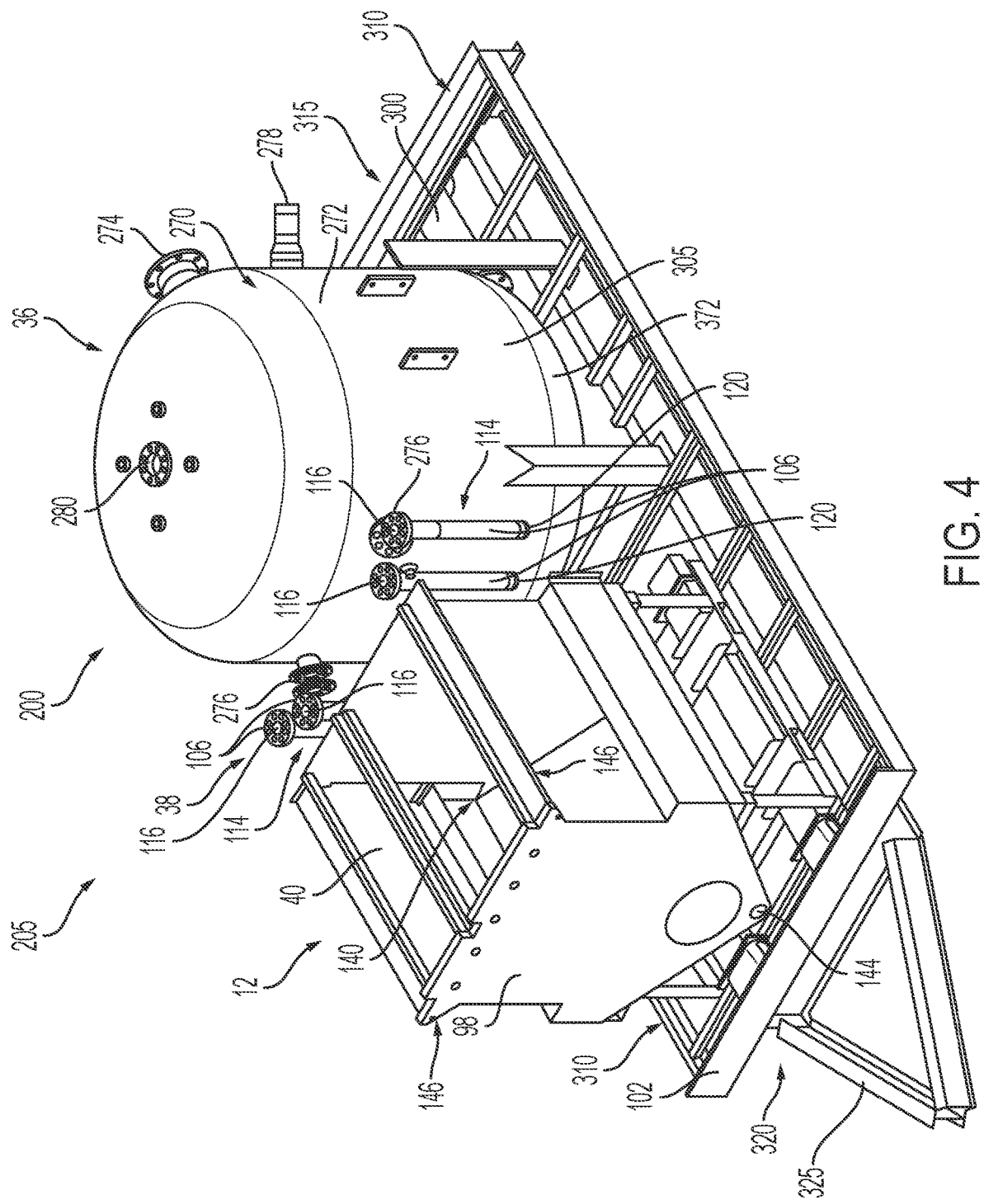
FIG. 4 is a schematic perspective view of an example vacuum and material collector assembly with sound attenuation assembly, according to embodiments of the disclosure.

As depicted in FIG. 4, the pressure vessel 270 may include a housing 272 defining the interior of the pressure vessel 270. The pressure vessel 270 may also include a vacuum port 276 positioned on the housing 272. Vacuum port 276 provides access to the interior 289 from outside the housing 272 and is pneumatically connected to the vacuum source 38 to form a unified vacuum and material collector assembly 200. The vacuum source 38 is operable to apply a vacuum to the interior 289 of the pressure vessel 270 through the vacuum port 276. In at least some embodiments, the vacuum source 38 is directly connected to the pressure vessel 270 via the vacuum port 276. For example, the vacuum source 38 may be directly connected to the pressure vessel 270 via the vacuum port 276 without the use of one or more tubular member between the vacuum source 38 and the vacuum port 276.

The vacuum source 38 may include a plurality of vacuum generators 106. Each of vacuum generators 106 may be positioned and configured to generate a vacuum to the interior 289 of the pressure vessel 270. One or more of the plurality of vacuum generators 106 may include a venturi mechanism 114 operable to generate a vacuum in the interior 289 of the pressure vessel 270 using a venturi effect. In some embodiments, the plurality of vacuum generators 106 may comprise two or more vacuum generators 106 configured to operate in parallel to enhance the vacuum pressure generated by the vacuum source 38. In some embodiments, the plurality of vacuum generators 106 may comprise four vacuum generators 106 configured to operate in parallel to enhance the vacuum pressure generated by the vacuum source 38, as depicted in FIG. 4. As depicted in FIG. 4, exemplary vacuum and material collector assembly 200 includes two vacuum ports 276 each of which are connected to two vacuum generators 106 configured to operate in parallel to enhance the vacuum pressure generated by vacuum source 38. Pressure vessel 270 may include a plurality of vacuum ports 276 or just one vacuum port 276.

Figure 6:
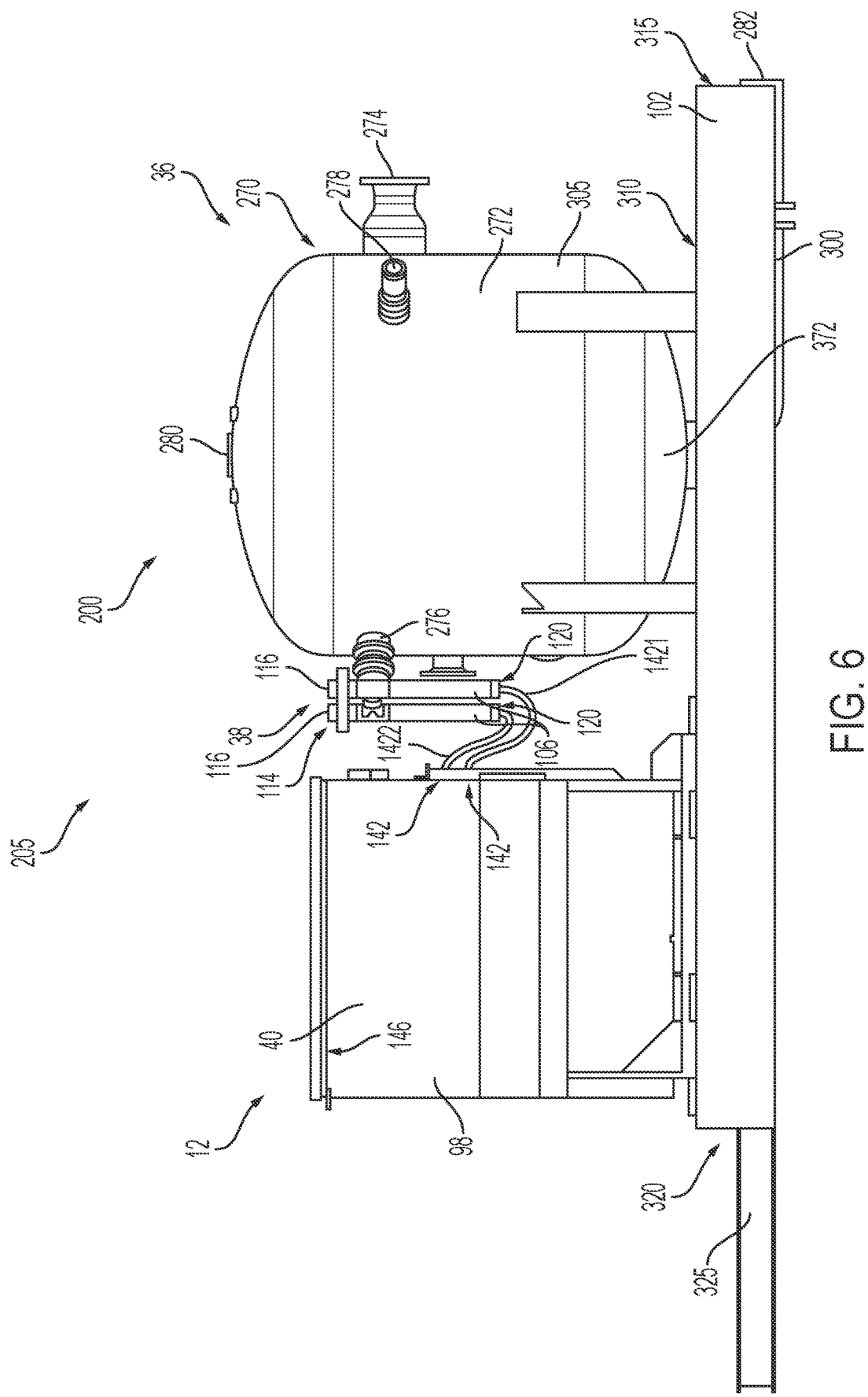
FIG. 6 is a schematic side view of an example vacuum and material collector assembly with sound attenuation assembly, according to embodiments of the disclosure.
Figure 7:
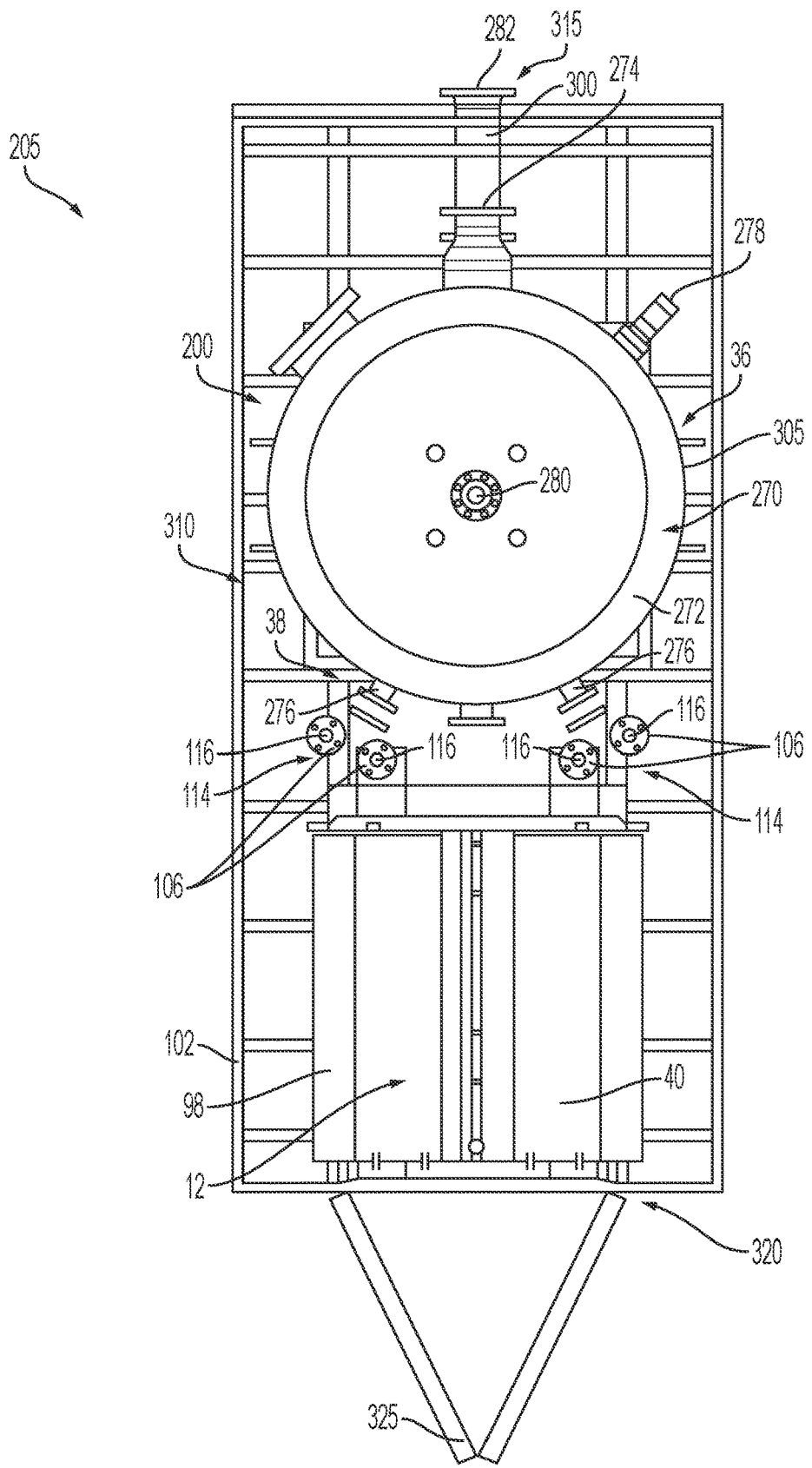
FIG. 7 is a schematic top view of an example vacuum and material collector assembly with sound attenuation assembly, according to embodiments of the disclosure.

Each of the one or more vacuum generators 106 may include an exhaust port 120 coupled to one or more inlet ports 142 of sound attenuating chamber 40 by one or more tubular members or conduits 1421, 1422, as shown in FIG. 6. The exhaust ports 120 provide fluid flow from the one or more vacuum generators to the sound attenuation chamber. Each of the one or more vacuum generators 106 may be driven using the pressurized fluid from the fluid source 42 (and/or other sources of pressurized fluid, such as other fluid sources (e.g., mobile fluid supplies)). In particular, each of the one or more vacuum generators 106 may include one or more fluid supply ports 116 configured to receive pressurized fluid from a fluid source of pressurized fluid.

Exemplary vacuum and material collector assembly 200 may further include an inlet port 274 positioned on the housing 272 in order to provide access to the interior 289 when pneumatically connected to the material source. The vacuum source 38 is operable to generate vacuum flow between the waste material source and the interior 289 of the pressure vessel 270. In particular, the vacuum source 38 is configured to draw the material 16 from the material source into the interior 289 of the material collector 36 and deposit the material 16 therein. In some embodiments, the pressure vessel 270 is a large capacity pressure vessel 270 having an interior 289 with a volume equivalent to at least 40 United States barrels of oil. In some embodiments, the interior 289 of pressure vessel 270 comprises a volume of at least 6,000 liters.

The housing 272 of pressure vessel 270 may include one or more housing walls 305 substantially surrounding the interior 289 of the pressure vessel 270. The housing 272 as well as interior 289 defined by housing 272 may be substantially spherical or bulbous. The pressure vessel 270 may also include a relief port 278 positioned on the housing 272 and pneumatically connected to an ambient environment. The relief port may be operable to relieve the vacuum, or a portion thereof, from the interior 289.

The pressure vessel 270 may also include a discharge port 282 coupled to the housing 272. The discharge port 282 is operable to discharge material 16 from the interior 289 of pressure vessel 270. The discharge port 282 may be coupled to the housing 272 via discharge pipe 300. In some embodiments, pressure vessel 270 includes a fluid supply port 280 positioned on the housing 272. The fluid supply port 280 may be pneumatically coupled to a fluid supply source 42 and is operable to pressurize the interior 289 with the fluid supply so as to increase the rate of discharge of material 16 from interior 289 through discharge port 282. The relief port 278 may also be used to equalize the pressure in the interior 289 form the vacuum to ambient pressure in order to facilitate discharge of the material 16 from the interior 289 through the discharge port 282.

The lower portion 372 of housing 272 may have a bowl shape between the inlet port 274 and the vacuum port 276 with inlet port 274 and vacuum port 276 positioned on the housing 272 above the bowl shape in order to trap the material 16 in the interior 289 as well as to facilitate discharge of the material 16 through discharge pipe 300 and discharge port 282. The discharge port 282 is fluidly connected to the bowl shape so as to gravity feed the trapped material 16 out of the interior 289 to the discharge port 282.

As depicted in FIG. 4, unified vacuum, material collector, and attenuation assembly 205 includes a sound attenuation assembly 12 coupled to the vacuum source 38. The sound attenuation assembly 12 is operable to attenuate sound generated by the vacuum source 38. As depicted in FIG. 4, the sound attenuation assembly may include a sound attenuation chamber 40 connected to the vacuum source 38. The sound attenuation chamber 40 may include an attenuation housing 98 at least partially defining a chamber interior volume 140 being positioned to receive at least a portion of the vacuum flow 26 from the vacuum source 38 and attenuate sound generated by the vacuum source 38. The attenuation housing 98 substantially seals the chamber 40 interior volume 140 from the ambient environment. In at least some embodiments, the sound attenuation chamber 40 is configured to reduce sound emitted during operation of the vacuum source by an amount ranging from ten percent to forty percent. One or more of the plurality of vacuum generators 106 may comprise a venturi mechanism 114 configured to receive pressurized fluid from a fluid source of pressurized fluid and use a venture effect to generate a vacuum flow 26 between the material source and the vacuum and material collector assembly.

Figure 5:
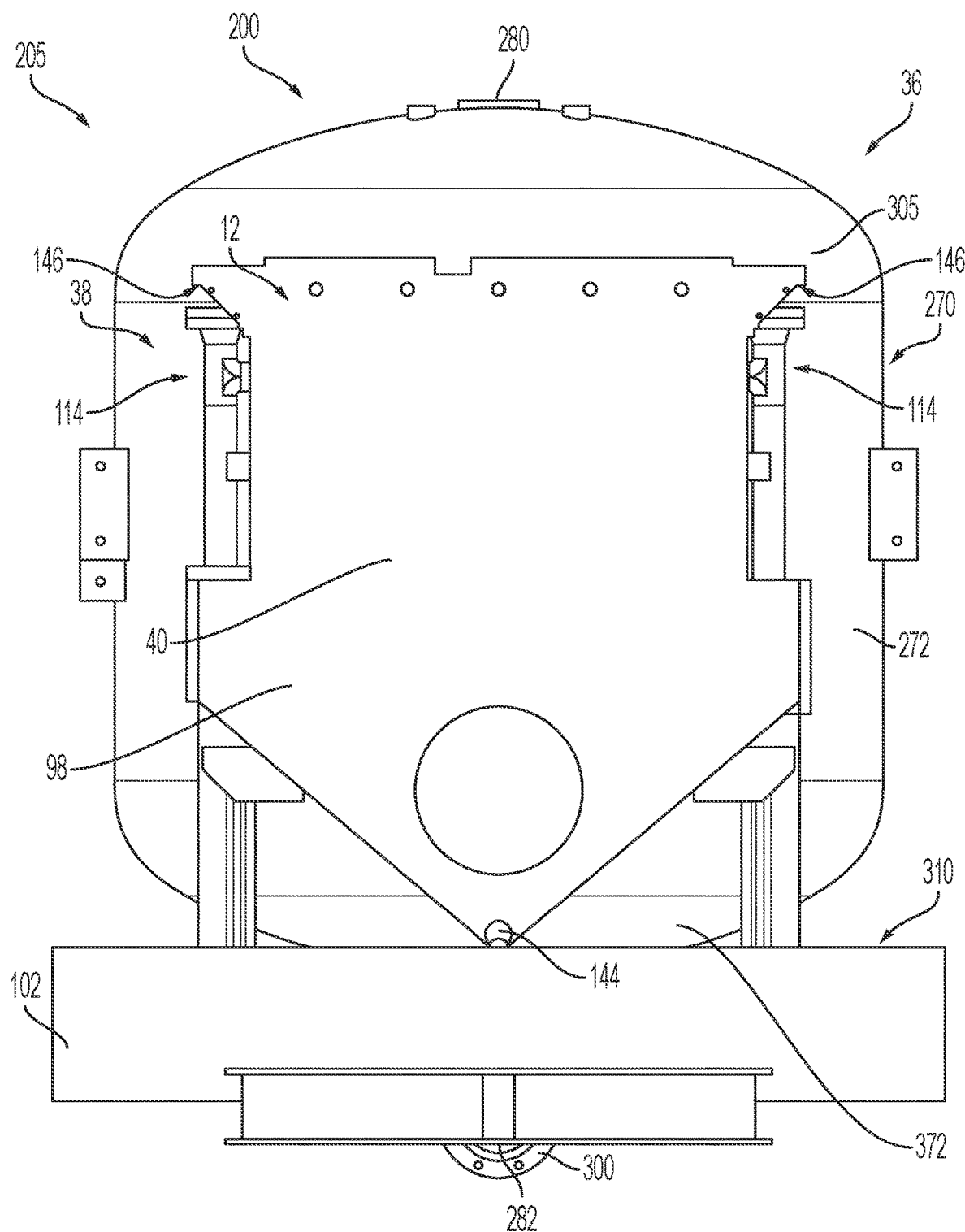
FIG. 5 is a schematic end view of an example vacuum and material collector assembly with sound attenuation assembly, according to embodiments of the disclosure.
Figure 11:
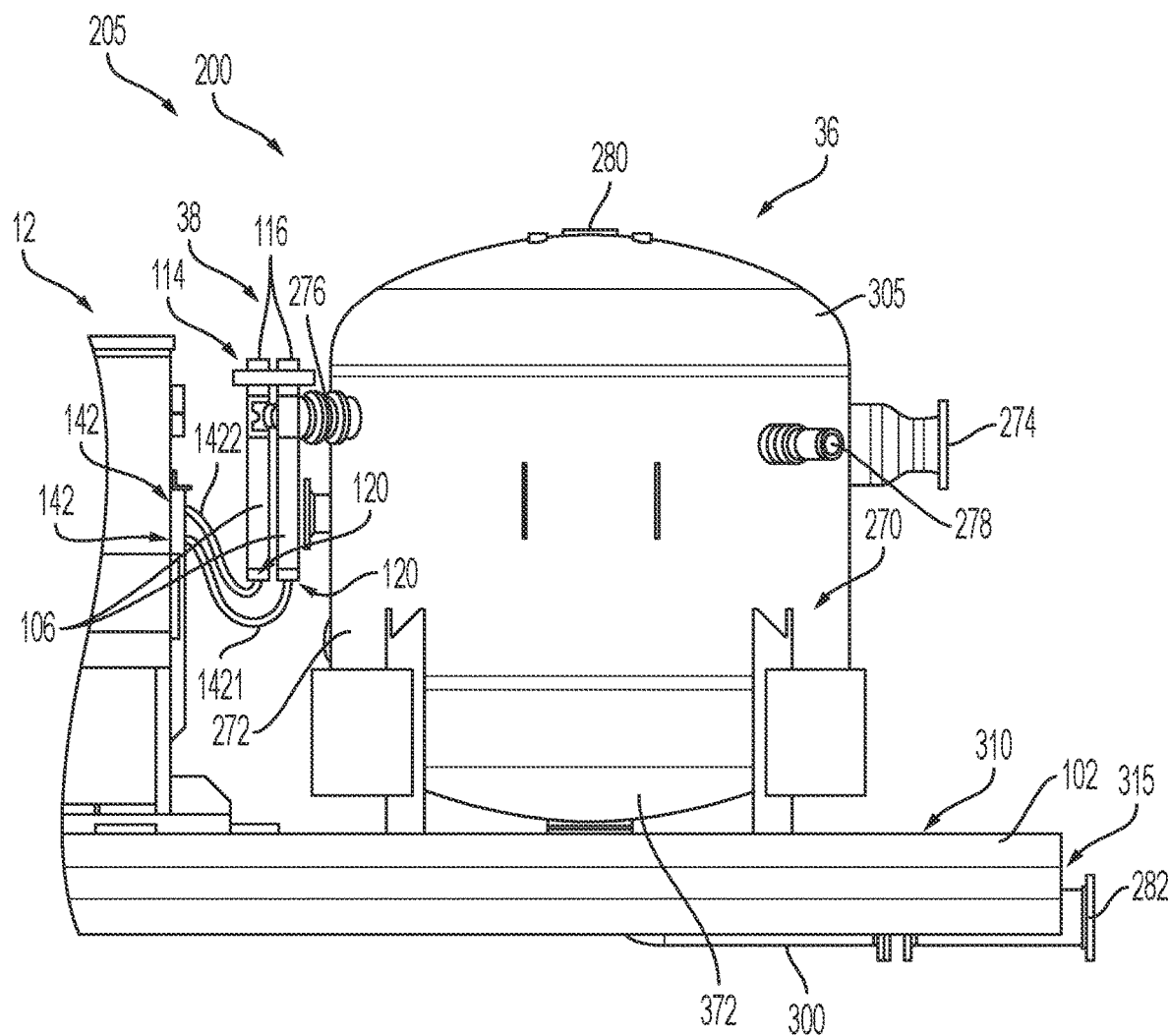
FIG. 11 is a schematic close-up side view of an example material collector having a vacuum source, according to embodiments of the disclosure.

The attenuation housing 98 may include one or more chamber inlet ports 142 configured to receive the vacuum flow from the vacuum source 38. In some instances, the chamber inlet ports 142 may be coupled with a respective one of the exhaust ports 120 of the vacuum generators 106, for example by conduits 1421, 1422, as shown in FIGS. 6 and 11, and conduits 1421, 1422, 1423, 1424 shown in FIG. 9. In some cases, the vacuum flow from exhaust ports 120 to chamber inlet ports 142 may include a portion of the material extracted from the material source. The attenuation housing 98 may also include one or more chamber exhaust ports 146 configured to reduce backpressure on flow of the vacuum flow into the attenuation chamber, as shown in FIGS. 4-6. Attenuation housing 98 may also include one or more chamber discharge ports 144 configured to facilitate removal of a portion the material extracted from the material source from the chamber interior volume of the sound attenuation chamber 40. In some instances, the one or more chamber exhaust ports 144 may have a cross-sectional area greater than a cross-sectional area of the one or more chamber inlet ports 142.

As depicted in FIG. 4, the vacuum source 38, the material collector 36, and the sound attenuation assembly 12 are connected to one another to form a unified vacuum, material collector, and attenuation module 205. The unified vacuum, material collector, and attenuation module 205 may further include a chassis 102 capable of supporting the vacuum source 38, the material collector 36, and the sound attenuation chamber 12. The chassis 102 may include wheels 104 and be configured to be transported between geographical locations. The discharge port 282 and the discharge pipe 300 may be disposed below the upper surface 310 of the chassis 102. The discharge port 282 may be substantially positioned at an end 315 of the mobile chassis 102 supporting the vacuum source 38, the material collector 36, and the sound attenuation assembly 12. In some instances, the discharge port 282 may be positioned at a first end 315 of the chassis 102 while a hitch 325 operable to couple the chassis 102 to a mobile locomotion source is positioned at a second opposite end 320 of the chassis 102. The discharge port 282 may be coupled to a lower portion of the pressure vessel housing 372 via a discharge pipe 300 extending from the housing to a terminal end 315 of the mobile chassis. The discharge pipe 300 may include a straight portion 301 and an elbow portion 302 allowing the discharge pipe 300 to connect to the lower portion of the housing 372 disposed about an upper surface 310 of the chassis 102.

As depicted in FIG. 4, unified vacuum, material collector, and attenuation module 205 includes a vacuum source 38 configured to be connected to a material collector 36 through which the vacuum flow passes, drawing the material from the material source into the material collector 36. In some embodiments, the vacuum source 38 is configured to draw a minor portion of the material into the sound attenuation chamber 40 and deposit a major portion of the material in the material collector 36.

Figure 8:
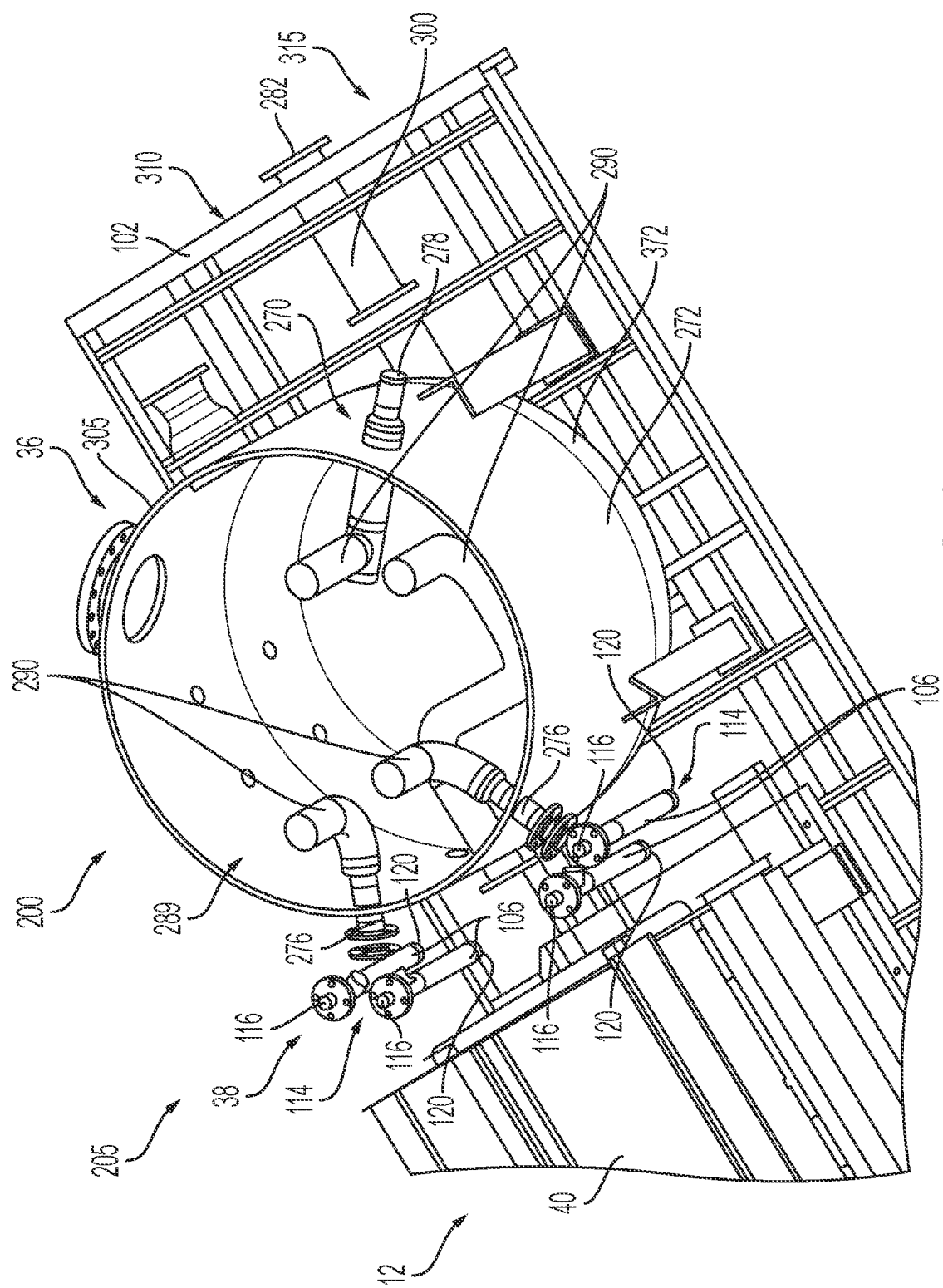
FIG. 8 is a schematic close-up perspective interior view of an example material collector having a vacuum source, according to embodiments of the disclosure.
Figure 9:
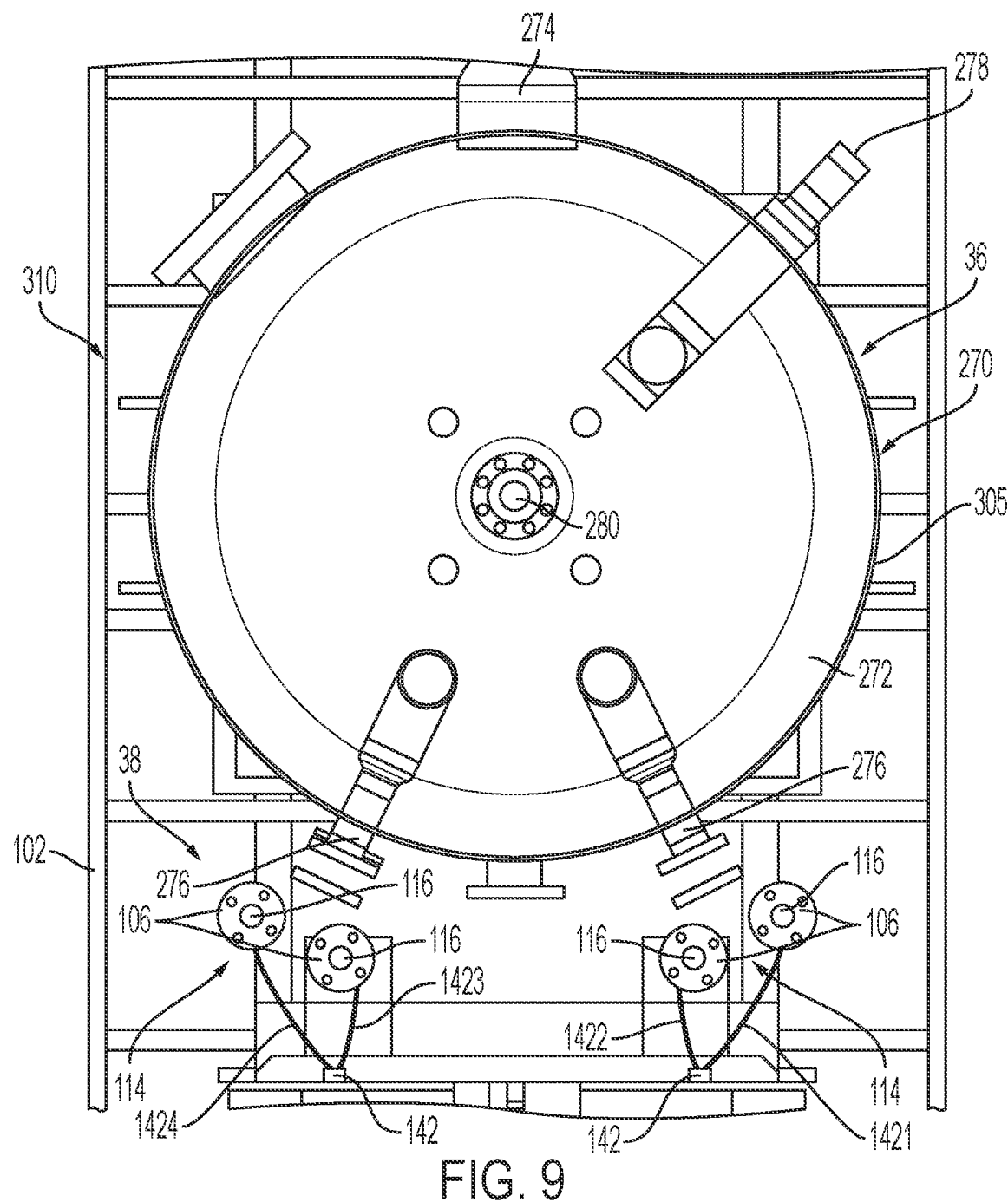
FIG. 9 is a schematic close-up top view of an example material collector having a vacuum source, according to embodiments of the disclosure.

As shown in FIG. 8, pressure vessel 270 may further include one or more extensions 290 disposed about the interior 289 and coupled with one or more ports in housing 272. In some embodiments, extensions 290 may pneumatically connect inlet port 274, vacuum port 276, and/or relief port 278 to locations within interior 289. An extension 290 may also connect the lower portion 372 of the housing 272 to discharge pipe 300. Extensions 290 may include tubular members that establish fluid flow paths from the aforementioned ports to the locations within interior 289 to reduce the likelihood of undesired material exiting interior 289 through one of the ports. The locations may be positioned towards an upper portion of interior 289 (while the undesired material 16 may generally fill interior 289 from bottom up). Extensions 290 may reduce the likelihood of undesired material 16 exiting interior 289 through any of the aforementioned ports. For example, undesired material 16 may generally be positioned towards the lower portion of interior 289 by gravity force. The extensions may allow more undesired material 104 to be received into interior 289 without having the undesired material 104 flow out of the aforementioned ports. Extensions 290 may allow for ports more flexibility in positioning on housing 272 without risking undesired material exiting interior 289.

The sound attenuation chamber 40, in some embodiments, may include an attenuation housing 98 at least partially defining a chamber interior volume 140 positioned to receive at least a portion of the vacuum flow from the vacuum source 38 and attenuate sound generated by the vacuum source 38 during operation. The attenuation housing 98 may substantially seal the interior volume 140 from the ambient environment. The attenuation housing 98 may include one or more walls or other structural members to at least partially seal the interior volume 140.

In some embodiments, to filter undesired material 16 entering the sound attenuation chamber 40, the sound attenuation chamber 40 may include one or more inlet ports 142, one or more discharge ports 144, and/or one or more exhaust ports 146. At least some of the ports may be positioned on the attenuation housing 98 to provide access to the interior volume 140 from outside of the attenuation housing 98. For example, the respective ports may include holes, apertures and/or other structures through one or more walls of the attenuation housing 98 that enable access to interior volume 140.

The inlet ports 142 may be pneumatically connected to the vacuum source 38. When pneumatically connected to the vacuum source 38, the inlet ports 142 may receive vacuum-induced flow 26 from the vacuum source 38. The minor portion of the undesired material 16 may be entrained in vacuum-induced flow 26, thereby presenting a potential contamination hazard if exhausted into the ambient environment without further filtering and/or treatment.

The exhaust ports 146, in some embodiments, may be pneumatically connected to the ambient environment. The fluid flow path through the material extraction assembly may end at the exhaust ports 146. Consequently, in some embodiments, vacuum-induced flow 26 drawn from the source of the fluid (e.g., the reaction vessel 14, FIG. 1) and through the flow path may exit the flow path through the exhaust ports 146. The interior volume 140 may be in the flow path between the inlet ports 142 and the exhaust ports 146, such that vacuum-induced flow 26 flows through the interior volume 140 prior to being exhausted into the ambient environment.

In some embodiments, to partially attenuate sound, the exhaust ports 146 are of substantially larger size than the inlet ports 142. The size difference between these ports may reduce or eliminate backpressure on the vacuum-induced flow 260. The flow path may expand greatly in cross-sectional area as the vacuum-induced flow 26 transitions from the inlet ports 142 into the interior volume 140. As a result, any sound generated by the vacuum-induced flow 26 may generally occur at an interface between the inlet ports 142 and the interior volume 140. In some embodiments, accordingly, the sound attenuation chamber 40 may, in part, dissipate the sound generated by the vacuum-induced flow 26 by generating it within the sound attenuation chamber 40, for example, such that the sound will dissipate prior to exiting the sound attenuation chamber 40.

Figure 10:
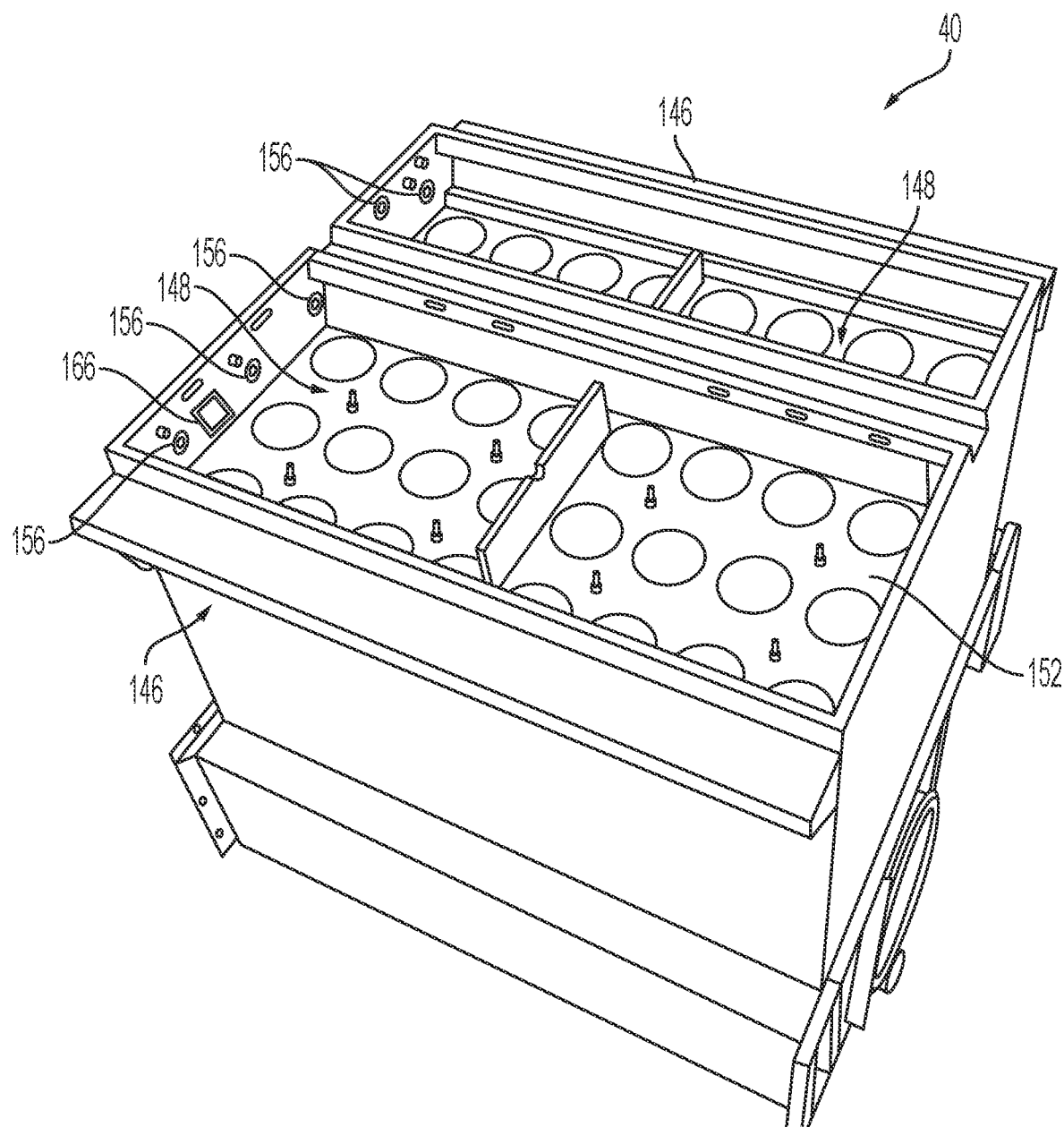
FIG. 10 is a schematic top perspective view of an example sound attenuation assembly, with example filter media visible, according to embodiments of the disclosure.

In some embodiments, to filter undesired material 16 prior to exhaustion to the ambient environment, the interior volume 140 may include a filter media region 148, as depicted in FIG. 10. The filter media region 148 may include a portion of the interior volume 140 in which filter media 150 may be positioned. The filter media region 148 may be positioned, for example, such that the vacuum-induced flow 26 must substantially flow through the filter media region 148 prior to being exhausted through the exhaust ports 146 to the ambient environment. In some embodiments, the interior volume 140 may include a filter media support plate 152. The filter media support plate 152 may be configured to support the filter media 150 within the filter media region 148. In some embodiments, the filter media support plate 152 may generally divide the interior volume 140 into two or more sections and may include holes through which the vacuum-induced flow 26 may travel between the sections. One or both sides of the filter media support plate 152 may include one or more baffles 154 configured to attenuate sound. The one or more baffles 154 may attenuate sound generated by the vacuum-induced flow 26, for example, prior to exhaustion out of the sound attenuation chamber 40.

In some embodiments, to filter undesired material 16 prior to exhaustion to the ambient environment, the sound attenuation chamber 40 may include filter media 150. The filter media 150 may be configured to filter the minor portion of the undesired material 16 from the vacuum-induced flow 26.

The filter media 150 may include any type of filter for removing material from fluid flows. The filter media 150 may also be sound absorptive and, in part, help to dissipate the sound generated by the vacuum-induced flow 26. The filter media 150 may, in some examples, exhibit a relatively limited filtration capacity. As filter media 150 filters the undesired material 16, its permeability to fluid flow may decrease.

To manage the filtration capacity of the filter media 150, in some embodiments, the sound attenuation chamber 40 may include one or more jet generators 156 positioned relative to the sound attenuation chamber 40 to generate jets of fluid flow directed toward the filter media 150 to at least partially maintain the filtration capacity of the filter media 150. For example, the jet generators 156 may be positioned to generate jets of fluid flow directed toward the filter media 150 to refresh the filtration capacity of filter media 150. For example, the jet generators 156 may be positioned outside the attenuation housing 98 and oriented facing into the filter media region 148.

When the jet generators 156 generate the jets, the jets may transfer material filtered by the filter media 150 out of the filter media 150 and into the interior volume 140. This may, in some embodiments, at least partially restore the permeability and/or the filtration capacity of the filter media 150. For example, the jets may cause undesired material 16 trapped in the filter media 150 to drop out of the filter media region 148, for example, through holes in the filter media support plate 152 and into interior volume 140.

To drive the jet generators 156, in some embodiments, the sound attenuation chamber 40 may include a jet fluid supply 158. The jet fluid supply 158 may be configured to store compressed fluid. In some embodiments, the jet fluid supply 158 may include a storage tank in which the compressed fluid is stored. The compressed fluid may be a gas, such as, for example, compressed air. The jet fluid supply 158 may be pneumatically coupled to the jet generators 156. The jet generators 156 may include one or more ports and one or more electrically driven actuators configured to control the rate at which the compressed fluid from the jet fluid supply 158 exits the jet generators 156. Thus, the jet generators 156 may modulate one or more of a strength of the jets of fluid flow, timing of the jets of fluid flow, or one or more other characteristics associated with the jets of fluid flow.

To fill the jet fluid supply 158, in some embodiments, the sound attenuation chamber 40 may include a fluid supply port 160. The fluid supply port 160 may be pneumatically connected to the jet fluid supply 158 to refill the jet fluid supply 158 with compressed fluid, for example, when another source of compressed fluid (e.g., the fluid source 42) is pneumatically coupled to the fluid supply port 160.

Figure 12:
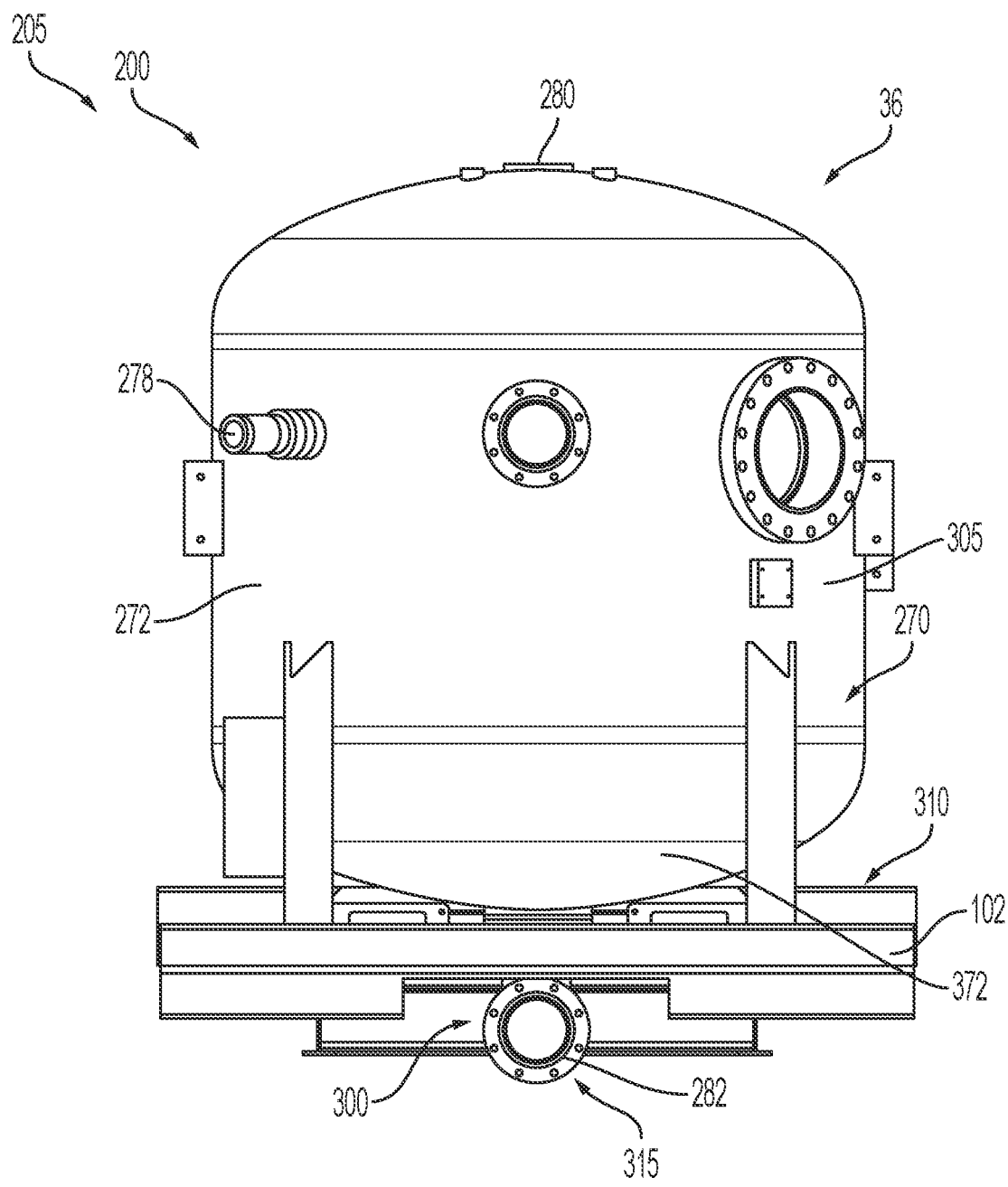
FIG. 12 is a schematic close-up side view of an example material collector having a vacuum source, according to embodiments of the disclosure.
Figure 13:
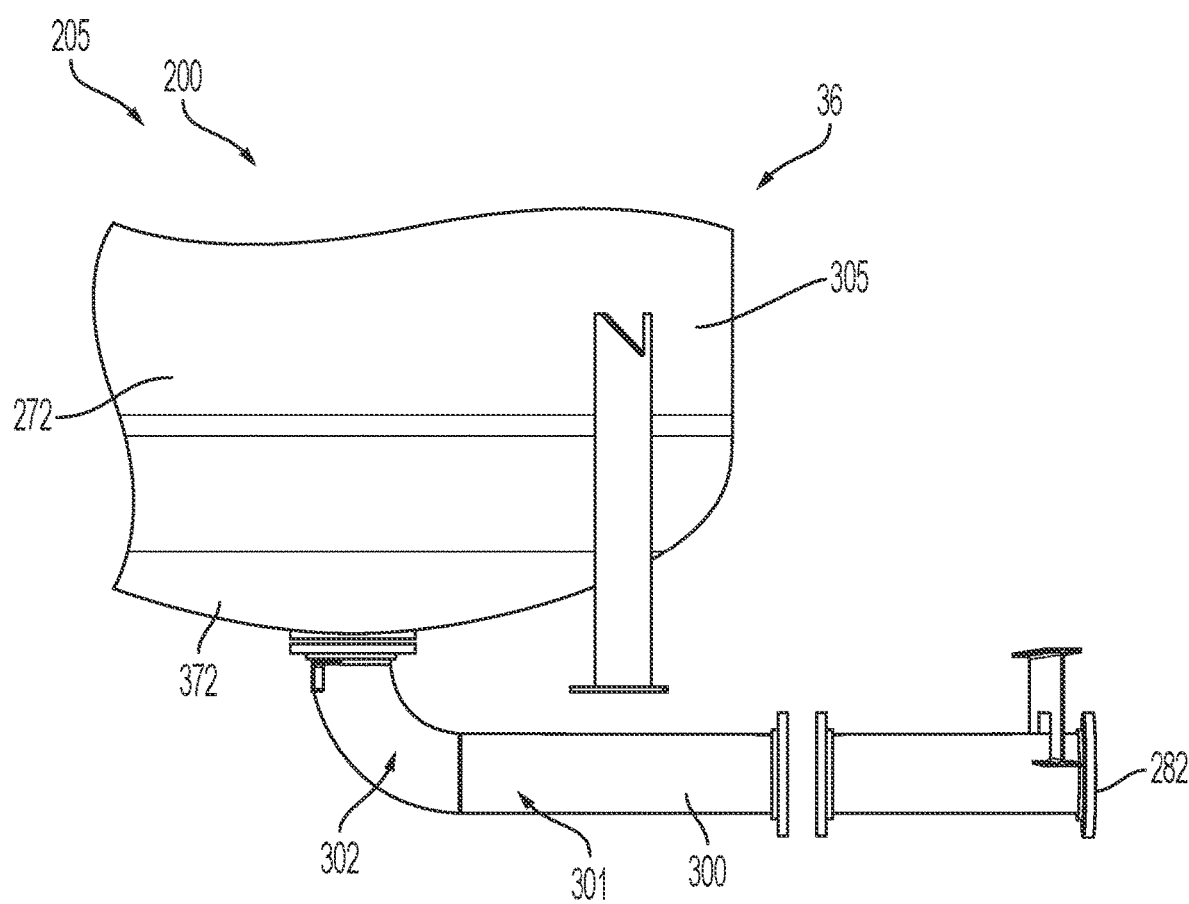
FIG. 13 is a schematic perspective view of an example bottom portion of a pressure vessel having a bowl shape coupled with an elbow-shaped discharge pipe connected to a discharge port, according to embodiments of the disclosure.

FIGS. 11-13 depict unified vacuum, material collector, and attenuation module 205 comprising vacuum source 38, material collector 36, and sound attenuation assembly 12 connected to one another to form a unified module 205. The unified vacuum, material collector, and attenuation module 205 further includes chassis 102 capable of supporting the vacuum source 38, the material collector 36, and the sound attenuation chamber 12. As shown in FIGS. 11-13, discharge port 282 and the discharge pipe 300 may be disposed below the upper surface 310 of the chassis 102. The discharge port 282 may be substantially positioned at an end 315 of the mobile chassis 102 thereby providing convenient access to discharge the material 16 from the interior 289 of pressure vessel 270. The discharge port 282 may be coupled to a lower portion of the pressure vessel housing 372 via a discharge pipe 300 extending from the housing to a terminal end 315 of the mobile chassis. The discharge pipe 300 may include a straight portion 301 and an elbow portion 302 allowing the discharge pipe 300 to connect to the lower portion of the housing 372 disposed about an upper surface 310 of the chassis 102, as depicted in FIG. 13.

Figure 14:
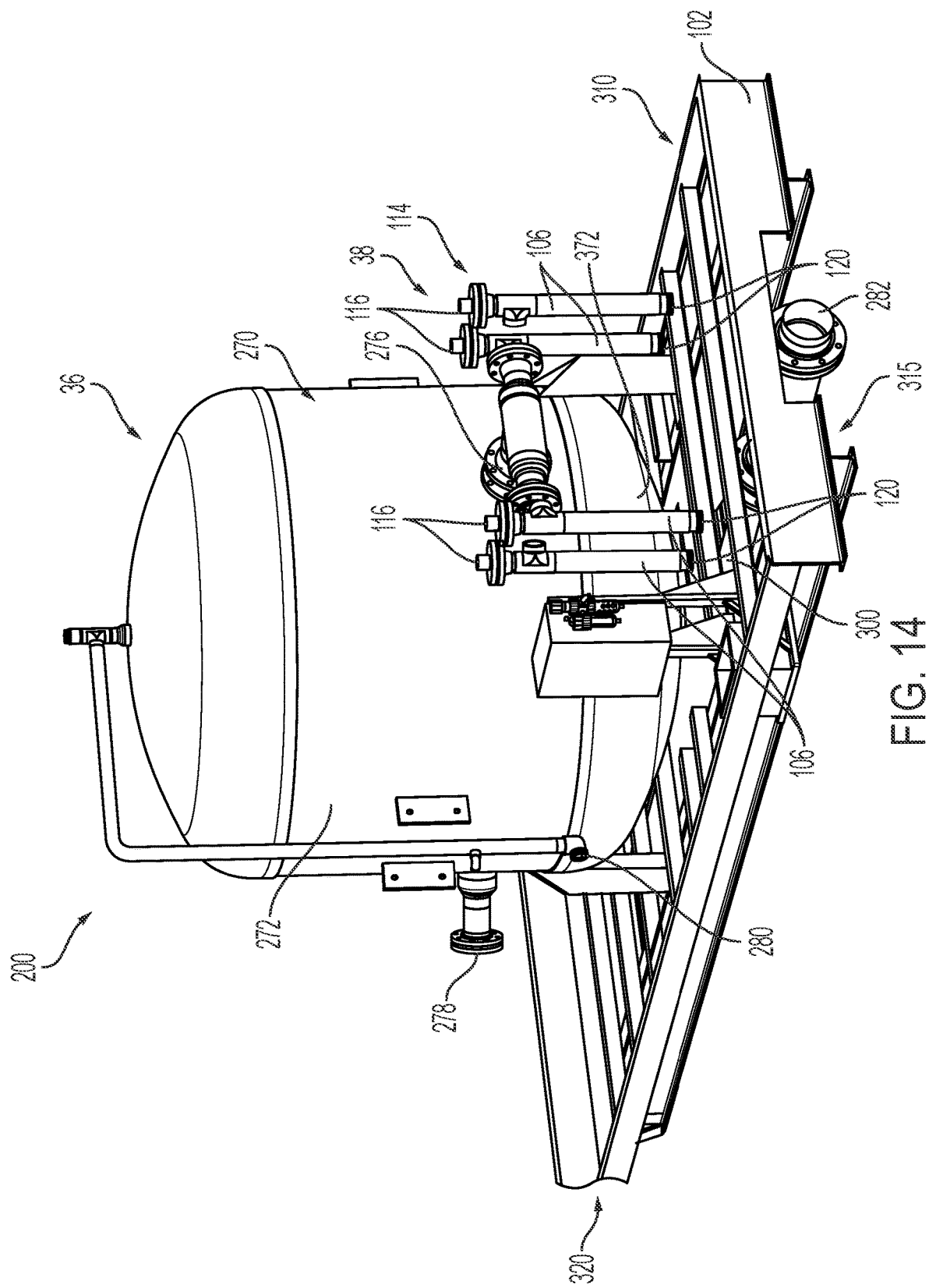
FIG. 14 is a schematic close-up side view of an example unified vacuum and material collector assembly, according to embodiments of the disclosure.
Figure 15:
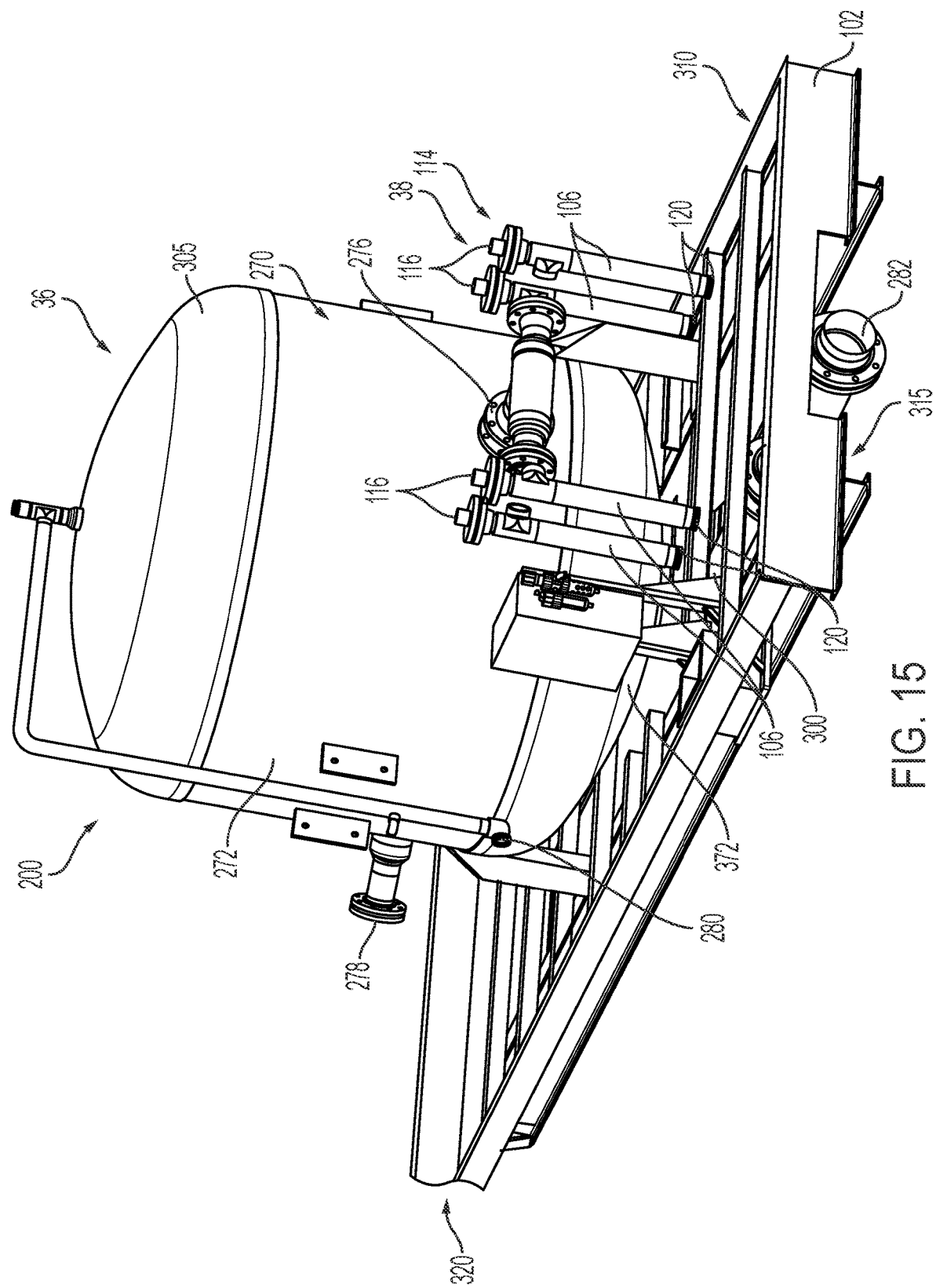
FIG. 15 is a schematic perspective end view of an example unified vacuum and material collector assembly, according to embodiments of the disclosure.
Figure 16:
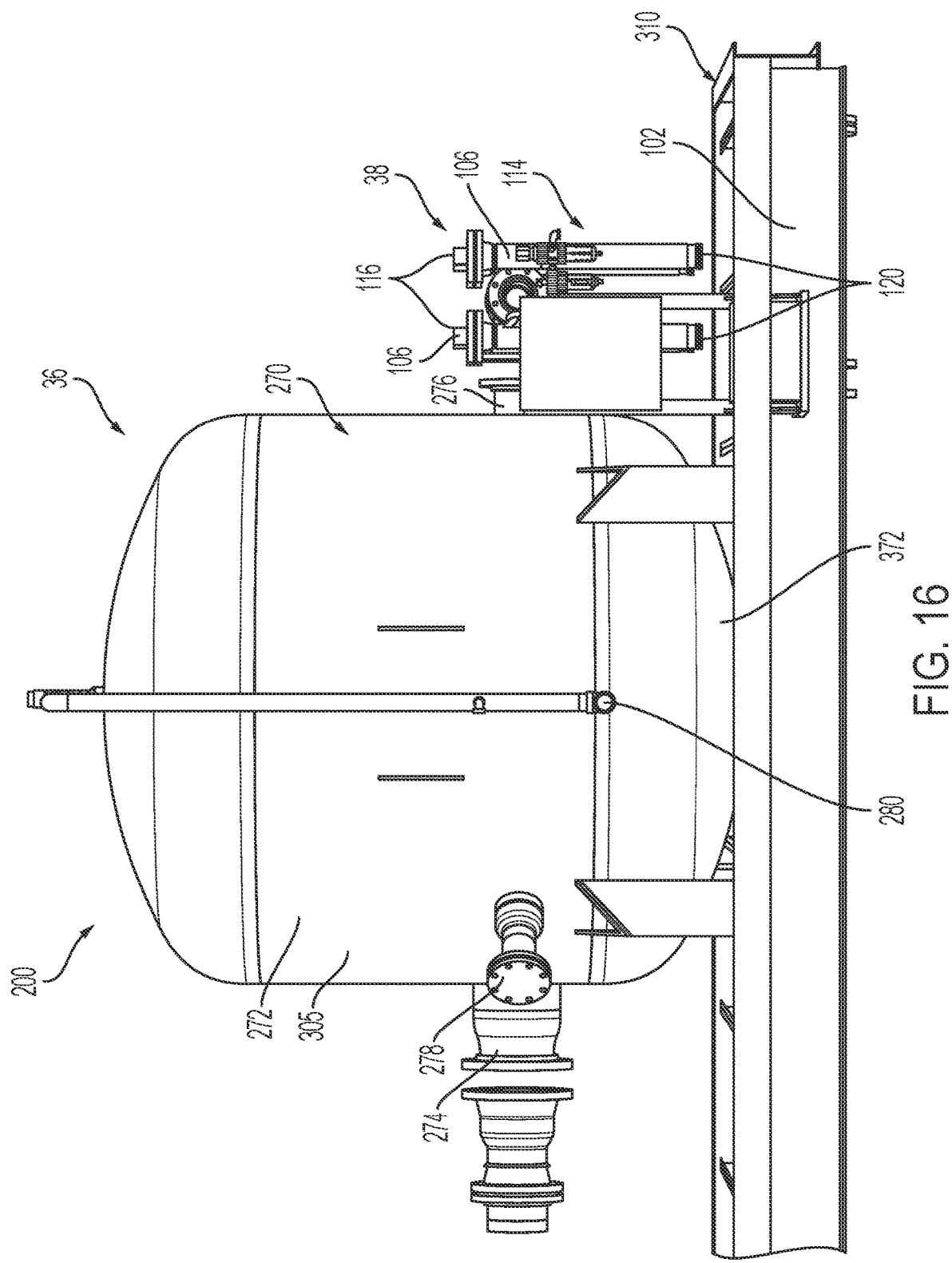
FIG. 16 is a schematic perspective side view of an example unified vacuum and material collector assembly, according to embodiments of the disclosure.

FIGS. 14-16 depict a unified vacuum and material collector assembly 200, such as that shown in FIG. 2. As shown in FIGS. 14-16, unified vacuum and material collector assembly 200 may be disposed on a single mobile chassis 102, rather than the separate material collector and vacuum source shown in FIG. 1. Vacuum and material collector assembly 200 may be used to extract material 16 from a waste source, such as reaction vessel 14. In particular, assembly 200 may be operable to generate a high-pressure vacuum of fluid flow in an interior 289 of material collector 36 when connected to the material source by a pneumatic connection which extends between the material source and the interior 289, such as pneumatic connection 46 in FIG. 2. Assembly 200 is further operable to transfer using vacuum source 38 at least a portion of the material from the material source to the interior 289 through the pneumatic connection. After collecting the material 16 to the interior 289 of pressure vessel 270, the assembly 200 may then be mobilized away from the material source to a waste disposal site on a single chassis 102. The material 16, or a portion thereof, may then be discharged from the interior 289 through discharge port 282 coupled to the housing 272 to a disposal receptacle at the waste disposal site. The discharge port 282 may be substantial positioned at an end 315 of mobile chassis 102 for convenient discharging of the material.

Figure 17:
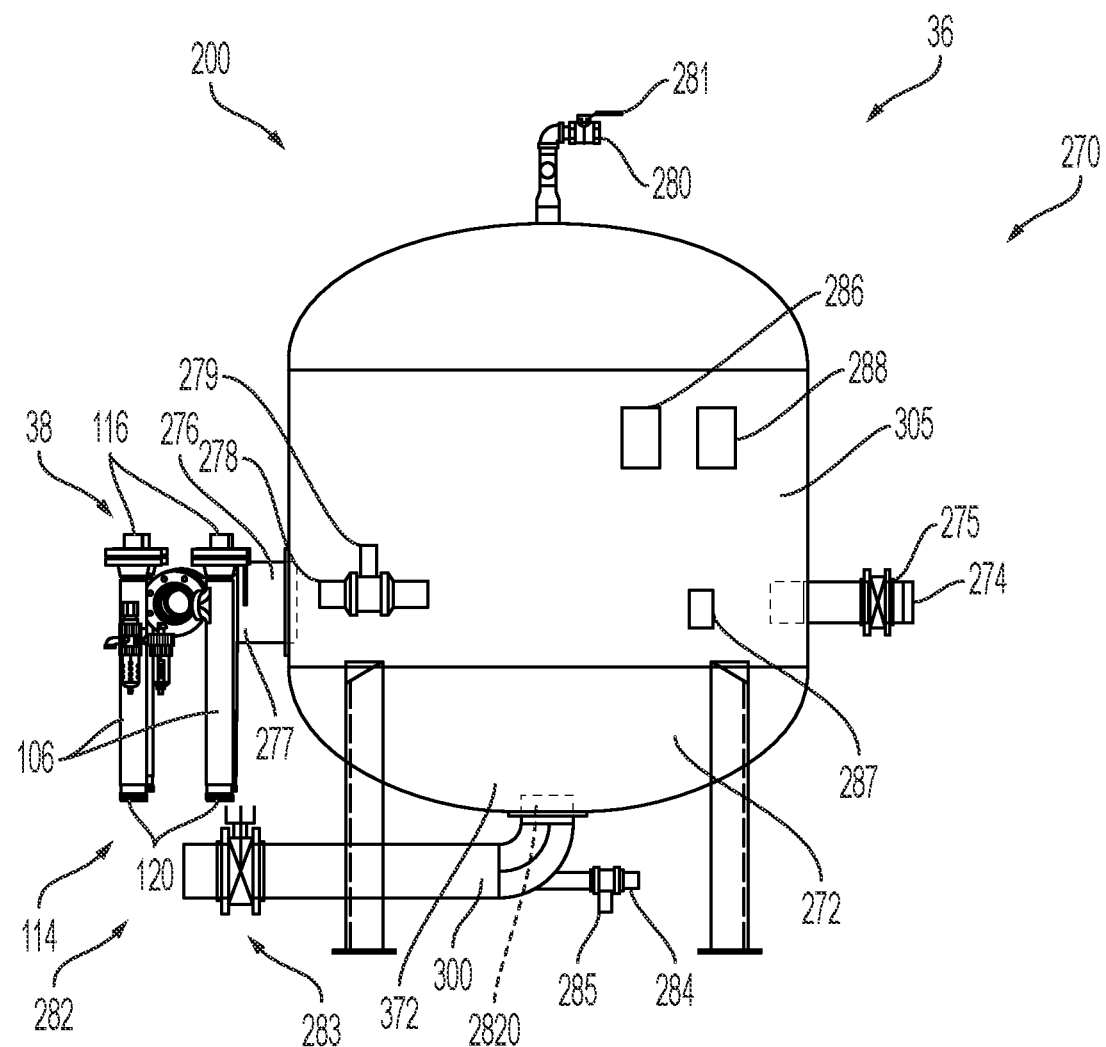
FIG. 17 is a schematic perspective cross-sectional view of an example unified vacuum and material collector assembly, according to embodiments of the disclosure.
Figure 18:
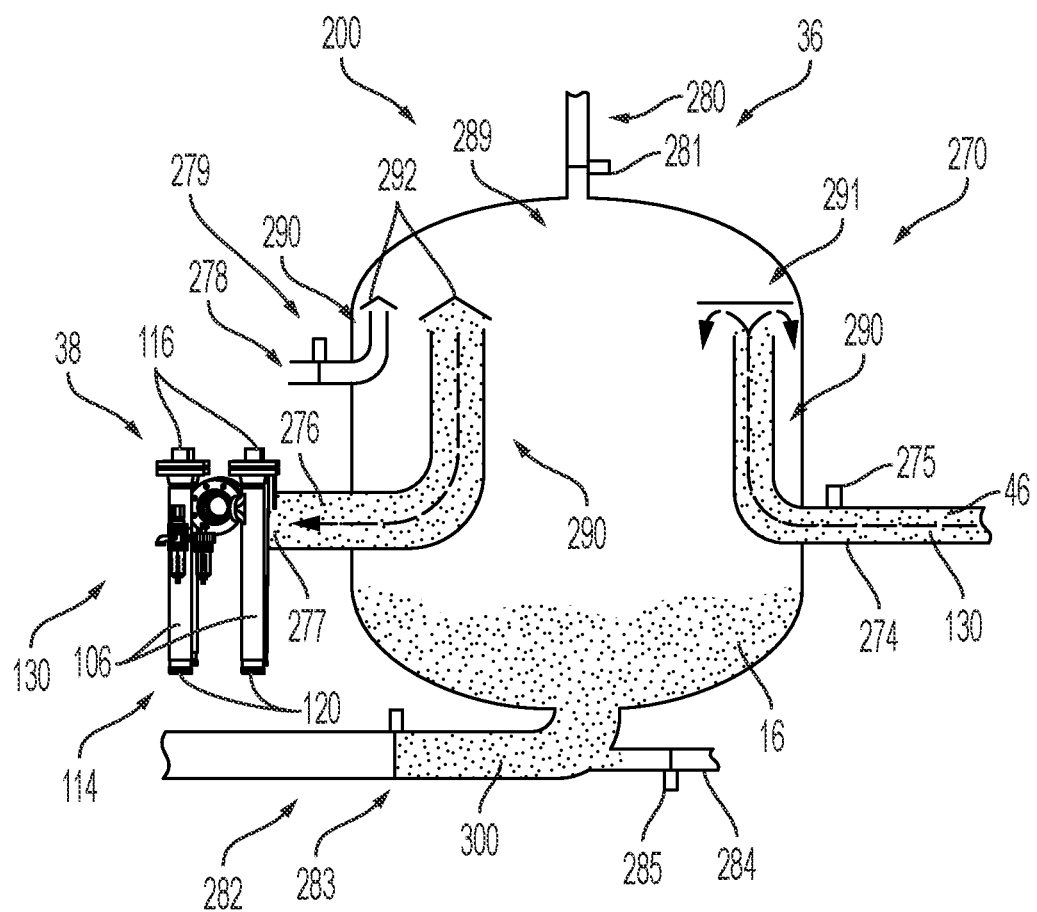
FIG. 18 is a schematic perspective cross-sectional view of an example unified vacuum and material collector assembly demonstrating a material extraction process, according to embodiments of the disclosure.
Figure 19:
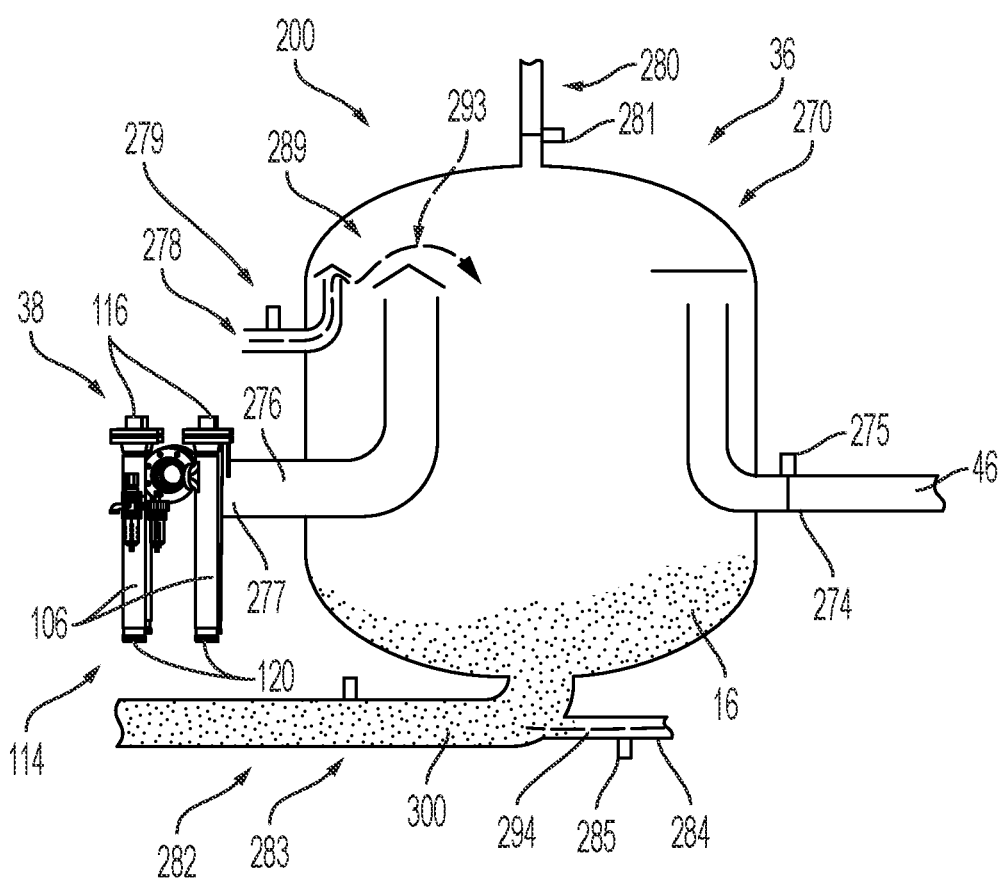
FIG. 19 is a schematic perspective cross-sectional view of an example unified vacuum and material collector assembly demonstrating a material discharge process, according to embodiments of the disclosure.
Figure 20:
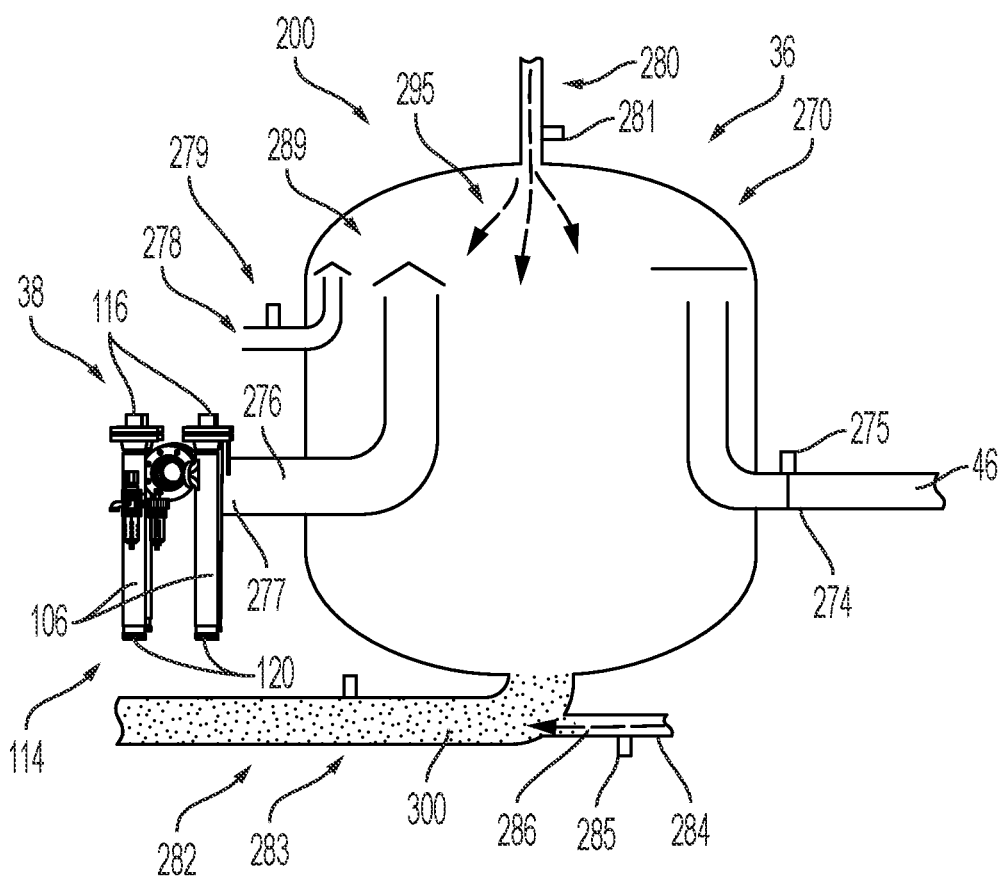
FIG. 20 is a schematic perspective cross-sectional view of an example unified vacuum and material collector assembly demonstrating a material discharge process, according to embodiments of the disclosure.
Figure 21:
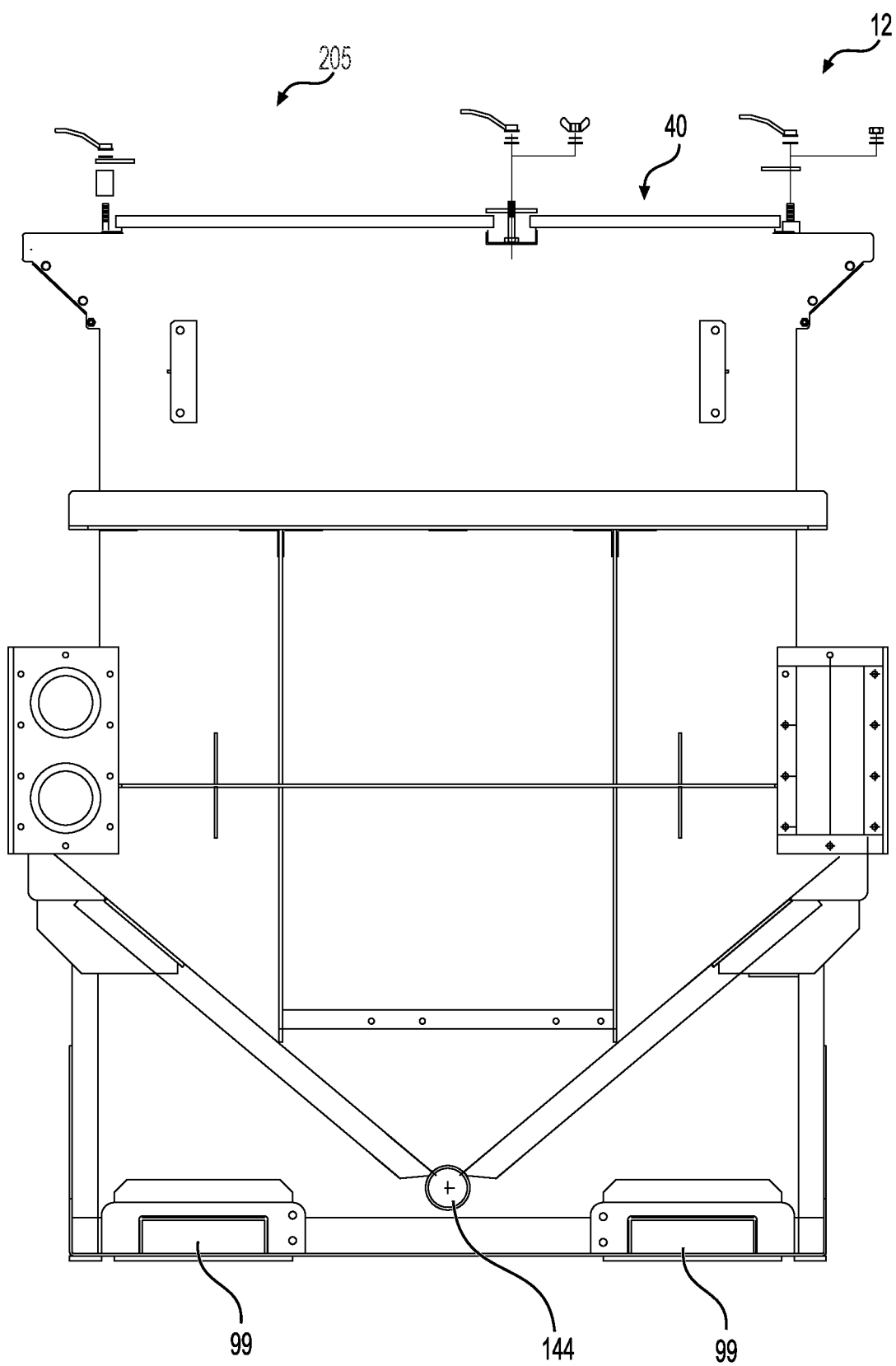
FIG. 21 is a schematic end view of the example sound attenuation assembly, according to embodiments of the disclosure.
Figure 22:
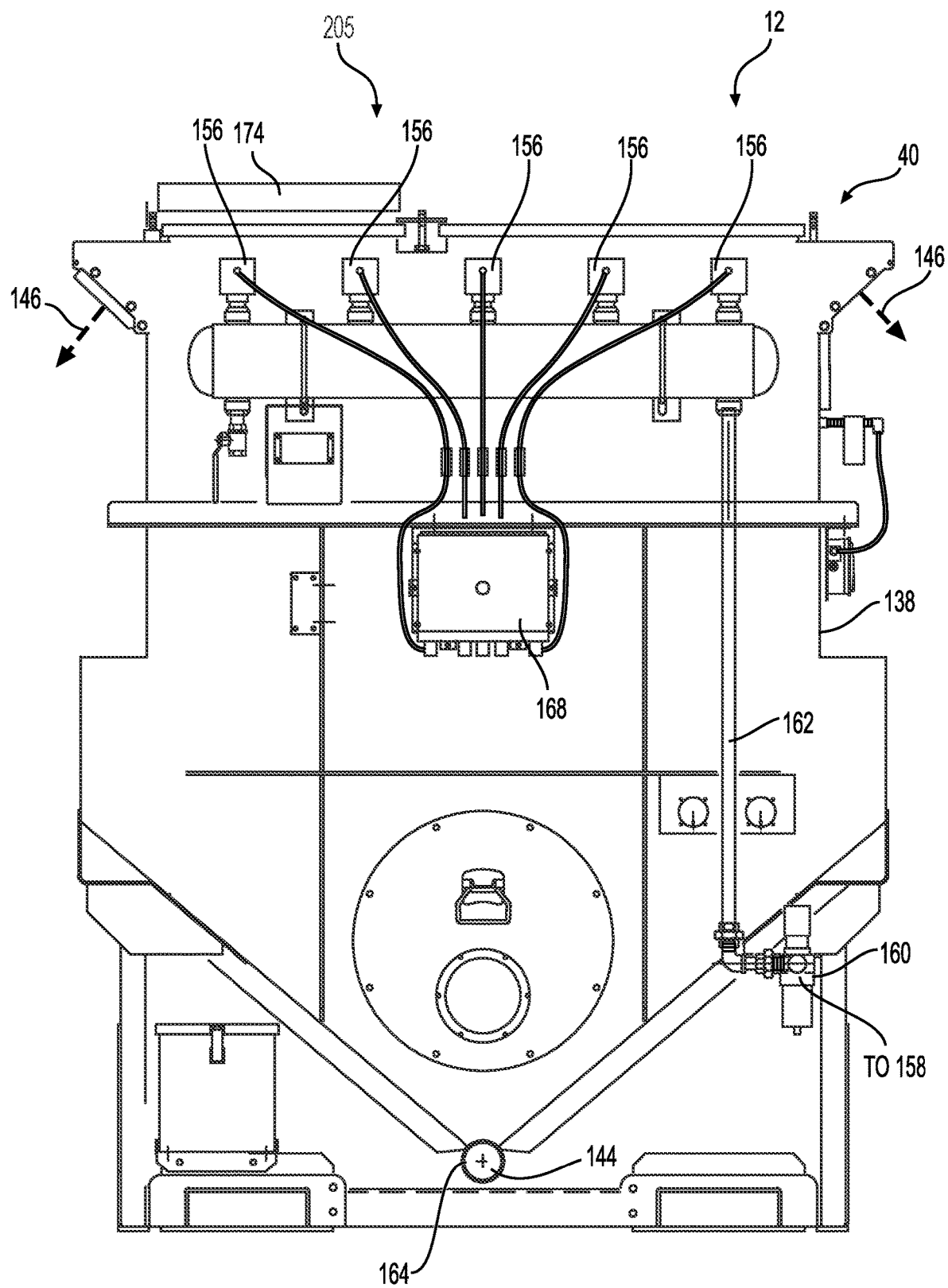
FIG. 22 is a schematic end view of the example sound attenuation assembly, showing an example sound attenuation chamber end, according to embodiments of the disclosure.

FIGS. 17-20 depict the operation and method of use of unified vacuum and material collector assembly 200 according to an exemplary embodiment of the present disclosure. As depicted in FIG. 17, vacuum and material collector assembly 200 includes pressure vessel 270. Pressure vessel 270 may be a physical structure through which the fluid flow with undesired material 16 may flow along the fluid flow path.

Generally, pressure vessel 270 may allow for undesired material to be separated from an environment by transferring the undesired material to pressure vessel 270 with high-pressure vacuum. To do so, pressure vessel 270 may include housing 272. Housing 272 may include any number of walls 305 or other physical structures that surround interior 289. Generally, interior 289 may be substantially sealed off from the ambient environment by housing 272 so that a vacuum may be applied to interior 289 and a fluid flow path through interior 289 may be established. In one embodiment, interior 289 is pulled to various pressures (e.g., vacuum, ambient, elevated) to drive various fluids into or out of interior 289 through various ports. The ports may be connected to other components to pressurize interior 289 to desired pressures, to establish fluid flows through interior to transfer undesired materials 16 from reaction vessel 14 (or other locations) into interior 289, and/or to remove undesired materials 16 from interior 289.

To transfer undesired materials 16 to interior 289, in one embodiment, pressure vessel 270 includes inlet port 274. Inlet port 274 may be positioned on housing 272 and allow for access to interior 289 from outside of housing 272. Inlet port 274 may include a hole or other structure through housing 272 that allows for interior 289 to be pneumatically connected to other components (e.g., to place interior 289 in a fluid flow path). In one embodiment, inlet port 274 is pneumatically connected to manifold 14 to pneumatically connect interior 289 to zones of reaction vessel 14. When connected to these ports, fluid flow including undesired material 16 from reaction vessel 14 may flow into interior 289 through inlet port 274 while interior 289 is drawn to a high-pressure vacuum (e.g., with vacuum port 276).

To manage the flow of fluid through inlet port 274, in one embodiment, pressure vessel 270 includes inlet port control valve 275. Inlet port control valve 275 may be positioned to reversibly seal (partially or completely) inlet port 274. For example, inlet port control valve 275 may reversibly block a fluid flow path through inlet port 274 into interior 289. Inlet port control valve 275 may include a motor or other type of actuator usable to modulate the level of restriction through inlet port 274. In one embodiment, inlet port control valve 275 is operable using electrical power. Inlet port control valve 275 may be operably connected to control valves drive unit 286, discussed below.

To apply high-pressure vacuum to interior 289, in one embodiment, pressure vessel 270 includes vacuum port 276. Vacuum port 276 may be positioned on housing 272 and allow for access to interior 289 from outside of housing 272. Vacuum port 276 may include a hole or other structure through housing 272 that allows for interior 289 to be pneumatically connected to other components. In one embodiment, vacuum port 276 is pneumatically connected to vacuum source 300. Vacuum source 38 may apply vacuum to interior 289 via vacuum port 276 thereby establishing a fluid flow into inlet port 274, through interior 289, and out of vacuum port 276.

To manage the flow of fluid through vacuum port 276, in one embodiment, pressure vessel 270 includes vacuum port control valve 277. Vacuum port control valve 277 may be positioned to reversibly seal (partially or completely) vacuum port 276. For example, vacuum port control valve 277 may reversibly block (or limit) a fluid flow path through vacuum port 276 into interior 289. Vacuum port control valve 277 may include a motor or other type of actuator to modulate the flow of fluid through vacuum port 276. In one embodiment, vacuum port control valve 277 is operable using electrical power. Vacuum port control valve 277 may be operably connected to control valves drive unit 286, discussed below.

Once undesired material 16 is transferred into interior 289, it may need to be removed before pressure vessel 270 may continue to be used. To remove undesired material from interior 289, in one embodiment, pressure vessel 270 includes discharge port 282. Discharge port 282 may be positioned on housing 272 to provide access to interior 289 from outside of housing 272. Discharge port 282 may include a hole or other structure through housing 272 that allows for interior 289 to be pneumatically connected to other components. In one embodiment, undesired material 16 in interior 289 is discharged out of interior 289 through discharge port 282. Discharge port 282 may generally be positioned on a bottom of housing 272 to be located where undesired material 16 in interior 289 is likely to move via gravity force. Discharge port 282 may be coupled to pressure vessel housing 272 by discharge pipe 300 which is in turn coupled to drainage port 2820 in housing 272.

To control the flow of fluid through discharge port 282, in one embodiment, pressure vessel 270 includes discharge port control valve 283. Discharge port control valve 283 may be positioned to reversibly seal (partially or completely) discharge port 282. For example, discharge port control valve 283 may reversibly block (or reduce) a fluid flow path through discharge port 282 into interior 289. Discharge port control valve 283 may include a motor or other type of actuator to module the flow of fluid through discharge port 282. In one embodiment, discharge port control valve 283 is operable using electrical power. Discharge port control valve 283 may be operably connected to control valves drive unit 286, discussed below.

To discharge material from interior 289, the high-pressure vacuum in interior 289 may be need to be removed. To remove the high-pressure vacuum, in one embodiment, pressure vessel 270 includes relief port 278. Relief port 278 may be positioned on housing 272 to provide access to interior 289 from outside of housing 272. Relief port 278 may include a hole or other structure through housing 272 that allows for interior 289 to be pneumatically connected to other components. In one embodiment, relief port 278 is pneumatically connected to an ambient environment around pressure vessel 270. When connected to the ambient environment, relief port 178 may enable high-pressure vacuum in interior 289 to be dissipated at desired rates (e.g., by allowing gasses from the ambient environment to enter interior 289 through relief port 278). The desired rates may reduce or prevent significant forces to be applied to components attached to any of the ports that provide access to interior 289. Consequently, the connected components (e.g., hoses, pipes, etc. used to for pneumatic connections) may be less likely to move to due the forces applied to them by the dissipation of the high-pressure vacuum in interior 289. When unsealed, pressure relief fluid flow 293 may flow from the ambient environment into interior 289 through relief port 278.

To manage the rate of flow through relief port 278, in one embodiment, pressure vessel 270 includes relief port control valve 279. Relief port control valve 279 may be positioned to reversibly seal (completely or partially) relief port 278. For example, relief port control valve 279 may reversibly block or limit a fluid flow path through relief port 278 into interior 289 to control the rate at which vacuum in interior 289 is dissipated using pressure relief fluid flow 293 from the ambient environment (thereby pressurizing interior 289 from the high-pressure vacuum pressure to ambient pressure). Relief port control valve 279 may include a motor or other type of actuator for reversibly sealing and/or controlling the rate of fluid flow through relief port 278. In one embodiment, relief port control valve 279 is operable using electrical power. Relief port control valve 279 may be operably connected to control valves drive unit 286, discussed below.

To manage, in part, the rate of discharge of undesired material 104 out of discharge port 282, interior 289 may be pressurized above ambient pressure. To pressurize interior 289, in one embodiment, pressure vessel 270 includes fluid supply port 280. Fluid supply port 280 may be positioned on housing 272 and allow for access to interior 289 from outside of housing 272. Fluid supply port 280 may include a hole or other structure through housing 272 that allows for interior 289 to be pneumatically connected to other components. In one embodiment, fluid supply port 280 is pneumatically connected to a source of compressed fluid. The source of compressed fluid may be mobile fluid supply 42. When connected to mobile fluid supply 42, pressurization fluid flow 295 from mobile fluid supply 42 to interior 289 through fluid supply port 280 may be induced to pressurize interior 289 to an elevated pressure while fluid supply port 280 is open.

To control the rate of pressurization fluid flow 295, in one embodiment, pressure vessel 270 includes fluid supply port control valve 281. Fluid supply port control valve 281 may be positioned to reversibly seal (completely or partially) fluid supply port 280. For example, fluid supply port control valve 281 may reversibly block or limit a fluid flow path through fluid supply port 280 into interior 289 so as to control pressurization of interior 289 to elevated pressures (e.g., above ambient) with pressurization fluid flow 295. Fluid supply port control valve 281 may include a motor or other type of actuator for reversibly sealing and/or controlling the rate of pressurization fluid flow 295 through fluid supply port 280. In one embodiment, fluid supply port control valve 281 is operable using electrical power. Fluid supply port control valve 281 may be operably connected to control valves drive unit 286, discussed below.

To further increase the rate of discharge of undesired material 16 out of discharge port 283, in one embodiment, pressure vessel 270 includes assist port 284. Assist port 284 may be used to manage a flow rate through discharge port 282. Assist port 284 may be positioned in alignment with discharge port 282 to direct material discharge assist fluid flow 294 through discharge port 282. In one embodiment, assist port 284 is pneumatically connected to a source of compressed fluid. The source of compressed fluid may be mobile fluid supply 42. When connected to mobile fluid supply 42, material discharge assist fluid flow 294 aligned with discharge port 282 may be selectively generated. Material discharge assist fluid flow 294 may be used to increase the rate of discharge of undesired material 16 out of discharge port 282. For example, the rate of discharge of undesired material may increase as the rate of material discharge assist fluid flow 294 through assist port 284 increases.

To control the flow rate of fluid flow 294, in one embodiment, pressure vessel 270 includes assist port control valve 285. Assist port control valve 285 may be positioned to reversibly seal (completely or partially) assist port 284. For example, assist port control valve 285 may reversibly block or limit a fluid flow path through assist port 284 that is aligned with discharge port 282. Assist port control valve 285 may include a motor or other type of actuator for reversibly sealing and/or controlling the rate of material discharge assist fluid flow 294 through assist port 284. In one embodiment, assist port control valve 285 is operable using electrical power. Assist port control valve 285 may be operably connected to control valves drive unit 286, discussed below.

When undesired material enters interior 289, it may begin to fill interior 289 thereby risking exit through one of the ports. To reduce the likelihood of undesired material 16 exiting interior 289, in one embodiment, pressure vessel 270 includes extensions 290. Extensions 290 may pneumatically connect inlet port 274, vacuum port 276, and/or relief port 278 to locations within interior 289. Extensions 290 may include tubular members that establish fluid flow paths from the aforementioned ports to the locations within interior 289 to reduce the likelihood of undesired material exiting interior 289 through one of the ports. The locations may be positioned towards an upper portion of interior 289 (while the undesired material 16 may generally fill interior 289 from bottom up). Extensions 290 may reduce the likelihood of undesired material 16 exiting interior 289 through any of the aforementioned ports. For example, undesired material 16 may generally be positioned towards the lower portion of interior 289 by gravity force. The extensions may allow more undesired material 104 to be received into interior 289 without having the undesired material 104 flow out of the aforementioned ports. Extensions 290 may allow for ports more flexibility in positioning on housing 272 without risking undesired material exiting interior 289. In one embodiment, the lower portion of interior 289 has a bowl shape and discharge port is connected to a bottom of the bowl shape which may preferentially direct undesired material 16 towards discharge port 282 by gravity force. Vacuum port 276 and inlet port 274 may be disposed across the bowl shape from one another thereby forming a fluid flow path across the bowl shape.

When undesired material 16 flows into interior 289, it may exit inlet port 274 and the corresponding extension with some velocity. To manage the exiting undesired material from inlet port 274, in one embodiment, pressure vessel 270 includes deflector plate 291. Deflector plate 291 may include a plate of structure for dissipating impact of undesired material 16 as it flows into interior 289. Deflector plate 291 may be positioned in interior 289 in alignment with vacuum induced fluid flow 130 after it exits extensions 290. As discussed above, interior 289 may be drawn to a high-pressure vacuum which may cause vacuum induced fluid flow 130 to exit extensions 290 with reasonable velocity. Deflector plate 291 may be positioned to dissipate physical impact of undesired material 16 entrained in vacuum induced fluid flow 130. For example, undesired material 16 may strike or otherwise impact deflector plate 291. Deflector plate may have a size, shape, and/or be oriented and/or positioned to preferentially direct undesired material that impacts it towards a lower portion of interior 289 thereby trapping a majority of the undesired material 104 entrained in vacuum induced fluid flow 130 in interior 289. A minority of the entrained undesired material 104 may exit interior 289 through vacuum port 276 entrained in vacuum induced fluid flow 130 (after it flows from inlet port 274, through interior 289, and out of vacuum port 276.

To further decrease the likelihood of undesired material existing interior 289 through one of the ports, in one embodiment, pressure vessel 270 includes caps 292. Caps 292 may reduce the likelihood of undesired material 16 in interior 289 from entering relief port 278 and vacuum port 276. Caps 292 may include plates or other structures positioned by extensions 290 that are connected to relief port 278 and vacuum port 276. Caps 292 may partially (or completely) cover openings of the aforementioned extensions 290. Generally, caps 292 may be positioned to reduce the likelihood of undesired material 16 from falling into the openings in extensions 290 due to gravity force (e.g., if some undesired material flows above the openings in the extensions 290 and then falls downward due to gravity).

To transfer undesired material into and out of interior 289, the pressure in interior 289 may need to be changed over time. For example, interior 289 may need to be drawn down to a vacuum to draw undesired material into interior 289 and the vacuum may need to be dissipated to allow the undesired material to be discharged through discharge port 282. To manage the pressure in interior 289, in one embodiment, pressure vessel 270 includes control valves drive unit 286. Control valves drives unit 286 may control the operation of the control valves (e.g., 275, 277, 279, 281, 283, and/or 285). Control valves drives unit 286 may be operably connected to the control valves.

Control valves drive unit 286 may control the operation of the control valves by controlling the quantity of power supplied to each of the control valves. Different power levels provided to the respective control valves may partially or completely close the ports associated with the respective control valves. Consequently, the rate of fluid flow through each of the respective control valves may be regulated by controlling the quantity of power supplied to the respective control valves. Accordingly, interior 289 may be drawn to a high-pressure vacuum, the high-pressure vacuum may be dissipated, and interior 289 may be pressurized above ambient by changing the rates of fluid flow through the aforementioned ports.

The control valves may manage the rate of fluid flow through the ports using any technology. For example, in one embodiment, one or more of the control valves include a valve and an actuator coupled to the valve. The actuator may modulate a size of the opening through the valve in response to provided electrical power. The quantity of supplied electrical power may be proportional to the size of the opening through the valve. In one embodiment, the default position of the valve is fully opened or fully closed. The quantity of supplied electrical power to the actuator may modulate the valve between the fully opened and fully closed states.

To manage the process of transferring undesired material 16 in interior 289, in one embodiment, pressure vessel 270 includes sensors 287. Sensors 287 may be used to measure physical properties of pressure vessel 270 (e.g., pressure levels, fluid flow rates, etc.) and/or the fill level of undesired material in pressure vessel 270. Sensors 287 may perform the aforementioned measurements using any measurement modality without departing from embodiments disclosed herein.

To orchestrate the transfer of undesired material 16 into and out of interior 289, in one embodiment, pressure vessel 270 includes controller 288. Controller 288 may control the flow of fluid flows into and out of the ports of pressure vessel 270 to transfer undesired material 16 from reaction vessel 14 (or other locations) into interior 289. To do so, controller 288 may monitor the pressure in pressure vessel 270, fill level of undesired material 16 in pressure vessel 270, and discharge rate of undesired material 16 out of discharge port 282. Controller 288 may use the pressure and fill level (e.g., measured with sensors 287) to determine how to set the rates of fluid flow into pressure vessel 270.

Generally, controller 288 may manage the fluid flows to control the rates and timing of pressurization of interior 289. For example, in one embodiment, controller 288 seals and opens ports to (i) transfer undesired material into interior 289 and (ii) discharge undesired material out of interior 289 through discharge port 282. To do so, for example, controller 288 may seal relief port 278, fluid supply port 280, and discharge port 282 to allow vacuum induced fluid flow 130 to flow through interior 289 thereby transferring undesired material 104 into interior 289. In another example, controller 288 may seal inlet port 274, vacuum port 276, and fluid supply port 280 to dissipate a vacuum in interior 289 thereby allowing undesired material 104 to begin to flow out of discharge port 282. In a further example, controller 288 may seal inlet port 274, vacuum port 276, and relief port 278 to increase the rate of discharge of undesired material by pressurizing interior 289 and accelerating the flow through discharge port 282 with material discharge assist fluid flow 294.

To manage the flow of fluids through the ports, in one embodiment, controller 288 is coupled to control valves drive unit 286. Controller 288 may control the operation of control valves drive unit 286 using the operable connection (e.g., via message passing). For example, controller 288 may instruct control valves drive unit 286 to drive different control valves with different quantities of power to control rates of fluid flows into and out of pressure vessel 270. To determine the quantity of power to supply to the respective control valves, controller 288 may perform a fill level determination 296 to determine whether the interior 289 is filled. The fill level determination 296 be based on sensor data obtained from a fill level sensor of the sensors 287. If the interior 289 is determined as being filled, then controller 288 may perform an operating points determination 297 to determine the quantity of power to be supplied to the respective control valves. The operating points determination may be based on sensor data obtained from a pressure sensor of the sensors 287, inferred pressure change rates in the interior 289, sensor data from a material discharge sensor of the sensors 287, and a state (e.g., whether the system is operating, whether operation is suspended pending replacement of a component, etc.) of the system from system orchestrator(s). The inferred pressure change rate may be obtained from a pressure change rate determination 298 based on the sensor data from the pressure sensor of the sensors 287.

When managing the fluid flows, controller 288 may utilize measurements from sensors 287. In one embodiment, controller 288 is operably connected to sensors 287. Controller 288 may obtain information regarding the operation of pressure vessel 270 from the sensors 287. In one embodiment, controller 288 monitors the pressure in interior 289, the fill level in interior 289, and the discharge rate of undesired material 104 through discharge port 282 with measurements from sensors 287.

To provide its functionality, in one embodiment, controller 288 includes computing hardware (e.g., processors, memory, storage devices, communication devices, other types of hardware devices including circuitry, etc.) and/or computing instructions (e.g., computer code). When the computing instructions are executed by the computing hardware, the controller 288 may provide its functionality.

One or more components of the systems and one or more elements of the methods described herein may be implemented through an application program running on an operating system of a computer. They may also be practiced with other computer system configurations, including handheld devices, multiprocessor systems, microprocessor-based or programmable consumer electronics, mini-computers, mainframe computers, and the like.

Application programs that are components of the systems and methods described herein may include routines, programs, components, data structures, etc. that may implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks can be performed by remote processing devices linked through a communications network.

As shown in FIG. 3, in some embodiments, the vacuum source 38 may be directly connected to material collector 36 to form unified vacuum and material collector assembly 200 which may in turn be directly coupled to sound attenuation chamber 40 forming a unified vacuum, material collector, and attenuation module 205. In particular, exhaust port 120 of one or more vacuum generators 106 of venturi mechanism 114 may be connected to one or more inlet ports 142 of sound attenuating chamber 40 by one or more tubular members or conduits 1421, 1422, as shown in FIG. 6. The tubular members or conduits 1421, 1422 may be, in some instances, ducts of flexible steel conduits, such as flexible corrugated steel conduits. The tubular members or conduits 1421, 1422 may be capable of absorbing reaction loads at the joints with the vacuum sources 126 and/or the sound attenuation chamber 40, for example, while resisting collapse under the negative pressures of the vacuum flows 26 from the venturi mechanisms 114 of the vacuum sources 126.

Directly connecting the vacuum source 38 to the sound attenuation chamber 40 may result in the vacuum-induced fluid flow to flow from the vacuum source 38 (e.g., as part of the vacuum exhaust fluid flow 110) directly into the sound attenuation chamber 40. In some such embodiments, both the vacuum source 38 and the sound attenuation chamber 40 may be rigid structures able to absorb forces applied to them by the vacuum flow 26 without significantly deforming or moving. The unified module 205 may be fitted with lifting receiver members 99 so the vacuum source 38 and sound attenuation chamber 40 may be easily transported to and deployed by operators of the site using a forklift, crane, or other appropriate equipment and/or methods.

Applicant has recognized that the material 16 may, in some instances, be challenging to move via fluid flow by virtue of, for example, the state of matter of the material 16, the weight of the material 16, the viscosity and/or surface tension of the material 16, and/or other physical properties of the material 16. Such characteristics of the material 16 may limit the rate at which the material 16 may flow through the fluid flow path if only a limited level of the vacuum flow 26 is generated by the vacuum generators 106. In some embodiments, the material extraction assembly 10 or material conveyance assembly 11 may be configured to provide a high-pressure vacuum flow 26, which may be suitable to expedite flow of the material 16 through the fluid flow path. To expedite the flow of the material 16, the vacuum source 38, in some embodiments, may include two or more vacuum generators 106, such as two or more venturi mechanisms 114, which may be operated in parallel with each other in order to enhance the pressure of the vacuum flow 26 generated by the vacuum source 38. Each of the two or more vacuum generators 106 may be driven using the pressurized fluid from the fluid source 42 (and/or other sources of pressurized fluid, such as other fluid sources (e.g., mobile fluid supplies)). The example vacuum generation and sound attenuation assembly 12 shown in FIG. 6 includes an embodiment of vacuum source 38 having multiple venturi mechanisms 114. For example, as illustrated, the vacuum source 38 includes four venturi mechanisms 114. The four venturi mechanisms 114 may be operated simultaneously in parallel to provide a high-pressure vacuum flow 26 and different levels of vacuum pressure.

In some embodiments, to manage the pressure generated by vacuum source 38, the venturi mechanisms 114 maybe divided into two dual vacuum sources 126. Each of the venturi mechanisms 114 of the two dual vacuum sources 126 may be fluidly connected in parallel to each other, for example, so that they each may be driven using a common fluid supply port 116, may commonly exhaust out of a common exhaust port 120, and/or may apply vacuum using a common vacuum port 118. In this example manner, each dual vacuum source 126 may provide a higher pressure vacuum flow 26 than may be provided using a single venturi mechanism 114 driven by a similar rate of fluid flow received from the fluid source 42.

To control the generation of the vacuum flow 26 by the one or more vacuum sources 38, in some embodiments, the ports 116, 118, and/or 120 of each dual vacuum source 126 may be controlled by corresponding respective control valves 128, 130. The control valves 128, 130, may be usable to control the rate of fluid flow through each of the respective ports.

In some embodiments, to manage the process of generating the high-pressure vacuum flow 26, the vacuum source 38 may include a vacuum source controller 136. The vacuum source controller 136 may be in communication with one or more of the control valves 128, 130. The vacuum source controller 136 may be configured to control operation of one or more of the control valves 128, 130 to provide vacuum flows having desired pressures. For example, the vacuum source controller 136 may be operably coupled to an adjustor, such as a switch, dial, or other mechanism that a person may operate to achieve a desired level of vacuum pressure to be generated by the vacuum source 38. The vacuum source controller 136 may use one or more signals from the adjustor to set the operation points for the one or more control valves 128, 130 to generate the desired vacuum pressure with, for example, the venturi mechanisms 114.

The vacuum source controller 136 may include computing hardware (e.g., processors, memory, storage devices, communication devices, other types of hardware devices including circuitry, etc.), and/or computing instructions (e.g., computer code) that when executed by the computing hardware cause the vacuum source controller 136 to provide its functionality. The vacuum source controller 136 may include a lookup table or other data structure usable to determine the operating points for the one or more control valves 128, 130 based on a desired vacuum flow level. Once operating points are determined, the vacuum source controller 136 may modify operation of one or more of the control valves 128, 130 based on the operating points. For example, vacuum source controller 136 may modify the quantities of power used to drive control valves 128, 130 to set the quantity of fluid flow through each of the ports 116, 118, and/or 120.

In some embodiments, to limit or prevent contamination of the ambient environment with any undesired material 16, the sound attenuation chamber 40 may be configured remove undesired material 16 from the vacuum-induced fluid flow 26 prior to exhaustion into the ambient environment. To do so, the sound attenuation chamber 40 may be pneumatically connected to the vacuum source 38. In some embodiments, the sound attenuation chamber 40 is pneumatically connected to the vacuum source 38 by a conduit (e.g., a hose). In some embodiments, the sound attenuation chamber 40 may be directly and pneumatically connected to the vacuum source 38, thereby reducing reliance on a conduit, which may provide a potential hazard during operation.

Figure 23:
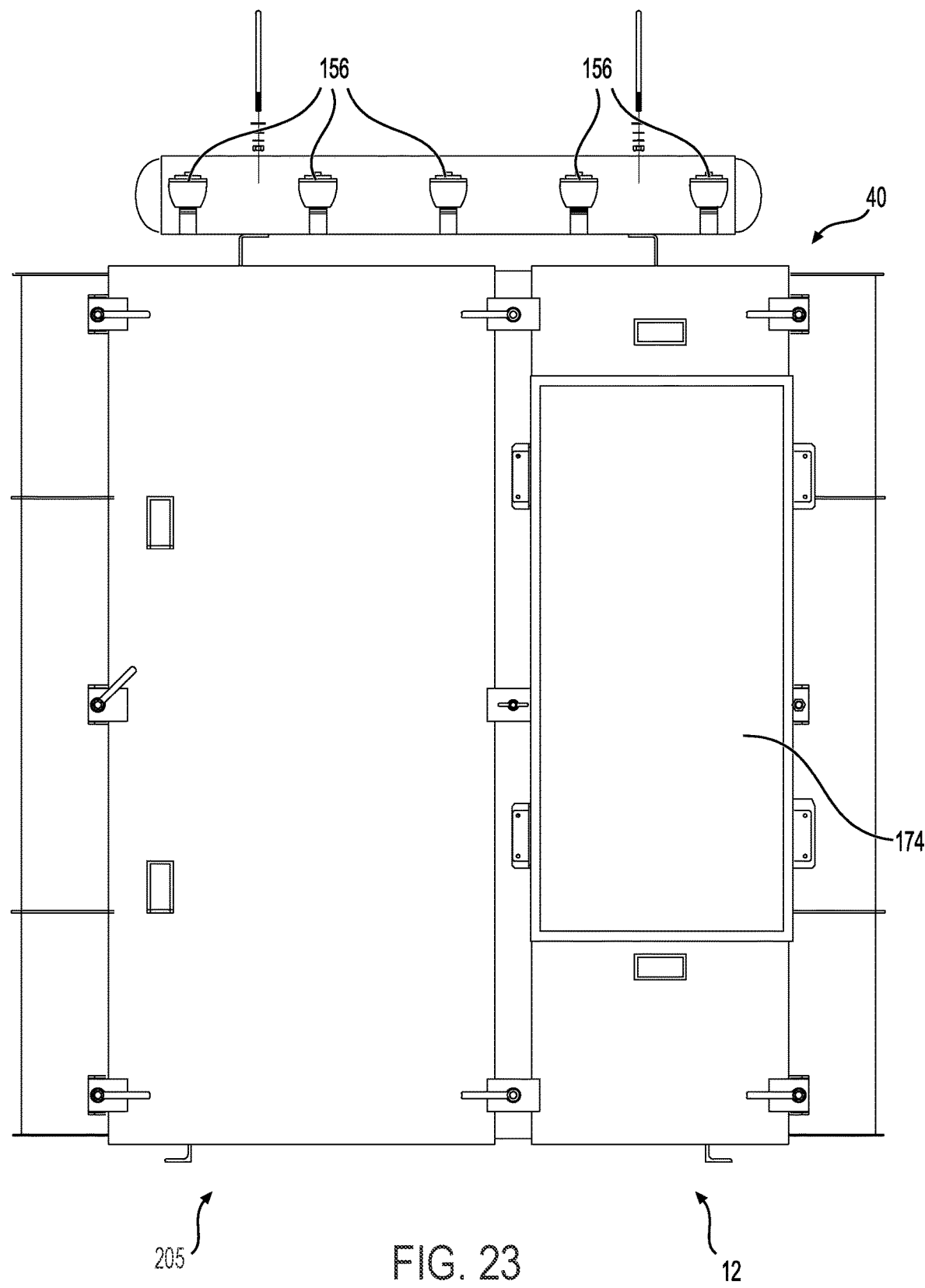
FIG. 23 is a schematic top view of the example sound attenuation assembly, according to embodiments of the disclosure.
Figure 25:
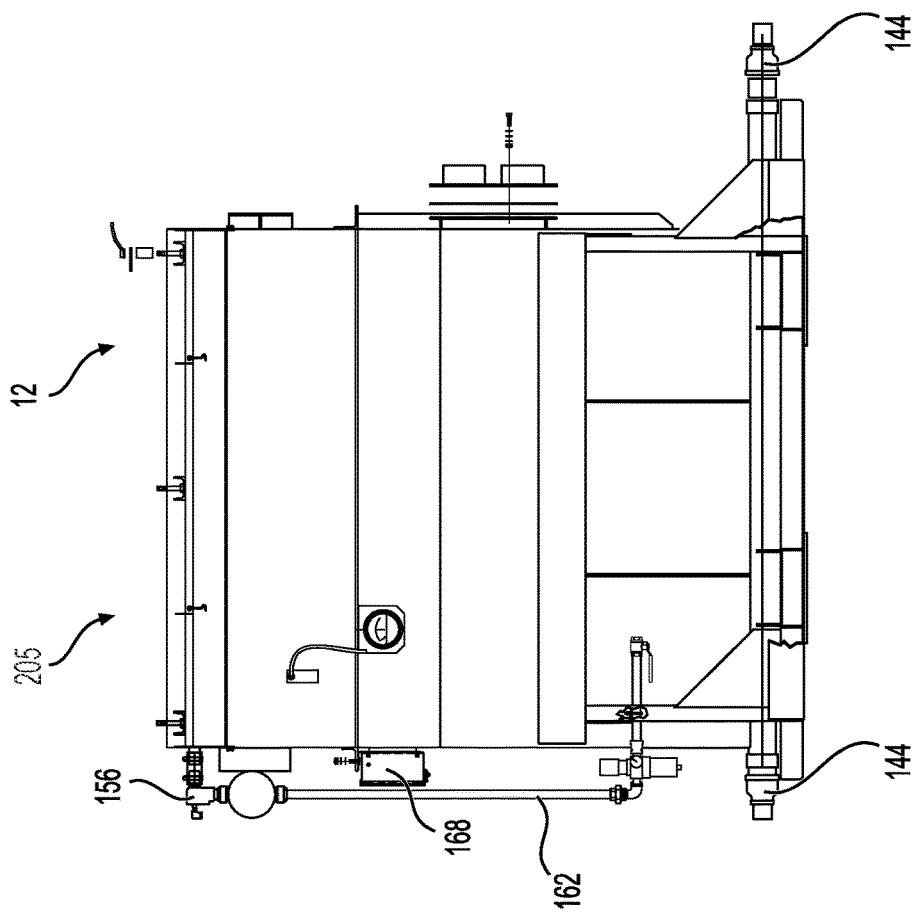
FIG. 25 is a schematic second side view, opposite the first side, of the example sound attenuation assembly, according to embodiments of the disclosure.
Figure 24:
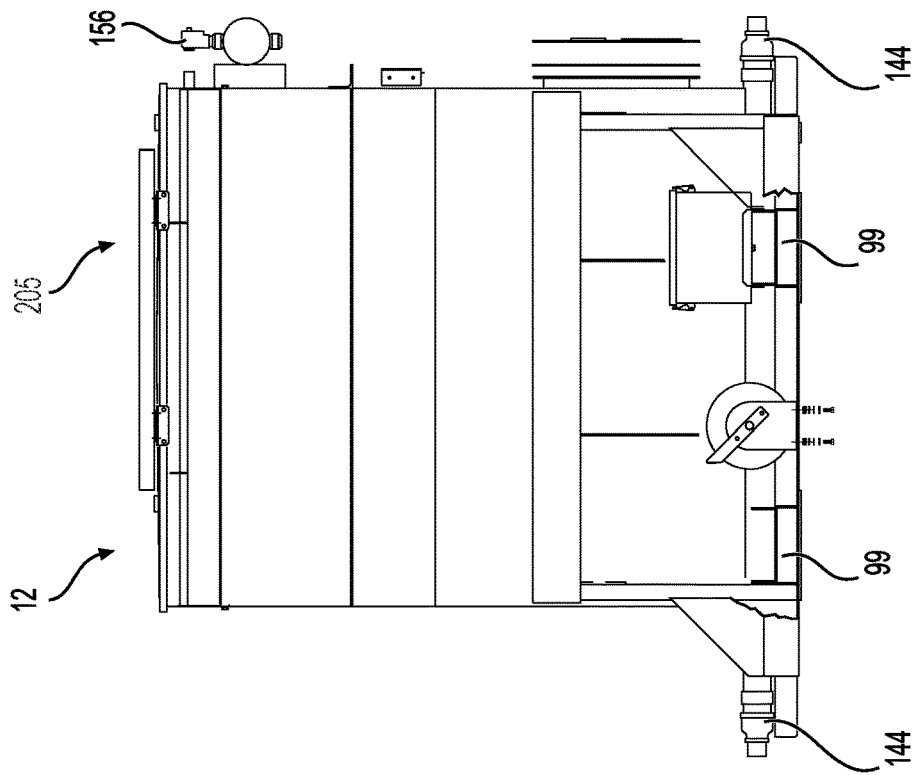
FIG. 24 is a schematic first side view of the example sound attenuation assembly shown, according to embodiments of the disclosure.
Figure 26:
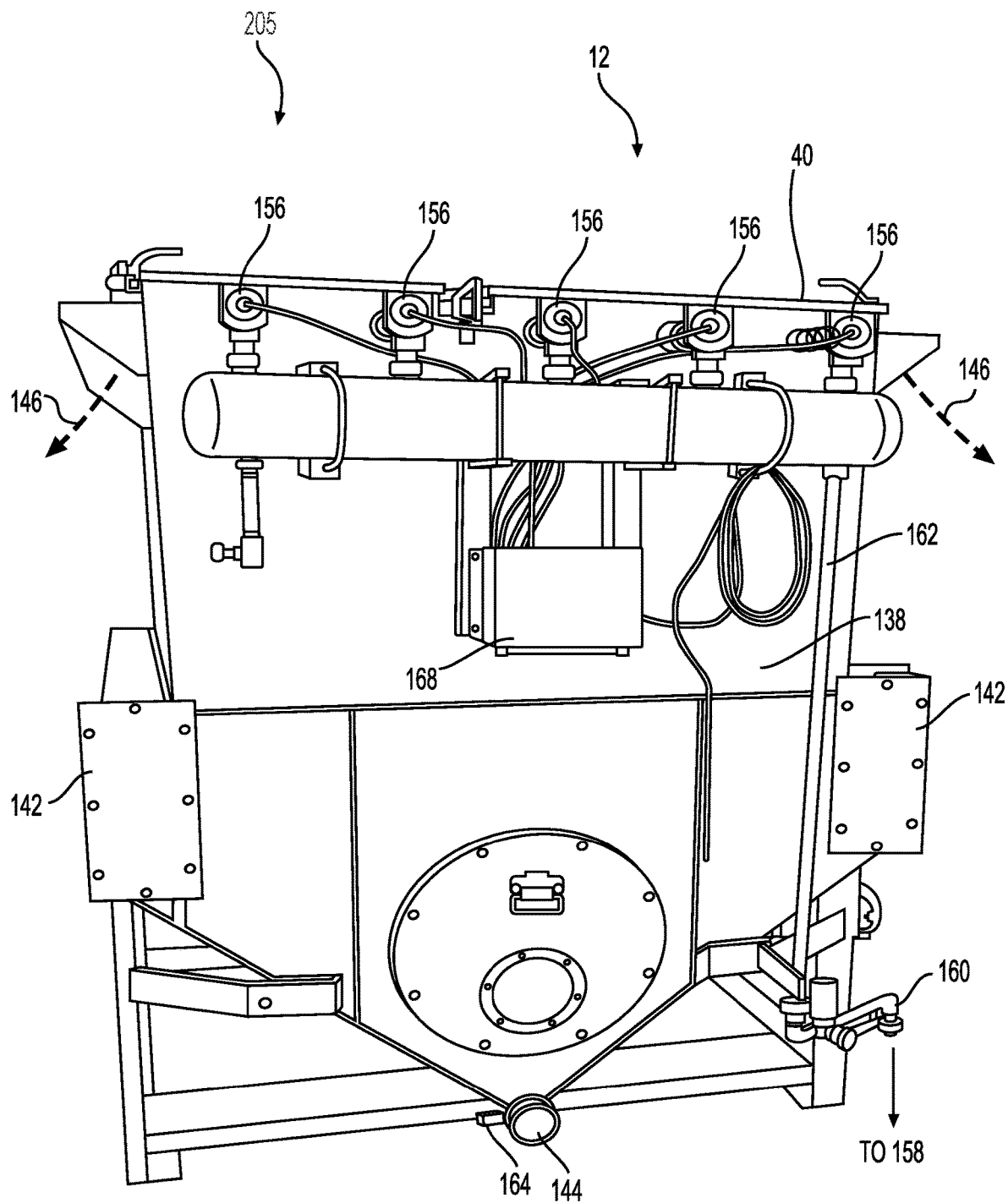
FIG. 26 is a schematic perspective view of a sound attenuation assembly, showing an example sound attenuation chamber end, according to embodiments of the disclosure.
Figure 27:
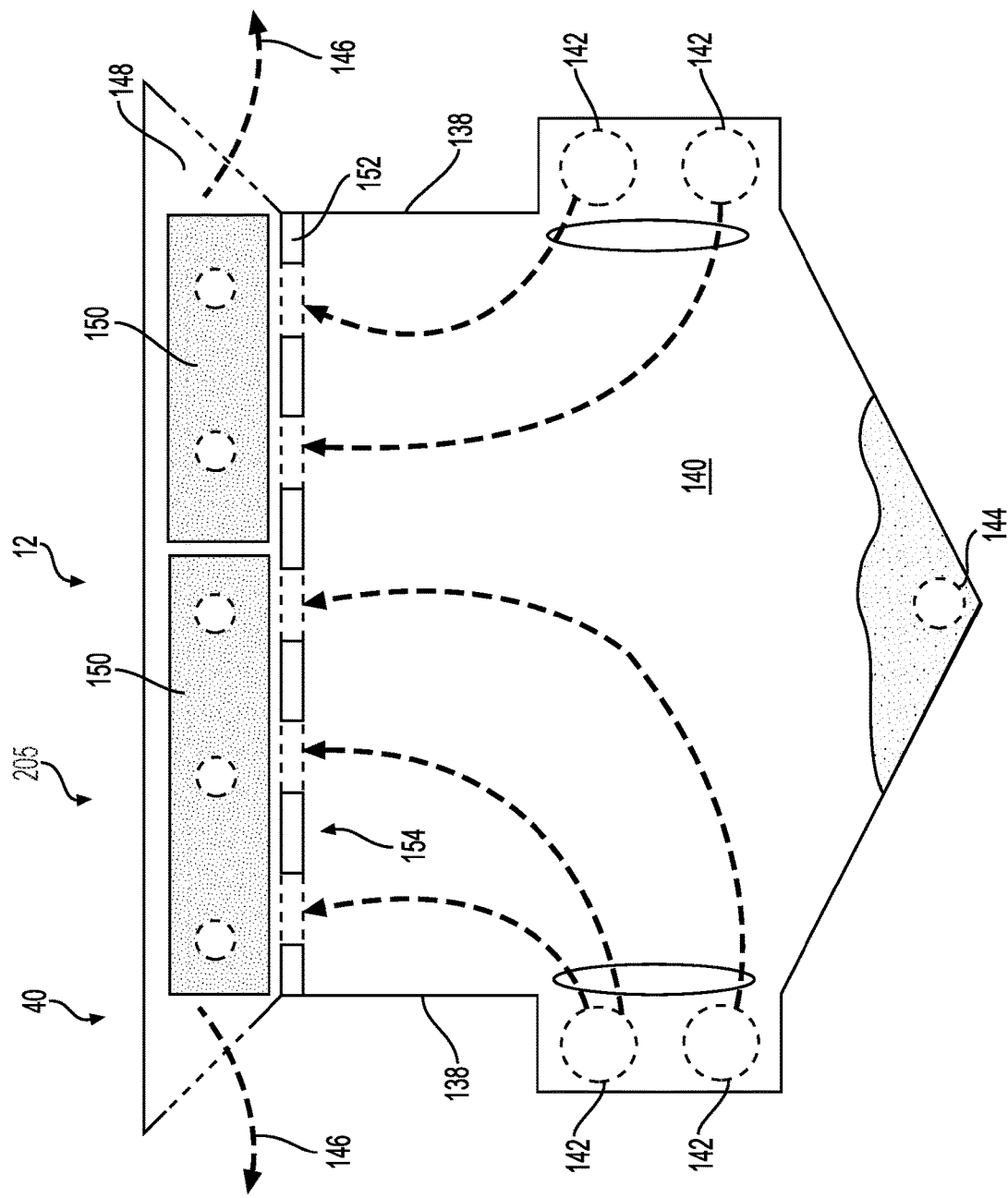
FIG. 27 is a simplified schematic end section view of an example sound attenuation chamber, according to embodiments of the disclosure.

In some embodiments, the vacuum source 38 and the sound attenuation chamber 40 may be configured such that the vacuum source 38 and the sound attenuation chamber 40 may be relatively easily separated from one another. This may facilitate maintenance and/or cleaning of the vacuum source 38 and/or the sound attenuation chamber 40. In some embodiments, this may facilitate conversion of the unified module 205 for tailoring it to different uses. For example, this may facilitate attachment of different vacuum sources (e.g., having different features, sizes, and/or capacities) to the sound attenuation chamber 40, and/or attachment of different sound attenuation chambers (e.g., having different features, sizes, and/or capacities) to the vacuum source 38. FIGS. 23-25 schematically depict an embodiment of sound attenuation chamber 40 that is configured for attachment to a vacuum source.

Applicant has recognized that some industrial environments, such as the example environments including a reaction vessel 14 shown in FIGS. 1-3, may include personnel tasked to operate the equipment in these environments. The presence of such personnel may restrict the acceptable level of sound that may be produced for undesired material removal purposes. The sound attenuation chamber 40, according to some embodiments, may be configured to attenuate sound generated by the vacuum source 38 and/or the fluid source 42 to sufficient levels, such that personnel may not need to wear protective hearing due to the sound generated by the material extraction assembly 10 and/or material conveyance assembly 11. In some embodiments, the sound attenuation chamber 40 may be configured to reduce the sound level generated by the material extraction assembly 10 and/or material conveyance assembly 11 by an amount ranging from ten percent to forty percent (e.g., by twenty-five decibels). For example, without the sound attenuation chamber 40, according to some embodiments, the assembly 10, 11 may generate approximately 115 decibels of sound. In contrast, when the sound attenuation chamber 40 is incorporated into the assembly 10, 11, the sound level may be reduced to about 89 decibels.

The sound attenuation chamber 40, in some embodiments, may both filter materials received from fluid flows before exhausting the received fluid flows and attenuate sound from received fluid flows before exhausting the received fluid flows into the ambient environment. In some embodiments, the sound may be attenuated to an extent that personnel in the area need not wear hearing protection, although personnel may need to wear hearing protection for other reasons.

FIGS. 10, 22-23, and 26-27 illustrate examples of embodiments of a sound attenuation chamber 40. The sound attenuation chamber 40, in some embodiments, may include an attenuation housing 138 at least partially defining a chamber interior volume 140 positioned to receive at least a portion of the vacuum flow 26 from the vacuum source 38 and attenuate sound generated by the vacuum source 38 during operation. The attenuation housing 138 may substantially seal the interior volume 140 from the ambient environment. The attenuation housing 138 may include one or more walls or other structural members to at least partially seal the interior volume 140.

In some embodiments, to filter undesired material 16 entering the sound attenuation chamber 40, the sound attenuation chamber 40 may include one or more inlet ports 142, one or more discharge ports 144, and/or one or more exhaust ports 146. At least some of the ports may be positioned on the attenuation housing 138 to provide access to the interior volume 140 from outside the attenuation housing 138. For example, the respective ports may include holes, apertures and/or other structures through one or more walls of the attenuation housing 138 that enable access to interior volume 140.

The inlet ports 142 may be pneumatically connected to the vacuum source 38. When pneumatically connected to the vacuum source 38, the inlet ports 142 may receive vacuum-induced flow 26 from the vacuum source 38. The minor portion of the undesired material 16 may be entrained in vacuum-induced flow 26, thereby presenting a potential contamination hazard if exhausted into the ambient environment without further filtering and/or treatment.

The exhaust ports 146, in some embodiments, may be pneumatically connected to the ambient environment. The fluid flow path through the material extraction assembly 10 may end at the exhaust ports 146. Consequently, in some embodiments, vacuum-induced flow 26 drawn from the source of the fluid (e.g., the reaction vessel 14, FIGS. 1-3) and through the flow path may exit the flow path through the exhaust ports 146. The interior volume 140 may be in the flow path between the inlet ports 142 and the exhaust ports 146, such that vacuum-induced flow 26 flows through the interior volume 140 prior to being exhausted into the ambient environment.

In some embodiments, to partially attenuate sound, the exhaust ports 146 may be of substantially larger size than the inlet ports 142. The size difference between these ports may reduce or eliminate backpressure on the vacuum-induced flow 26. The flow path may expand greatly in cross-sectional area as the vacuum-induced flow 26 transitions from the inlet ports 142 into the interior volume 140. As a result, any sound generated by the vacuum-induced flow 26 may generally occur at an interface between the inlet ports 142 and the interior volume 140. In some embodiments, accordingly, the sound attenuation chamber 40 may, in part, dissipate the sound generated by the vacuum-induced flow 26 by generating it within the sound attenuation chamber 40, for example, such that the sound will dissipate prior to exiting the sound attenuation chamber 40.

In some embodiments, to filter undesired material 16 prior to exhaustion to the ambient environment, the interior volume 140 may include a filter media region 148. The filter media region 148 may include a portion of the interior volume 140 in which filter media 150 may be positioned. The filter media region 148 may be positioned, for example, such that the vacuum-induced flow 26 must substantially flow through the filter media region 148 and filter media 150 prior to being exhausted through the exhaust ports 146 to the ambient environment. In some embodiments, the interior volume 140 may include a filter media support plate 152. The filter media support plate 152 may be configured to support the filter media 150 within the filter media region 148. In some embodiments, the filter media support plate 152 may generally divide the interior volume 140 into two or more sections and may include holes through which the vacuum-induced flow 26 may travel between the sections. One or both sides of the filter media support plate 152 may include one or more baffles 154 configured to attenuate sound. The one or more baffles 154 may attenuate sound generated by the vacuum-induced flow 26, for example, prior to exhaustion out of the sound attenuation chamber 40.

In some embodiments, to filter undesired material 16 prior to exhaustion to the ambient environment, the filter media 150 may be configured to filter at least a portion of the minor portion of the undesired material 16 from the vacuum-induced flow 26. The filter media 150 may include any type of filter media for removing material from fluid flows. The filter media 150 also may be sound absorptive and, in part, help to dissipate the sound generated by the vacuum-induced flow 26. The filter media 150 may, in some examples, exhibit a relatively limited filtration capacity. As filter media 150 filters the undesired material 16, its permeability to fluid flow may decrease.

To manage the filtration capacity of the filter media 150, in some embodiments, the sound attenuation chamber 40 may include one or more jet generators 156 positioned relative to the sound attenuation chamber 40 to generate jets of fluid flow directed toward the filter media 150 to at least partially maintain the filtration capacity of the filter media 150. For example, the jet generators 156 may be positioned to generate jets of fluid flow directed toward the filter media 150 to at least partially refresh or restore the filtration capacity of filter media 150. For example, the jet generators 156 may be positioned outside the attenuation housing 138 and oriented facing into the filter media region 148.

When the jet generators 156 generate the jets, the jets may transfer undesired material 16 filtered by the filter media 150 out of the filter media 150 and into the interior volume 140. This may, in some embodiments, at least partially restore the permeability and/or the filtration capacity of the filter media 150. For example, the jets may cause undesired material 16 trapped in the filter media 150 to drop out of the filter media region 148, for example, through holes in the filter media support plate 152 and into interior volume 140.

To drive the jet generators 156, in some embodiments, the sound attenuation chamber 40 may include a jet fluid supply 158. The jet fluid supply 158 may be configured to store compressed fluid. In some embodiments, the jet fluid supply 158 may include a storage tank in which the compressed fluid is stored. The compressed fluid may be a gas, such as, for example, compressed air. The jet fluid supply 158 may be pneumatically coupled to the jet generators 156. The jet generators 156 may include one or more ports and one or more electrically driven actuators configured to control the rate at which the compressed fluid from the jet fluid supply 158 exits the jet generators 156. Thus, the jet generators 156 may modulate one or more of a strength of the jets of fluid flow, timing of the jets of fluid flow, or one or more other characteristics associated with the jets of fluid flow.

To fill the jet fluid supply 158, in some embodiments, the sound attenuation chamber 40 may include a fluid supply port 160. The fluid supply port 160 may be pneumatically connected to the jet fluid supply 158 to refill the jet fluid supply 158 with compressed fluid, for example, when another source of compressed fluid (e.g., the fluid source 42) is pneumatically coupled to the fluid supply port 160.

In some embodiments, due to a limited size of the interior volume 140, only a finite quantity of undesired material 16 may be stored in the interior volume 140. Over time the interior volume 140 may become filled with undesired material 16 as undesired material 16 is removed from the source of the material (e.g., the reaction vessel 14). Once the interior volume 140 is filled, the sound attenuation chamber 40 may become inoperable, for example, undesired material 16 may block fluid flow through the interior volume 140.

To manage the fill level 79 of the interior volume 140, in some embodiments, the sound attenuation chamber 40 may include one or more discharge ports 144. The discharge ports 144 may facilitate removal of undesired material 16 from the interior volume 140. In some embodiments, undesired material 16 may be removed from the interior volume 140 through the discharge port(s) 144 while the vacuum-induced flow 26 flows through the interior volume 140.

To remove undesired material 16 from the interior volume 140, in some embodiments, the discharge port 144 may be pneumatically connected to a material collector 36 (e.g., a vacuum box 48). For example, the discharge port 144 may be pneumatically connected to a material collector 36 via a conduit 162 (e.g., such as a restrictive hose). When a high-pressure vacuum is applied to the material collector 36, undesired material 16 in the interior volume 140 may be drawn out of the interior volume 140, through the conduit 162, and into the material collector 36. Thus, both the major portion and the minor portion of the undesired material 16 extracted from the source of the material (e.g., the reaction vessel 14) may be transferred to a material collector 36. The discharge port 144 may be pneumatically connected to other components for undesired material discharge purposes without departing from embodiments disclosed herein.

To control when and/or the rate of removal of the undesired material 16 from the interior volume 140, in some embodiments, the sound attenuation chamber 40 may include a discharge port control valve 164. The discharge port control valve 164 may be positioned to control the rate of fluid flow through the discharge port 144. For example, the discharge port control valve 164 may include an electrically driven actuator usable to control the rate of fluid flow through discharge port 144. In some embodiments, the discharge port control valve 164 may control the rate of fluid flow through discharge port 144 to selectively remove undesired material 16 from the interior volume 140.

To determine when and/or at which rate to remove undesired material 16 from the interior volume 140, in some embodiments, the sound attenuation chamber 40 may include one or more sensors 166. The sensors 166 may be positioned to monitor the filtration capacity of the filter media 150, the fill level 79 of the interior volume 140, and/or the flow rate of undesired material 16 out of the discharge port 144. The sensors 166 may be configured to generate signals indicative of any physical property of the sound attenuation chamber 40 and use the signals to determine these quantities. For example, the sensors 166 may include photo-sensors that measure the filtration capacity of the filter media 150 based on a quantity of light transmitted by the filter media 150. In some embodiments, the sensors 166 may include a transducer configured to measure the mass of undesired material 16 to determine the fill level 79 of the interior volume 140. The sensors 166 may include other components for measuring the same or different types of physical properties without departing from embodiments disclosed herein.

Figure 28:
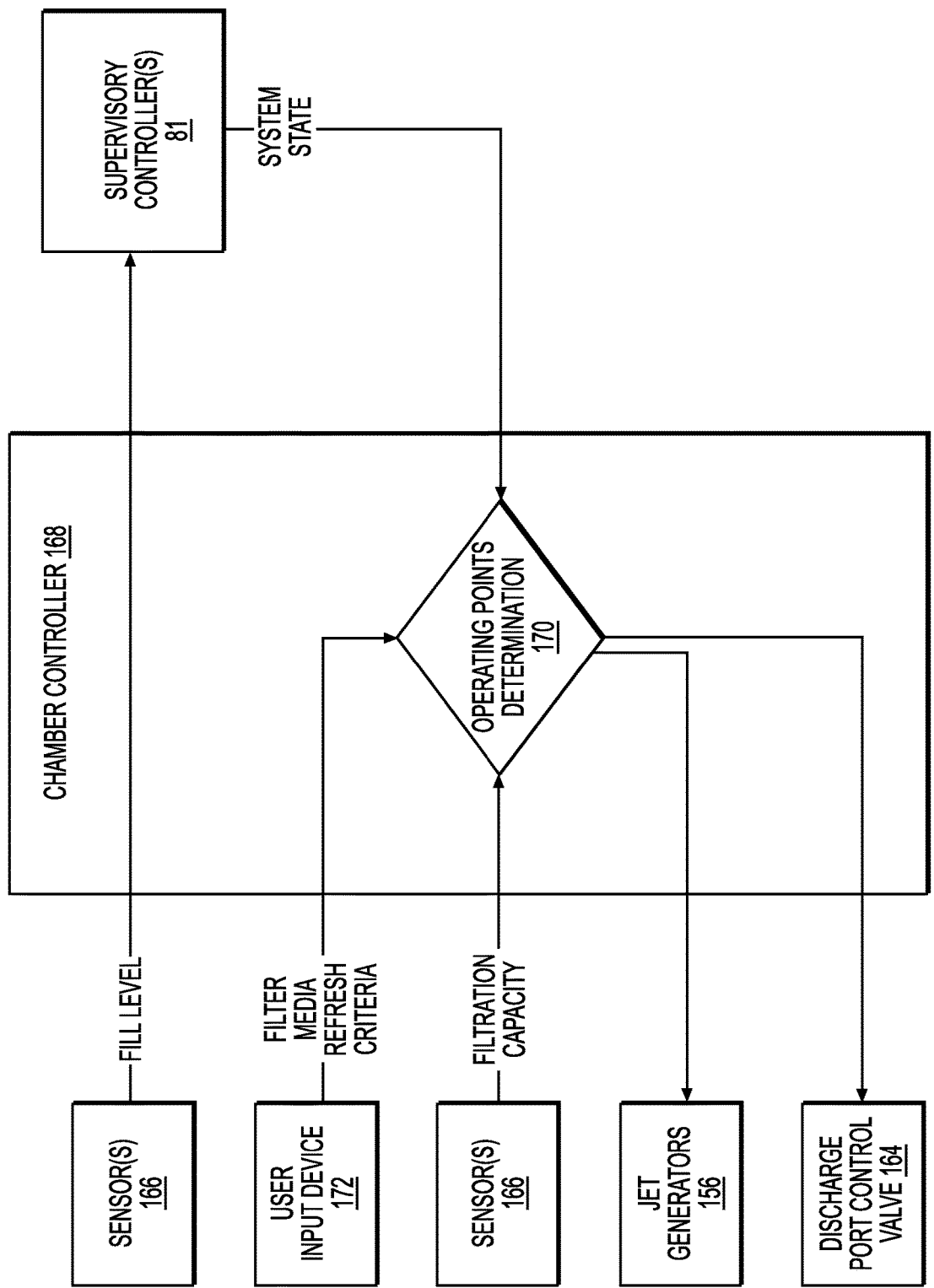
FIG. 28 is a block diagram of an example architecture for operating an example sound attenuation chamber of an example material extraction assembly or material loading assembly, according to embodiments of the disclosure.

FIG. 28 is a block diagram of an example architecture for operating an example sound attenuation chamber 40 of an example material extraction assembly 10 or an example material conveyance assembly 11, according to embodiments of the disclosure. To coordinate operation of the sound attenuation chamber 40, in some embodiments, the sound attenuation chamber 40 may include a chamber controller 168 in communication with one or more of a discharge port control valve actuator, one or more jet generators 156, and the one or more sensors 166. For example, the chamber controller 168 may be operably connected to the discharge port control valve 164, the jet generators 156, and the sensors 166. The chamber controller 168 may obtain information from sensors 166 and selectively drive the discharge port control valve 164 and/or the jet generators 156 based on the information to ensure that (i) the filter media 150 is capable of continuing to filter fluid flows through the interior volume 140 and (ii) the interior volume 140 is not overfilled with undesired material 16.

In some embodiments, the chamber controller 168 may include computing hardware (e.g., processors, memory, storage devices, communication devices, other types of hardware devices including circuitry, etc.), and/or computing instructions (e.g., computer code) that when executed by the computing hardware cause chamber controller 168 to provide its functionality. The chamber controller 168 may include a lookup table or other data structure usable to make an operating points determination 170 for the discharge port control valve 164 and/or the jet generators 156 based at least in part on the fill level 79 and filtration capacity of the filter media 150. Once the operating points are determined, the chamber controller 168 may be configured to modify operation of the discharge port control valve 164 and/or the jet generators 156 based at least in part on the operating points. For example, the chamber controller 168 may be configured to modify the quantities of power used to drive the discharge port control valve 164 and/or the jet generators 156 to set the quantity of fluid flows through each of the discharge port control valves 164 and/or the jet generators 156. As a result, in some embodiments, the sound attenuation chamber 40 may be more likely to be able to substantially continuously operate.

In some embodiments, to enable a person to control operation of the sound attenuation chamber 40, the sound attenuation chamber 40 may include a user input device 172. The user input device 172 may be in communication with to the chamber controller 168. The user input may be communicated to the chamber controller 168 via the user input device 172. The user input device 172 may include, for example, one or more buttons, touch sensitive displays, levers, knobs, and/or other devices (e.g., control panels, tablet computers, and/or smart phones) that are operable by a person to provide the chamber controller 168 with information for operating or controlling the sound attenuation chamber 40.

The chamber controller 168 may be configured to receive information from a person via the user input device 172 regarding how frequently to refresh the filtration capacity of the filter media 150 and/or information regarding how frequently to discharge undesired material 16 from the interior volume 140. The chamber controller 168 may use such information when determining the operating points for the discharge port control valve 164 and/or the jet generators 156. For example, a person may provide operational preferences or other information using the user input device 172 to configure operation of the sound attenuation chamber 40.

In some embodiments, the chamber controller 168 may be powered using electricity. The sound attenuation chamber 40 may include one or more solar panels 174 that provide electrical power to the chamber controller 168. The chamber controller 168 may include one or more batteries in which power from the one or more solar panels 174 may be stored prior to use by the chamber controller 168 (and/or other controllers of the material extraction assembly 10).

Applicant has recognized that some environments, such as industrial environments similar to the environment illustrated in FIGS. 1-3, may include volatile hydrocarbon fluids (and/or other types of volatile materials) or other types of fluids susceptible to combustion. Some embodiments of the material extraction assembly 10 or material conveyance assembly 11, or one or more components thereof, may not be powered by combustible power sources. Rather, the material collector 36, the vacuum source 38, the sound attenuation chamber 40, and/or the fluid source 42 may be powered with electricity and/or compressed fluid. In some such embodiments, the material extraction assembly 10 or material conveyance assembly 11 may be capable of removing undesired materials from an environment, such as an industrial environment, without the risk of igniting combustible materials in the environment (or with a reduced risk).

In some embodiments, various components may utilize fluid flows to provide their functionalities. To operate these components, the material extraction assembly 10 or material conveyance assembly 11 may include the fluid source 42, which may be a mobile fluid supply. The fluid source 42 may be configured to supply pressurized or compressed fluid to the vacuum source 38 and/or the sound attenuation chamber 40. The fluid supplied may be may be pneumatically connected to the vacuum source 38 (e.g., to generate vacuums) and/or the sound attenuation chamber 40, for example, to refresh the filtration capacity of the filter media 150.

To supply pressurized or compressed fluid, the fluid source 42 may compress fluid and store the compressed or pressurized fluid for future use. In some embodiments, the fluid source 42 may include an air compressor, and the air compressor may be configured to compress air from the ambient environment to generate the compressed or pressurized fluid. The fluid source 42 may compress other fluids without departing from embodiments disclosed herein.

To limit or prevent combustion risk, in some embodiments, the fluid source 42 may compress fluid using electricity. The fluid source 42 may obtain the electricity from any electricity source. In some embodiments, the fluid source 42 may include one or more batteries for providing the electricity to the fluid source 42. In some embodiments, the fluid source 42 may include a power cable and/or other componentry for obtaining electricity from another source (e.g., from a utility company or other large scale supplier, a solar setup, and/or or other non-combustion-based electricity producers, etc.).

Applicant has recognized that environments, such as industrial environments, such as the site illustrated in FIGS. 1-3, may require a high uptime by their operators. As a result, the time required to setup the material extraction assembly 10 or material conveyance assembly 11 may be a significant cost to the operators of the site. In some embodiments, the material extraction assembly 10 or material conveyance assembly 11 disclosed herein may provide for the efficient setup, operation, and removal of the assembly in many environments, including industrial environments. In some embodiments, any of the components of the material extraction assembly 10 or material conveyance assembly 11 may be placed or mounted on chassis including trailers or other types of high mobility structures to enable them to be efficiently placed and oriented with respect to, for example, a reaction vessel.

Applicant has recognized that environments, such the example environment shown in FIGS. 1-3, may have different requirements for material removal. For example, different industrial environments may have different quantities of undesired material and/or undesired material at different industrial environments may have different physical properties. The material extraction assembly 10 or material conveyance assembly 11 in accordance with embodiments disclosed herein may provide for rapid deployment of a material extraction assembly 10 or material conveyance assembly 11 that is customized or tailored to meet the requirements of each industrial environment. As a result, different numbers of components may be deployed and connected (e.g., pneumatically connected) in parallel and/or in series to provide desired levels of vacuum strength and/or desired storage capacities for undesired material.

Figure 29:
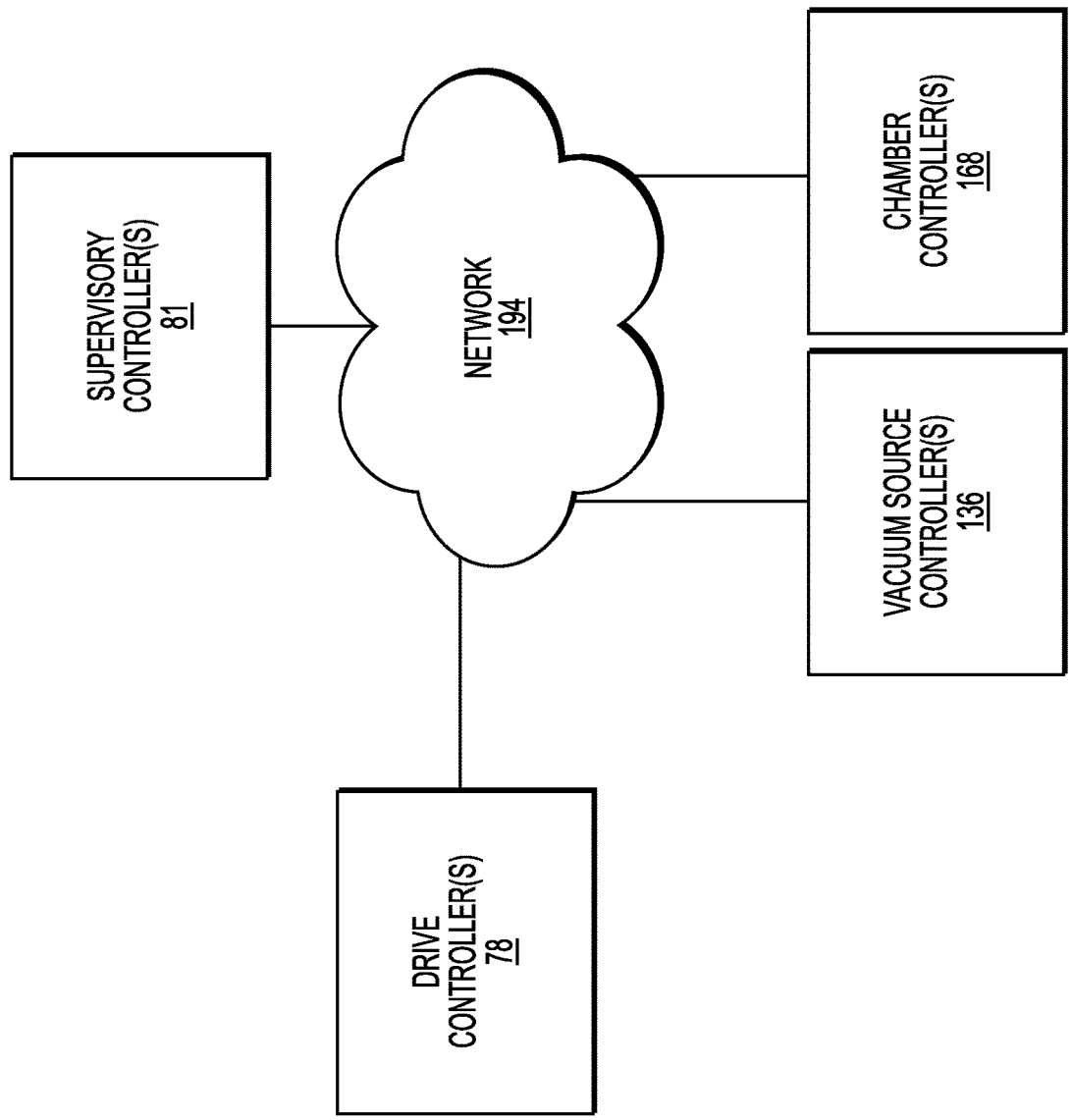
FIG. 29 is a block diagram of an example supervisory controllers for coordinating substantially continuous material conveyance by an example material conveyance assembly, according to embodiments of the disclosure.

As shown in FIG. 29, the material extraction assembly 10 or material conveyance assembly 11 may include one or more supervisory controllers 81, which may be in communication with one or more of the drive controller 78 associated with operation of one or more material collectors, a vacuum source controller 136 associated with operation of one or more vacuum sources, and/or a chamber controller 168 associated with controlling operation of one or more sound attenuating chambers 40. The aforementioned supervisory controller(s) and other controllers may be in communication with one another via a network 194. The network 194 may include one or more wired and/or wireless networks through which the supervisory controller(s) 81 and other controllers may communicate.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This U.S. non-provisional patent application claims priority to and the benefit of U.S. Provisional Application No. 63/367,570, filed Jul. 1, 2022, titled "HIGH VOLUME INDUSTRIAL VACUUM ASSEMBLIES AND METHODS," U.S. Provisional Application No. 63/367,219, filed Jun. 29, 2022, titled "RECEIVER, ASSEMBLIES, AND METHODS FOR LOADING AND EXTRACTING PRODUCT IN ELEVATED TOWER," U.S. Provisional Application No. 63/367,218, filed Jun. 29, 2022, titled "ASSEMBLIES AND METHODS FOR MATERIAL EXTRACTION FROM RETENTION COLLECTIONS," U.S. Provisional Application No. 63/364,630, filed May 13, 2022, titled "ASSEMBLIES, APPARATUSES, SYSTEMS, AND METHODS FOR MATERIAL EXTRACTION AND CONVEYANCE," U.S. Provisional Application No. 63/264,101, filed Nov. 16, 2021, titled "ASSEMBLIES AND METHODS FOR MATERIAL EXTRACTION," U.S. Provisional Application No. 63/264,015, filed Nov. 12, 2021, titled "ASSEMBLIES AND METHODS FOR MATERIAL EXTRACTION," U.S. Provisional Application No. 63/203,147, filed Jul. 9, 2021, titled "SYSTEMS, METHODS, AND DEVICES FOR INDUSTRIAL TOWER WASTE EXTRACTION," and U.S. Provisional Application No. 63/203,108, filed Jul. 8, 2021, titled "SYSTEMS, METHODS, AND DEVICES FOR INDUSTRIAL TOWER WASTE EXTRACTION," the disclosures of all of which are incorporated herein by reference in their entireties.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

Statements of the Disclosure

Statements of the disclosure include:

Statement 1: A vacuum and material collector assembly for removing waste material from a waste material source, the assembly comprising: a material collector comprising a high volume pressure vessel having an interior; and a high-pressure vacuum source pneumatically coupled to the pressure vessel, the vacuum source operable to generate a high-pressure vacuum of a fluid flow through the interior of the pressure vessel to extract the waste material from the waste material source into the interior of the pressure vessel; the vacuum source pneumatically connected to the material collector to form a unified vacuum and collector assembly operable to be mounted on a single mobile chassis.

Statement 2: The assembly according to Statement 1, wherein the pressure vessel comprises: a housing defining the interior of the pressure vessel; and a vacuum port positioned on the housing allowing access to the interior from outside of the housing, the vacuum port pneumatically connected to the vacuum source to form a unified vacuum and material collector assembly; wherein the vacuum source is operable to apply a vacuum to the interior of the pressure vessel through the vacuum port.

Statement 3: The assembly according to Statement 1 or Statement 2, wherein the vacuum source is directly connected to the pressure vessel via the vacuum port.

Statement 4: The assembly according to Statement 3, wherein the vacuum source is directly connected to the pressure vessel via the vacuum port without the use of one or more tubular members between the vacuum source and the vacuum port.

Statement 5: The assembly according to any one of Statements 1-4, wherein the vacuum source comprises a plurality of vacuum generators, each of the plurality of vacuum generators being positioned to generate a vacuum to the interior of the pressure vessel.

Statement 6: The assembly according to Statement 5, wherein one or more of the plurality of vacuum generators comprises a venturi mechanism operable to generate a vacuum in the interior of the pressure vessel using a venturi effect.

Statement 7: The assembly according to Statement 5 or Statement 6, wherein the plurality of vacuum generators comprises two or more vacuum generators, the two or more vacuum generators being configured to operate in parallel to enhance vacuum pressure generated by the vacuum source.

Statement 8: The assembly according to Statement 5 or Statement 6, wherein the plurality of vacuum generators comprises four vacuum generators, the four vacuum generators being configured to operate in parallel to enhance vacuum pressure generated by the vacuum source.

Statement 9: The assembly according to any of Statements 1-8, wherein the pressure vessel comprises: an inlet port positioned on the housing, the inlet port operable to provide access to the interior when pneumatically connected to the waste material source such that the vacuum source is operable to generate vacuum flow between the waste material source and the interior of the pressure vessel.

Statement 10: The assembly according to any of Statements 1-9, wherein the waste material source is a reaction vessel containing a waste material or a waste material reservoir.

Statement 11: The assembly according to any of Statements 1-10, further comprising a chassis supporting the vacuum source and material collector and forming a unified vacuum and material collector operable to be transported between geographical locations.

Statement 12: The assembly according to any of Statements 1-11, wherein the vacuum source is configured to draw the waste material from the waste material source into the interior of the material collector and depositing the waste material therein.

Statement 13: The assembly according to any of Statements 1-12, wherein the interior comprises a volume equivalent to at least 40 United States barrels of oil.

Statement 14: The assembly according to any of Statements 1-12, wherein the interior comprises a volume of at least 6,000 liters.

Statement 15: The assembly according to any of Statements 1-14, wherein the housing comprises one or more housing walls substantially surrounding the interior of the pressure vessel.

Statement 16: The assembly according to any of Statements 1-15, wherein the housing is substantially spherical or bulbous.

Statement 17: The assembly according to any of Statements 1-16, wherein the interior is substantially spherical or bulbous.

Statement 18: The assembly according to any of Statements 1-17, wherein the pressure vessel comprises a relief port positioned on the housing and pneumatically connected to an ambient environment, the relief port operable to relieve the vacuum, or a portion thereof, from the interior.

Statement 19: The assembly according to any of Statements 1-18, wherein the pressure vessel comprises a discharge port coupled to the housing, the discharge port operable to discharge waste material from the interior.

Statement 20: The assembly according to Statement 19, wherein the discharge port is coupled to the housing via a discharge pipe.

Statement 21: The assembly according to Statement 19 or Statement 20, wherein the pressure vessel comprises a fluid supply port positioned on the housing, the fluid supply port pneumatically coupled to a fluid supply and operable to pressurize the interior with the fluid supply so as to increase a rate of discharge of waste material through the discharge port.

Statement 22: The assembly according to any one of Statements 18-21, wherein the relief port is operable to equalize the pressure in the interior from the vacuum to ambient pressure so as to facilitate discharge of waste material from the interior through the discharge port.

Statement 23: The assembly according to any one of Statements 2-22, wherein a lower portion of the housing has a bowl shape between the inlet port and the vacuum port operable to trap at least a majority of the waste material in the interior, wherein the inlet port and the vacuum port are positioned on the housing above the bowl shape.

Statement 24: The assembly according to Statement 23, wherein the discharge port is fluidly connected to the bowl shape to gravity feed the trapped at least a majority of the waste material out of the interior to the discharge port.

Statement 25: The assembly according to any one of Statements 19-24, wherein the discharge port is located below an upper surface of the chassis.

Statement 26: The assembly according to any one of Statements 1-25, further comprising: a sound attenuation assembly coupled to the vacuum source, the sound attenuation assembly operable to attenuate sound generated by the vacuum source.

Statement 27: The assembly according to Statement 26, wherein the sound attenuation assembly comprises a sound attenuation chamber connected to the vacuum source, the sound attenuation chamber comprising an attenuation housing at least partially defining a chamber interior volume being positioned to receive at least a portion of the vacuum flow from the vacuum source and attenuate sound generated by the vacuum source.

Statement 28: The assembly according to Statement 26 or Statement 27, wherein one or more of the plurality of vacuum generators comprises a venturi mechanism configured to receive pressurized fluid from a fluid source of pressurized fluid and use a venturi effect to generate a vacuum flow between the material source and the vacuum and material collector assembly.

Statement 29: The assembly according to any one of Statements 26-28, wherein the vacuum source, the material collector, and the sound attenuation assembly are connected to one another to form a unified vacuum, material collector, and attenuation module.

Statement 30: The assembly according to Statement 29, wherein the unified vacuum, material collector, and attenuation module comprises a chassis supporting the vacuum source, the material collector, and the sound attenuation chamber, the chassis configured to be transported between geographical locations.

Statement 31: The assembly according to Statement 29 or Statement 30, wherein the unified vacuum, material collector, and attenuation module comprises a vacuum source configured to be connected to a material collector through which the vacuum flow passes, drawing the material from the material source into the material collector.

Statement 32: The assembly according to any one of Statements 26-32, wherein the vacuum source is configured to draw a minor portion of the material into the sound attenuation chamber and deposit a major portion of the material in the material collector.

Statement 33: The assembly according to any one of Statements 5-32, wherein one or more of the plurality of vacuum generators comprises one or more of: one or more fluid supply ports configured to receive pressurized fluid from a fluid source of pressurized fluid; a vacuum port through which the vacuum flow is received; or an exhaust port, through which the fluid flow used to generate the vacuum flow and a portion of the material drawn into the vacuum port with the vacuum flow are exhausted from the one or more vacuum generators.

Statement 34: The assembly according to Statement 33, wherein the exhaust port provides fluid flow from the one or more vacuum generators to the sound attenuation chamber.

Statement 35: The assembly according to Statement 34, wherein the one or more fluid supply ports comprise a plurality of fluid supply ports, and each of the fluid supply ports is configured to receive pressurized fluid from a fluid source of pressurized fluid.

Statement 36: The assembly according to Statement 35, wherein two or more of the fluid supply ports are configured to be connected to separate fluid sources of pressurized fluid.

Statement 37: The assembly according to any one of Statements 33-36, further comprising one or more fluid supply control valves configured to control fluid flow through one or more of the fluid supply ports.

Statement 38: The assembly according to any one of Statements 33-36, further comprising one or more of: one or more fluid supply control valves configured to control fluid flow through one or more of the fluid supply ports; a vacuum control valve configured to control fluid flow through the vacuum port; and an exhaust control valve configured to control fluid flow through the exhaust port.

Statement 39: The assembly according to Statement 38, further comprising a vacuum source controller configured to control one or more of: the one or more fluid supply control valves; the vacuum control valve; and the exhaust control valve to control a vacuum pressure generated by the vacuum source.

Statement 40: The assembly according to Statement 39, wherein the vacuum source controller is configured control the vacuum pressure at least partially responsive to one or more of: an operator setting; or a sensor signal indicative of one or more of: the vacuum pressure; a vacuum flow rate; or a parameter related to the material extracted from the source of the material.

Statement 41: The assembly according to any one of Statements 26-40, wherein the vacuum source is directly connected to the sound attenuation chamber.

Statement 42: The assembly according to any one of Statements 26-41, wherein the sound attenuation chamber is configured to reduce sound emitted during operation of the vacuum source by an amount ranging from ten percent to forty percent.

Statement 43: The assembly according to any one of Statements 27-42, wherein the attenuation housing substantially seals the chamber interior volume from the ambient environment.

Statement 44: The assembly according to any one of Statements 27-43, wherein the attenuation housing comprises one or more of: one or more chamber inlet ports configured to receive the vacuum flow from the vacuum source, the vacuum flow including a portion of the material extracted from the material source; one or more chamber exhaust ports configured to reduce backpressure on flow of the vacuum flow into the attenuation chamber; and one or more chamber discharge ports configured to facilitate removal of a portion the material extracted from the material source from the chamber interior volume of the sound attenuation chamber.

Statement 45: The assembly according to Statement 44, wherein the one or more chamber exhaust ports have a cross-sectional area greater than a cross-sectional area of the one or more chamber inlet ports.

Statement 46: The assembly according to any one of Statements 26-45, further comprising filter media at least partially enclosed in the sound attenuation chamber and configured to filter a portion of the material extracted from the source of the material from the vacuum flow passing through the sound attenuation chamber.

Statement 47: The assembly according to Statement 46, wherein the filter media comprises sound absorptive material.

Statement 48: The assembly according to Statement 47, further comprising one or more of: a filter media support plate comprising a structural member at least partially supporting the filter media within the sound attenuation chamber; and one or more baffles at least partially enclosed in the sound attenuation chamber and configured to attenuate sound generated by the vacuum source.

Statement 49: The assembly according to Statement 48, further comprising one or more jet generators positioned relative to the sound attenuation chamber to generate jets of fluid flow directed toward the filter media to at least partially maintain filtration capacity of the filter media.

Statement 50: The assembly according to Statement 49, further comprising a source of compressed fluid connected to the one or more jet generators to provide compressed fluid to the one or more jet generators.

Statement 51: The assembly according to Statement 50, further comprising one or more control actuators configured to control a rate at which compressed fluid provided to the one or more jet generators exits the one or more jet generators, the one or more control actuators being configured to modulate one or more of a strength of the jets of fluid flow, timing of the jets of fluid flow, or one or more other characteristics associated with the jets of fluid flow.

Statement 52: The assembly according to any one of Statements 27-51, wherein the attenuation housing comprises one or more chamber discharge ports configured to facilitate removal of a portion of the material extracted from the material source from the chamber interior volume of the sound attenuation chamber, the one or more chamber discharge ports being connected to a material collector configured to receive material extracted from the source of the material.

Statement 53: The assembly according to Statement 52, further comprising a discharge port control valve positioned to control a rate of fluid flow through the chamber discharge port.

Statement 54: The assembly according to Statement 53, further comprising a discharge port control valve actuator configured to control operation of the discharge port control valve and a rate of fluid flow through the chamber discharge port.

Statement 55: The assembly according to Statement 54, further comprising one or more chamber sensors configured to generate signals indicative of one or more of filtration capacity of filter media at least partially enclosed in the sound attenuation chamber, a level of the material extracted from the material source in the chamber interior volume of the sound attenuation chamber, or a flow rate of the material out of the discharge port.

Statement 56: The assembly according to Statement 55, further comprising a chamber controller in communication with one or more of the discharge port control valve actuator, one or more jet generators, and the one or more chamber sensors, the chamber controller being configured to: receive one or more sensor signals from the one or more chamber sensors; and based at least in part on the one or more sensor signals, control operation of one or more of the discharge port control valve actuator or the one or more jet generators to one or more of facilitate flow of fluid through the filter media or prevent the chamber interior volume from being overfilled with the material.

Statement 57: A system for removing waste material from a waste material source, the system comprising: a vacuum and material collector assembly according to any one of Statements 21-56; and a fluid supply source operable to provide pressurized fluid to the fluid supply port or one or more fluid supply ports.

Statement 58: The system according to Statement 57, wherein the fluid supply source comprises: a fluid reservoir operable to store a fluid; and a motor connected to the fluid reservoir operable to fill the fluid reservoir.

Statement 59: A method for extracting waste material from a waste material source, the method comprising: generating a high-pressure vacuum of fluid flow in an interior of a material collector when connected to the waste material source by a pneumatic connection which extends between the waste material source and the interior; and transferring, with the high-pressure vacuum of the fluid flow, at least a portion of the waste material from the waste material source to the interior through the pneumatic connection.

Statement 60: The method according to Statement 59, wherein the high-pressure vacuum is generated by a high-pressure vacuum source positioned on a vacuum and material collector assembly according to any one of Statements 1-56.

Statement 61: The method according to Statement 59 or Statement 60, wherein the high-pressure vacuum is generated by a high-pressure vacuum source pneumatically coupled to a material collector comprising a pressure vessel having an interior defined by a housing, wherein the vacuum source is directly connected to the pressure vessel via a vacuum port positioned on the housing.

Statement 62: The method according to Statement 61, wherein the vacuum source is directly connected to the pressure vessel via the vacuum port without the use of one or more tubular members between the vacuum source and the vacuum port.

Statement 63: The method according to any one of Statements 60-62, wherein the vacuum source comprises a plurality of vacuum generators, each of the plurality of vacuum generators being positioned to generate a vacuum to the interior of the pressure vessel.

Statement 64: The method according to Statement 63, wherein one or more of the plurality of vacuum generators comprises a venturi mechanism operable to generate a vacuum in the interior of the pressure vessel using a venturi effect.

Statement 65: The method according to Statement 63 or Statement 64, wherein the plurality of vacuum generators comprises two or more vacuum generators, the two or more vacuum generators being configured to operate in parallel to enhance vacuum pressure generated by the vacuum source.

Statement 66: The method according to Statement 63 or Statement 64, wherein the plurality of vacuum generators comprises four vacuum generators, the four vacuum generators being configured to operate in parallel to enhance vacuum pressure generated by the vacuum source.

Statement 67: The method according to any of Statements 60-66, wherein the vacuum source and the material collector are on a chassis operable to support the vacuum source and material collector to form a unified vacuum and material collector operable to be transported between geographical locations.

Statement 68: The method according to any of Statements 59-67, wherein the interior comprises a volume equivalent to at least 40 United States barrels of oil.

Statement 69: The method according to any of Statements 59-67, wherein the interior comprises a volume of at least 6,000 liters.

Statement 70: The method according to any one of Statements 59-69, wherein at least a portion of the waste material is transferred from the waste material source to the interior through an inlet port positioned on the housing, the inlet port pneumatically coupled with the waste material source.

Statement 71: The method according to any one of Statements 59-70, further comprising: mobilizing the material collector containing the waste material, or a portion thereof, away from the waste material source to a waste disposal site.

Statement 72: The method according to Statement 71, wherein mobilizing the material collector comprises mobilizing the material collector and vacuum source together on a single mobile chassis to a waste disposal site.

Statement 73: The method according to Statement 71 or Statement 72, further comprising: discharging the waste material, or a portion thereof, from the interior through a discharge port coupled to the housing to a disposal receptacle at the waste disposal site.

Statement 74: The method according to Statement 73, wherein the discharge port is substantially positioned at an end of a mobile chassis supporting the vacuum source and the material collector.

Statement 75: The method according to Statement 73 or Statement 74, wherein the discharge port is positioned below an upper surface of a mobile chassis supporting the vacuum source and the material collector.

Statement 76: The method according to any one of Statements 73-75, wherein the discharge port is connected to a bottom portion of the housing via a discharge pipe extending from the housing to a terminal end of a mobile chassis supporting the vacuum source and the material collector.

Statement 77: The method according to any one of Statements 73-76, wherein discharging the waste material comprises: opening a relief port positioned on the housing and pneumatically connected to an ambient environment so as to equalize pressure in the interior with an ambient environment and relieve the vacuum on the interior; and pressurizing the interior with a fluid supply so as to increase a rate of discharge of waste material through the discharge port, the fluid supply pneumatically coupled to a fluid supply port positioned on the housing.

Statement 78: The method according to any one of Statements 59-77, further comprising: attenuating sound generated by the vacuum source at a sound attenuation module coupled to the vacuum source.

Statement 79: The method according to Statement 78, wherein the vacuum source, material collector, and sound attenuation module are supported on a single mobile chassis operable to be transported between geographical locations.

Statement 80: The method according to Statement 78 or Statement 79, wherein attenuating sound generated by the vacuum source comprises: causing at least a portion of the vacuum flow from the vacuum source to flow to a sound attenuation chamber connected to the vacuum source, the sound attenuation chamber comprising an attenuation housing at least partially defining a chamber interior volume operable to receive at least a portion of the vacuum flow from the vacuum source and attenuate sound generated by the vacuum source.

Statement 81: The method according to any one of Statements 59-80, further comprising: generating, via a plurality of vacuum generators, a vacuum flow; extracting waste material from the material source via the vacuum flow through an inlet port disposed on the housing; depositing at least a portion of the extracted material in the material collector; and passing the vacuum flow into a sound attenuation chamber to reduce a sound level generated by one or more of the vacuum flow or generating the vacuum flow.

Statement 82: The method according to Statement 81, wherein generating the vacuum flow comprises using a venturi effect to generate the vacuum flow.

Statement 83: The method according to Statement 81 or Statement 82, wherein generating the vacuum flow comprises generating the vacuum flow via a vacuum generator, the method further comprising connecting the plurality of vacuum generators and the sound attenuation chamber to one another to form a unified vacuum and attenuation module.

Statement 84: The method according to any one of Statements 59-84, further comprising: transporting the unified vacuum and attenuation module from a first geographical location to as second geographical location at which the material source is present.

Statement 85: The method according to any one of Statements 81-84, wherein passing the vacuum flow into the sound attenuation chamber comprises drawing a minor portion of the extracted material into the sound attenuation chamber and depositing a major portion of the extracted material in the material collector.

Statement 86: The method according to any one of Statements 81-85, wherein generating the vacuum flow comprises receiving pressurized fluid from a fluid source of pressurized fluid via one or more fluid supply ports associated with the plurality of vacuum generators.

Statement 87: The method according to Statement 86, wherein supplying pressurized fluid to the plurality of vacuum generators comprises controlling fluid flow to the plurality of vacuum generators via control of fluid flow through one or more of fluid supply ports.

Statement 88: The method according to Statement 87, wherein controlling fluid flow to the plurality of vacuum generators via control of fluid flow through the one or more of fluid supply ports comprises controlling one or more fluid supply control valves configured to control fluid flow through one or more of the fluid supply ports.

Statement 89: The method according to Statement 88, further comprising controlling via, a vacuum source controller, one or more of: the one or more fluid supply control valves; a vacuum control valve configured to the vacuum flow; and an exhaust control valve configured to control a vacuum pressure generated by the plurality of vacuum generators.

Statement 90: The method according to Statement 89, wherein controlling the one or more of the one of more fluid supply control valves, the vacuum control valve, or the exhaust control valve is at least partially responsive to one or more of: an operator setting; or a sensor signal indicative of one or more of: the vacuum pressure; a vacuum flow rate; and a parameter related to the material extracted from the source of the material.

Statement 91: The method according to Statement 90, further comprising directly connecting the plurality of vacuum generators and the sound attenuation chamber to one another.

Statement 92: The method according to Statement 91, wherein generating, via the plurality of vacuum generators using the pressurized fluid, a vacuum flow comprises operating the plurality of vacuum generators in parallel to enhance vacuum pressure of the vacuum flow.

Statement 93: The method according to Statement 92, further comprising passing the vacuum flow into filter media at least partially enclosed in the sound attenuation chamber to filter a portion of the material extracted from the material source from the vacuum flow passing into the sound attenuation chamber.

Statement 94: The method according to Statement 93, further comprising generating jets of fluid flow directed toward the filter media to at least partially maintain filtration capacity of the filter media.

Statement 95: The method according to Statement 94, further comprising controlling a rate at which compressed fluid is provided for the jets of fluid flow to modulate one or more of a strength of the jets of fluid flow, timing of the jets of fluid flow, or one or more other characteristics associated with the jets of fluid flow.

Statement 96: The method according to any one of Statements 78-95, further comprising removing a portion of the material extracted from the material source from the sound attenuation chamber and conveying the portion of the material extracted from the sound attenuation chamber to a material collector configured to receive material extracted from the material source.

Statement 97: The method according to Statement 96, wherein the sound attenuation chamber comprises one or more chamber sensors configured to generate signals indicative of one or more of filtration capacity of filter media at least partially enclosed in the sound attenuation chamber, a level of the material extracted from the source of the material in a chamber interior volume of the sound attenuation chamber, or a flow rate of the material out of a discharge port, and the method further comprises: receiving, via a chamber controller, one or more sensor signals from the one or more chamber sensors; and controlling, via the chamber controller based at least in part on the one or more sensor signals, operation of one or more of a discharge port control valve actuator or one or more jet generators configured to generate jets of fluid flow directed toward the filter media to at least partially maintain filtration capacity of the filter media, to one or more of facilitate flow of fluid through the filter media or prevent the chamber interior volume from being overfilled with the material.

What is claimed is:

1. A vacuum and material collector assembly for removing waste material from a waste material source, the assembly comprising:
    a material collector comprising a high volume pressure vessel having an interior; and
    a high-pressure vacuum source pneumatically coupled to the pressure vessel, the high-pressure vacuum source operable to generate a high-pressure vacuum of a fluid flow through the interior of the pressure vessel to extract the waste material from the waste material source into the interior of the pressure vessel, the high-pressure vacuum source also pneumatically connected to the material collector, thereby to define a unified vacuum and collector assembly operable to be mounted on a single mobile chassis, the high-pressure vacuum source [comprises] comprising a plurality of vacuum generators, each of the plurality of vacuum generators positioned to generate a vacuum to the interior of the pressure vessel, one or more of the plurality of vacuum generators comprising a venturi mechanism operable to generate the high-pressure vacuum in the interior of the pressure vessel by use of a venturi effect.

2. The assembly according to claim 1, wherein the pressure vessel comprises:
    a housing defining the interior of the pressure vessel, and
    a vacuum port positioned on the housing to allow access to the interior from outside of the housing, the vacuum port pneumatically connected to the high-pressure vacuum source, thereby further to define the unified vacuum and material collector assembly, and
    wherein the high-pressure vacuum source is operable to apply a high-pressure vacuum to the interior of the pressure vessel through the vacuum port.

3. The assembly according to claim 2, wherein the high-pressure vacuum source is directly connected to the pressure vessel via the vacuum port.

4. The assembly according to claim 3, wherein the high-pressure vacuum source is directly connected to the pressure vessel via the vacuum port without the use of one or more tubular members between the vacuum source and the vacuum port.

5. The assembly according to claim 1, wherein the plurality of vacuum generators comprises two or more vacuum generators, the two or more vacuum generators configured to operate in parallel to enhance vacuum pressure generated by the high-pressure vacuum source.

6. The assembly according to claim 1, wherein the plurality of vacuum generators comprises four vacuum generators, the four vacuum generators configured to operate in parallel to enhance vacuum pressure generated by the high-pressure vacuum source, and wherein each of the four vacuum generators includes a venturi mechanism operable to generate the high-pressure vacuum in the interior of the pressure vessel by use of a venturi effect.

7. The assembly according to claim 2, wherein the pressure vessel comprises:
an inlet port positioned on the housing, the inlet port operable to provide access to the interior when pneumatically connected to the waste material source such that the high-pressure vacuum source is operable to generate vacuum flow between the waste material source and the interior of the pressure vessel.

8. The assembly according to claim 7, further comprising a chassis supporting the high-pressure vacuum source and the material collector so as further to define the unified vacuum and material collector operable to be transported between geographical locations.

9. The assembly according to claim 8, wherein the high-pressure vacuum source is configured to draw the waste material from the waste material source into the interior of the material collector and depositing the waste material therein.

10. The assembly according to claim 1, wherein the interior comprises a volume equivalent to at least 40 United States barrels of oil.

11. The assembly according to claim 1, wherein the interior comprises a volume of at least 6,000 liters.

12. The assembly according to claim 2, wherein the pressure vessel includes a relief port positioned on the housing and pneumatically connected to an ambient environment, the relief port operable to relieve the vacuum, or a portion thereof, from the interior.

13. The assembly according to claim 12, wherein the pressure vessel further includes a discharge port coupled to the housing, the discharge port operable to discharge waste material from the interior, wherein the discharge port is coupled to the housing via a discharge pipe, wherein the pressure vessel further includes a fluid supply port positioned on the housing, the fluid supply port pneumatically coupled to a fluid supply and operable to pressurize the interior with the fluid supply so as to increase a rate of discharge of waste material through the discharge port, and wherein the waste material source is positioned at a different elevational height than the elevational height of the single mobile chassis.

14. The assembly according to claim 13, wherein the relief port is operable to equalize the pressure in the interior from the vacuum to ambient pressure so as to facilitate discharge of waste material from the interior through the discharge port.

15. The assembly according to claim 14, wherein a lower portion of the housing has a bowl shape between the inlet port and the vacuum port operable to trap at least a majority of the waste material in the interior, wherein the inlet port and the vacuum port are positioned on the housing above the bowl shape, and wherein the discharge port is fluidly connected to the bowl shape to gravity feed the trapped at least a majority of the waste material out of the interior to the discharge port.

16. The assembly according to claim 15, wherein the discharge port is located below an upper surface of the chassis.

17. A high-pressure vacuum and material collector assembly for removing waste material from a waste material source, the assembly comprising:
a material collector comprising a high volume pressure vessel having an interior; and
a high-pressure vacuum source pneumatically coupled to the pressure vessel, the high-pressure vacuum source operable to generate a high-pressure vacuum of a fluid flow through the interior of the pressure vessel to extract the waste material from the waste material source into the interior of the pressure vessel, the high-pressure vacuum source also pneumatically connected to the material collector, thereby to define a unified vacuum and collector assembly operable to be mounted on a single mobile chassis, the high-pressure vacuum source including a plurality of high-pressure vacuum generators, one or more of the plurality of high-pressure vacuum generators comprising a venturi mechanism configured to receive pressurized fluid from a fluid source of pressurized fluid and use a venturi effect to generate a high-pressure vacuum flow between the material source and the high-pressure vacuum and material collector assembly.

18. A method for extracting waste material from a waste material source, the method comprising:
generating a high-pressure vacuum of fluid flow in an interior of a material collector when connected to the waste material source by a pneumatic connection which extends between the waste material source and the interior, the high-pressure vacuum including one or more high-pressure vacuum sources, the one or more vacuum sources including a venturi mechanism operable to generate the high-pressure vacuum in the interior of the pressure vessel by use of a venturi effect; and
transferring, with the high-pressure vacuum of the fluid flow, at least a portion of the waste material from the waste material source to the interior through the pneumatic connection, the high-pressure vacuum generated by the one or more high-pressure vacuum sources pneumatically coupled to a material collector, the material collector comprising a pressure vessel having an interior defined by a housing, the vacuum source directly connected to the pressure vessel via a vacuum port positioned on the housing, so that the one or more high-pressure vacuum sources pneumatically connected to the material collector defines a unified vacuum and collector assembly operable to be mounted on a single mobile chassis and so that at least a portion of the waste material is transferred from the waste material source to the interior through an inlet port positioned on the housing, the inlet port pneumatically coupled with the waste material source.

19. The method according to claim 18, further comprising:
mobilizing the material collector containing the waste material, or a portion thereof, away from the waste material source to a waste disposal site, and wherein the mobilizing the material collector comprises mobilizing the material collector and the one or more high-pressure vacuum sources together on a single mobile chassis to a waste disposal site.

20. The method according to claim 19, further comprising:
discharging the waste material, or a portion thereof, from the interior through a discharge port coupled to the housing to a disposal receptacle at the waste disposal site.

21. The method according to claim 20, wherein the discharging the waste material comprises:
opening a relief port positioned on the housing and pneumatically connected to an ambient environment so as to equalize pressure in the interior with an ambient environment and relieve the vacuum on the interior; and
pressurizing the interior with a fluid supply so as to increase a rate of discharge of waste material through the discharge port, the fluid supply pneumatically coupled to a fluid supply port positioned on the housing.

22. The method according to claim 21, further comprising:
attenuating sound generated by the one or more high-pressure vacuum sources at a sound attenuation module coupled to the one or more high-pressure vacuum sources, and wherein the one or more high-pressure vacuum sources, the material collector, and the sound attenuation module are supported on a single mobile chassis operable to be transported between geographical locations.

23. The method according to claim 22, wherein attenuating sound generated by the one or more high-pressure vacuum sources comprises:
causing at least a portion of the vacuum flow from the one or more high-pressure vacuum sources to flow to a sound attenuation chamber connected to the one or more high-pressure vacuum sources, the sound attenuation chamber comprising an attenuation housing at least partially defining a chamber interior volume operable to receive at least a portion of the vacuum flow from the one or more high-pressure vacuum sources and attenuate sound generated by the vacuum source.

24. A vacuum and material collector assembly for removing waste material from a waste material source, the assembly comprising:

a material collector comprising a high-volume pressure vessel having an interior, the pressure vessel comprising a housing positioned to define the interior of the pressure vessel and a vacuum port positioned on the housing to allow access to the interior from outside of the housing; and a high-pressure vacuum source pneumatically and directly connected to the pressure vessel via the vacuum port without the use of one or more tubular members between the vacuum source and the vacuum port, the vacuum source operable to generate a high-pressure vacuum of a fluid flow through the interior of the pressure vessel to extract the waste material from the waste material source into the interior of the pressure vessel, the high-pressure vacuum source operable to apply the high-pressure vacuum to the interior of the pressure vessel through the vacuum port, the high-pressure vacuum source including one or more venturi mechanisms operable to generate the high-pressure vacuum in the interior of the pressure vessel by use of a venturi effect, the high-pressure vacuum source also pneumatically connected to the material collector so as to define a unified vacuum and material collector assembly operable to be mounted on a single mobile chassis.

* * * * *